US010428798B2

(12) United States Patent
Mathers

(10) Patent No.: US 10,428,798 B2
(45) Date of Patent: Oct. 1, 2019

(54) WIND TURBINE POWER STORAGE AND REGENERATION

(71) Applicant: Australian Wind Technologies Pty Ltd, Bridgeman Downs (AU)

(72) Inventor: Norman Ian Mathers, Brisbane (AU)

(73) Assignee: Australian Wind Technologies Pty Ltd, Bridgeman Downs (AU)

( * ) Notice: Subject to any disclaimer, the term of this patent is extended or adjusted under 35 U.S.C. 154(b) by 0 days.

(21) Appl. No.: 15/767,902

(22) PCT Filed: Oct. 14, 2016

(86) PCT No.: PCT/AU2016/050967
§ 371 (c)(1),
(2) Date: Apr. 12, 2018

(87) PCT Pub. No.: WO2017/066826
PCT Pub. Date: Apr. 27, 2017

(65) Prior Publication Data
US 2018/0298881 A1   Oct. 18, 2018

Related U.S. Application Data

(60) Provisional application No. 62/245,136, filed on Oct. 22, 2015, provisional application No. 62/290,196, filed on Feb. 2, 2016.

(51) Int. Cl.
*F03D 9/17* (2016.01)
*F03D 15/00* (2016.01)
(Continued)

(52) U.S. Cl.
CPC .................. *F03D 9/17* (2016.05); *F03D 9/25* (2016.05); *F03D 9/28* (2016.05); *F03D 15/00* (2016.05);
(Continued)

(58) Field of Classification Search
CPC ..... F03D 9/17; F03D 9/25; F03D 9/28; F15B 1/04
(Continued)

(56) References Cited

U.S. PATENT DOCUMENTS

| 3,895,565 A | 7/1975 | Schottler |
| 4,274,010 A | 6/1981 | Lawson-Tancred |

(Continued)

FOREIGN PATENT DOCUMENTS

| CN | 102562208 A | 7/2012 |
| CN | 103511219 A | 1/2014 |

(Continued)

OTHER PUBLICATIONS

"International Application Serial No. PCT/AU2016/050967, International Preliminary Report on Patentability dated Mar. 5, 2018", 6 pgs.

(Continued)

*Primary Examiner* — Michael Leslie
*Assistant Examiner* — Daniel S Collins
(74) *Attorney, Agent, or Firm* — Schwegman Lundberg & Woessner, P.A.

(57) ABSTRACT

Methods, systems and apparatuses including systems and methods that can be used for operating a wind turbine including in power generation and regeneration modes are disclosed. According to one example, a method is disclosed that can include adjusting a power split transmission coupling to transfer substantially all torque from a turbine rotor to a generator by working a hydraulic fluid, wherein the generator converts mechanical power to electrical power, diverting the hydraulic fluid at high pressure from the power split transmission coupling in response to the electrical power produced by the generator exceeding a threshold to maintain the electrical power produced by the generator at or (Continued)

below the threshold; storing the hydraulic fluid diverted from the power split transmission coupling under high pressure in a storage vessel; and introducing the hydraulic fluid stored at high pressure to a hydraulic motor in response to the generator producing below threshold electrical power, the hydraulic motor operatively coupled to the generator and configured to transmit mechanical power to the generator for electrical power generation.

29 Claims, 32 Drawing Sheets

(51) Int. Cl.
    *F03D 9/28*     (2016.01)
    *F03D 15/20*     (2016.01)
    *F03D 9/25*     (2016.01)
    *F03D 1/00*     (2006.01)

(52) U.S. Cl.
    CPC ............... *F03D 15/20* (2016.05); *F03D 1/00* (2013.01); *F05B 2260/406* (2013.01); *Y02E 10/725* (2013.01); *Y02E 60/15* (2013.01)

(58) Field of Classification Search
    USPC .......................................................... 60/418
    See application file for complete search history.

(56) References Cited

U.S. PATENT DOCUMENTS

| 5,657,629 | A | 8/1997 | Folsom et al. |
|---|---|---|---|
| 7,914,411 | B2 | 3/2011 | Basteck |
| 2010/0244447 | A1* | 9/2010 | Gopalswamy ............ F03D 7/02 290/50 |

| 2013/0067899 | A1 | 3/2013 | Mathers |
|---|---|---|---|
| 2014/0138958 | A1 | 5/2014 | Verdegem |
| 2015/0184641 | A1 | 7/2015 | Crane et al. |

FOREIGN PATENT DOCUMENTS

| CN | 103610988 A | 1/2014 |
|---|---|---|
| CN | 108431406 | 8/2018 |
| DE | 102011082725 | 3/2013 |
| DE | 102012013152 | 1/2014 |
| FR | 2944071 A3 | 10/2010 |
| GB | 1513208 A | 6/1978 |
| IN | 201817018393 A | 9/2018 |
| WO | WO-1981001444 A1 | 5/1981 |
| WO | WO-2005005782 A1 | 1/2005 |
| WO | WO-2006119574 A1 | 11/2006 |
| WO | WO-2007140514 A1 | 12/2007 |
| WO | WO-2011011682 A2 | 1/2011 |
| WO | WO-2015123784 A1 | 8/2015 |
| WO | WO-2017066826 A1 | 4/2017 |

OTHER PUBLICATIONS

"International Application Serial No. PCT/AU2016/050967, International Search Report dated Dec. 21, 2016", 9 pgs.
"International Application Serial No. PCT/AU2016/050967, Written Opinion dated Dec. 21, 2016", 4 pgs.
"European Application Serial No. 16856481.3, Extended European Search Report dated Oct. 10, 2018", 5 pgs.
"Chinese Application Serial No. 201680061659.5, Voluntary Amendment filed Feb. 1, 2019", w/English Claims, 22 pgs.
"European Application Serial No. 16856481.3, Response filed Feb. 28, 2019 to Extended European Search Report dated Oct. 10, 2018", 20 pgs.
"Chinese Application Serial No. 201680061659.5, Office Action dated Apr. 25, 2019", w/ English translation, 18 pgs.

* cited by examiner

WIND TURBINE POWER STORAGE AND REGENERATION

CLAIM OF PRIORITY

This application is a U.S. National Stage Filing under 35 U.S.C. 371 from International Application No. PCT/AU2016/050967, filed on 14 Oct. 2016, and published as WO 2017/066826 on 27 Apr. 2017, which application claims the benefit of priority to U.S. Provisional Patent Application Ser. No. 62/245,136, filed 22 Oct. 2015 and U.S. Provisional Patent Application Ser. No. 62/290,196, filed 2 Feb. 2016, the disclosures of each are incorporated herein in their entirety by reference.

CROSS REFERENCE TO RELATED APPLICATIONS

The present application is related to international application no. PCT/AU2007/000772, publication no. WO/2007/140514, entitled "Vane Pump for Pumping Hydraulic Fluid," filed Jun. 1, 2007; international application no. PCT/AU2006/000623, publication no. WO/2006/119574, entitled "Improved Vane Pump," filed May 12, 2006; international application no. PCT/AU2004/00951, publication no. WO/2005/005782, entitled "A Hydraulic Machine," filed Jul. 15, 2004; and U.S. patent application Ser. No. 13/510,643, publication no. U.S. 2013/0067899, entitled "Hydraulically Controlled Rotator Couple," filed Dec. 5, 2012, the entire specification of each of which is incorporated herein by reference in entirety.

TECHNICAL FIELD

This document pertains generally, but not by way of limitation, to systems and techniques for power generation and power regeneration.

BACKGROUND

Current systems for power generation can include a wind turbine to harness wind energy for conversion to electrical power. Existing wind turbines can include a nacelle mounted atop of a tower. The nacelle can include, for example, a gearbox, electrical generator, controller, and components for orienting the wind turbine. A rotor can be disposed on the nacelle and coupled to the electrical generator through the gearbox. The rotor can include a plurality of blades configured to generate a torque on the rotor in response to an applied wind loading.
Electrical power can be produced by the generator in response to the torque of the rotor.

Many wind turbine systems include a gearbox and/or a mechanical brake for reducing the energy input to the generator, for instance, to prevent the generator from exceeding a maximum power rating. In one example, the total power input into an electrical grid must be substantially equal to the total electrical demand on the system in order to maintain a desired frequency of the electrical grid. Accordingly, existing wind turbines can reduce the energy input into the generator (by the application of mechanical brakes, adjusting the gear ratio of the gearbox, or adjusting the pitch of the turbine blades) to prevent an increase in frequency of the electrical grid. As a result, some wind turbines fail to convert the full potential wind energy into electrical power when the energy input exceeds the maximum power rating of the generator.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
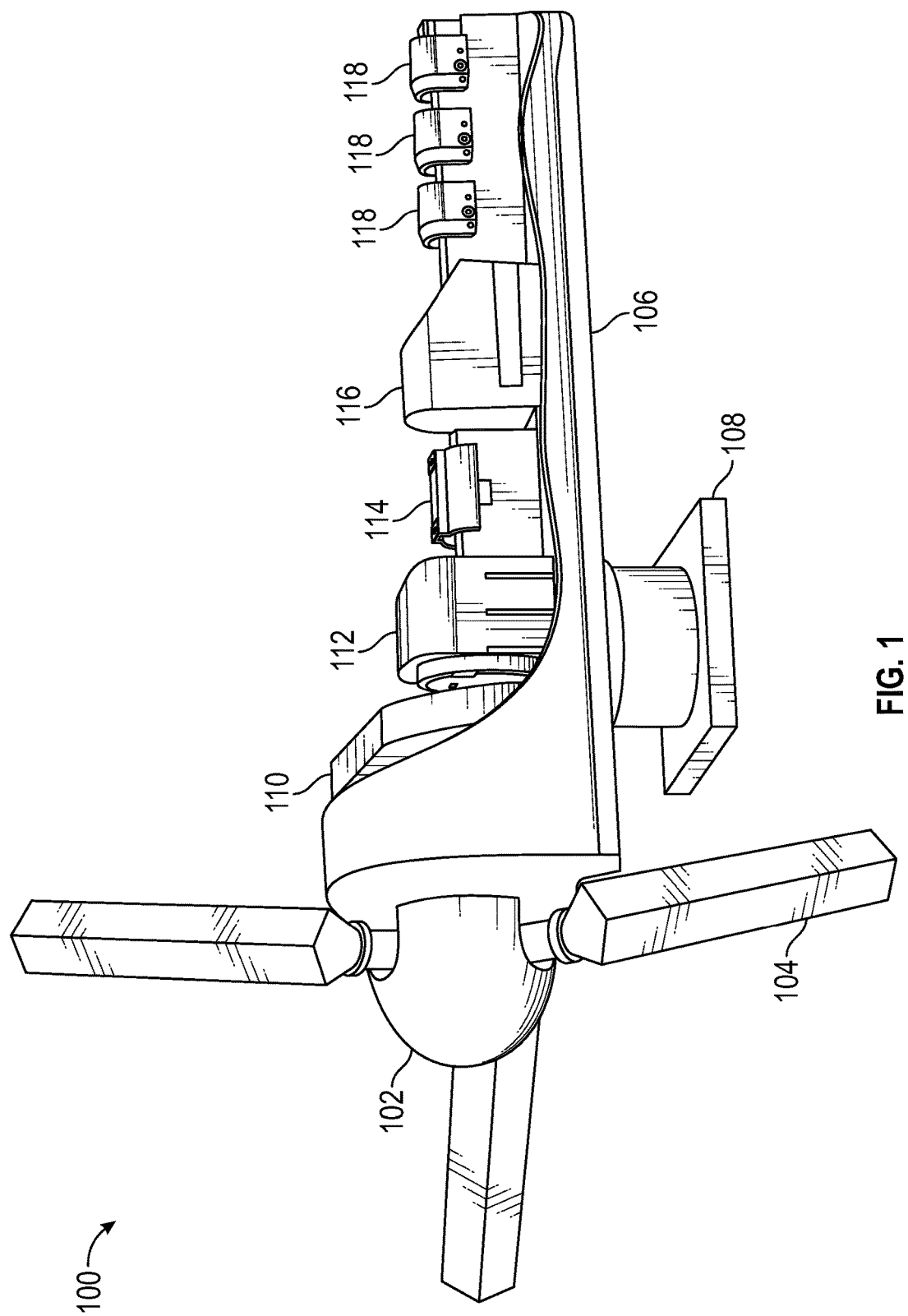
FIG. 1 is a perspective cutaway view of one example of a wind turbine nacelle including a power split transmission coupling, generator, and a plurality of hydraulic motors.

The present application relates to systems and techniques for wind turbine power storage and regeneration. The following detailed description includes examples intended to be illustrative of the subject matter disclosed herein and are in no way intended to be limiting. Features and steps described in relation to one or more examples may be combined with the subject matter of other examples and methods provided in this disclosure. The following examples are sufficient to enable one of skill in the art to practice the systems and techniques described in the following detailed description.

The present inventors have recognized, among other things, that a problem to be solved can include limiting the power captured by a turbine rotor of a wind turbine where rotor speeds exceed a rated speed (max power rating) of an electrical generator within the wind turbine, such as a wind turbine for generating electrical power. The present subject matter can help provide a solution to this problem, for instance, by including a power split transmission coupling within the wind turbine system. The systems and methods disclosed herein can store energy during a period of turbine rotor velocity exceeding the rated speed of the generator. During periods of rotor velocity below the rated speed, the system can operate in a regeneration mode. For instance, the wind turbine can include one or more motors operatively coupled to the generator. Previously stored energy can be applied to the motor for increasing power generation during periods of below rated speed operation.

In an example, a wind turbine system can include a turbine rotor. The turbine rotor can include one or more blades attached to the turbine rotor. The blades can be configured to produce a rotor torque on the rotor in response to a wind loading applied to the blades. For instance, the blades can include an airfoil shape to rotate the turbine rotor in response to wind loading. A power split transmission coupling can be operatively coupled to the turbine rotor by an input shaft and to a generator by an output shaft. The power split transmission coupling can be configured to transmit the rotor torque to the output shaft at an adjustable torque ratio of the input shaft. The power split transmission coupling can divert hydraulic fluid in response to the output shaft exceeding a threshold power, torque, or angular velocity. By diverting hydraulic fluid, the power transmitted to the generator, and accordingly the power produced by the generator can be adjusted.

A hydraulic fluid storage vessel can be configured to store the diverted hydraulic fluid under pressure. The wind turbine system can include at least one hydraulic motor. The hydraulic motor can include a motor output configured to receive the hydraulic fluid stored under pressure and generate a torque on the motor output in response. The generator can be operatively coupled to the output shaft and the motor output to produces electrical power in response to at least one of: torque applied by the output shaft, torque applied by the motor output, or both.

In an example, the power split transmission coupling includes an input shaft coupled to the turbine rotor. The input shaft can rotate in response to the rotor torque. The output shaft can rotate at an output speed. The power split coupling can include a cam ring and a hub disposed between the input shaft and the output shaft. A hydraulic fluid can be disposed between the cam ring and the hub. The hub can include a plurality of circumferentially spaced slots configured to house a plurality of vanes therein. The vanes can be configured to be movable, such as between a retracted position, a fully extended position, or any partially extended position therebetween. In the retracted position, the input shaft is independently rotatable with respect to the output shaft. In the one or more extended positions, the plurality of vanes are configured to work the hydraulic fluid and transmit torque from the input shaft to the output shaft at an adjustable torque ratio. The power split transmission coupling includes an inlet port communicatively coupled to a hydraulic fluid source. The hydraulic fluid can be transported from the hydraulic fluid source to the power split transmission coupling. The power split transmission coupling can include an outlet port having a closed configuration and an at least partially open configuration. The hydraulic fluid can be released from the power split transmission coupling through the outlet port in response to a power applied to the output shaft exceeding a threshold power. The released hydraulic fluid can exit the power split transmission coupling and can be stored under pressure.

Wind conditions can be inconsistent, in an example, the power split transmission coupling can transmit a constant power to the generator during inconsistent wind conditions by adjusting the volume of hydraulic fluid diverted from the power slit transmission coupling. For instance, the power split transmission coupling can reduce wind jitter effects on the wind turbine system. The power split transmission coupling can operate at high volumetric efficiency thereby increasing the efficiency of power generation. In an example, mechanical braking or turbine blade adjustments may need to be applied in order to prevent the generator from receiving more than the maximum rated power. By diverting hydraulic fluid from the power split transmission coupling, the application of mechanical braking or the feathering of the turbine blades is unnecessary to prevent the generator from exceeding the maximum rated power.

In an example, the wind turbine can be operated in a power generation cycle and in a regeneration cycle. In the power generation cycle, the power split transmission coupling can be adjusted (e.g., by a computer controller) to transfer substantially all torque from the turbine rotor to the generator by working the hydraulic fluid. In response, the generator can convert mechanical power to electrical power. The power split transmission coupling can divert the hydraulic fluid at high pressure from the power split transmission coupling in response to the electrical power produced by the generator exceeding the threshold power. Diverting the hydraulic fluid can maintain the electrical power produced by the generator at or below the threshold. The hydraulic fluid diverted from the power split transmission coupling under high pressure can be stored in a storage vessel. In a regeneration cycle, the hydraulic fluid stored at high pressure can be introduced to a hydraulic motor in response to the generator producing below threshold power. The hydraulic motor can be configured to transmit mechanical power to the generator for electrical power generation. As a result, the generator can operate at or closer to maximum power output for a higher percentage of the life of the generator. For instance, wind conditions may not facilitate full power operation of the wind turbine during all periods of operation. The wind turbine can operate closer to the maximum operational power or maximum efficiency as a result of the regeneration mode.

It should be understood by one of ordinary skill in the art that the power applied to the generator is a function of the rotational speed of the generator rotor as well as the torque applied to the generator rotor and the electrical power load of the generator. Accordingly, one of ordinary skill would appreciate that examples discussed herein including electrical power or mechanical power terms can include examples of corresponding rotational speed, power, or torque. For instance, a system configured to operate below a threshold power can also include an equivalent example of the same system configured to operate below a threshold rotor speed corresponding to the threshold power value for a given system.

Figure 3:
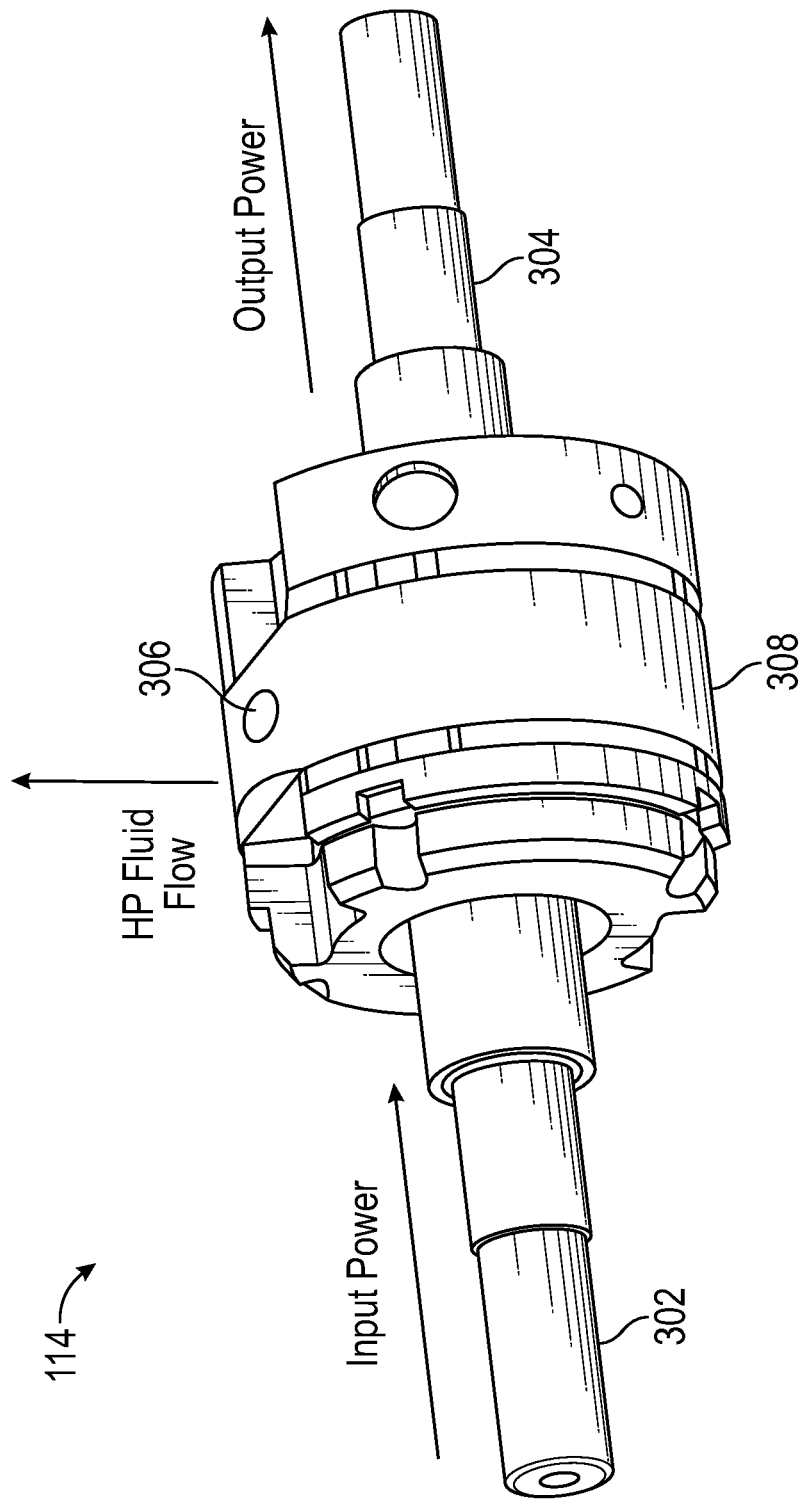
FIG. 3 is a perspective view of a variable power split transmission coupling according to an embodiment.

FIG. 1 shows a cutaway perspective view of an exemplary wind turbine 100. The wind turbine 100 can include a turbine rotor 102 and at least one turbine blade 104. The turbine blade 104 can be rotatably coupled to the turbine rotor 102. For instance, the turbine blade 104 can include an airfoil shape and the pitch of the airfoil with respect to a wind stream can be adjustable. The turbine rotor 102 can be mounted to a nacelle 106, for example, by a bearing 110. A tower 108 can support the nacelle 106 in the wind stream at a location sufficiently above the ground to provide clearance for rotation of the turbine blades 104. The nacelle 106 can house, and also support in some examples, a gearbox 112, a power split transmission coupling 114, a generator 116, and at least one hydraulic motor 118. The turbine blade 106 can generate a torque in response to a wind loading and transmit that torque to the turbine rotor 102. The turbine rotor 102 can transmit the torque generated by the turbine blade 104 to the generator 116. Electrical power can be produced by the generator 116 in response to the application of torque to a generator rotor 120 resulting in a rotation of the generator rotor within a stator of the generator 116. The turbine rotor 102 can be coupled to the generator 116 by one or more linkages (rotary shafts). The gearbox 112 and the power split transmission coupling 114 can be operatively coupled to the one or more linkages between the turbine rotor 102 and the generator 116. For instance, the turbine rotor can include a turbine rotor shaft. The gearbox 112 can include an input coupling attached to the turbine rotor shaft and an output coupling. The gearbox 112 can include one or more sprockets and gears arranged to rotate the output coupling at a speed corresponding to a ratio of the rotational speed of the input coupling (i.e., the turbine rotor shaft) In other words, the gearbox 112 can rotate the output coupling at a faster, slower, or equal speed of the turbine rotor shaft. The one or more linkages can further include an input shaft 122 of the power split transmission coupling 114 (as shown in FIG. 3 and described herein). The power split transmission coupling 114 can divert hydraulic fluid under high pressure to a storage vessel. The hydraulic fluid stored under high pressure can be used for auxiliary power purposes including, but not limited to, supplying high pressure hydraulic fluid to a hydraulic motor 118 for power generation or regeneration, pumping fluid, supplying cooling fluid to components of the wind turbine 100, or the like.

Figure 4:
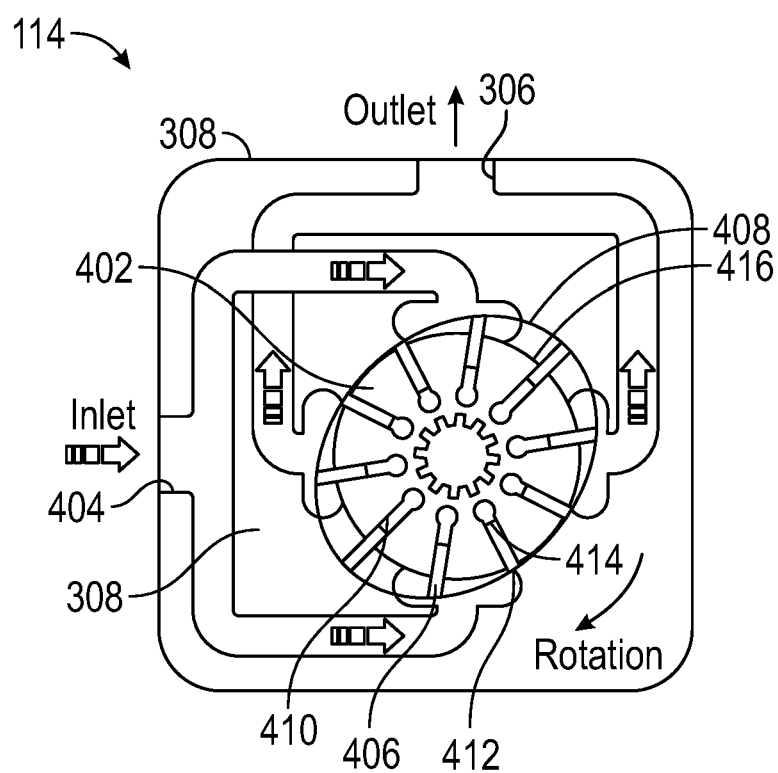
FIG. 4 is a cross section view of an exemplary power split transmission coupling.

The hydraulic motor 118 can also be coupled to the generator rotor 120 for supplying increased torque and power to the generator 116. In the example of FIG. 1, the wind turbine 100 includes three hydraulic motors 118 and one of the hydraulic motors 118 is capable of operating at a variable displacement. In an example, a plurality of hydraulic motors 118 can be more efficient than a single larger hydraulic motor 118. For instance, where the maximum power output of the hydraulic motor 118 can exceed the maximum power of the generator 116, the hydraulic motor 118 can be de-stroked to operate at lower than maximum capacity. Some hydraulic motors 118 operate less efficiently when de-stroked. The greater the degree of de-stroking, the less efficient the hydraulic motor 118 can operate. In an example, the hydraulic motor 118 can include a similar design to the power split transmission coupling 114 (as shown in FIGS. 3 and 4 and described herein). Instead of diverting hydraulic fluid to reduce the torque delivered to the generator 116, the hydraulic motor 118 can produce torque on the generator rotor 120 in response to the application high pressure hydraulic fluid to the hub and vanes of the hydraulic motor 118.

Figure 2:
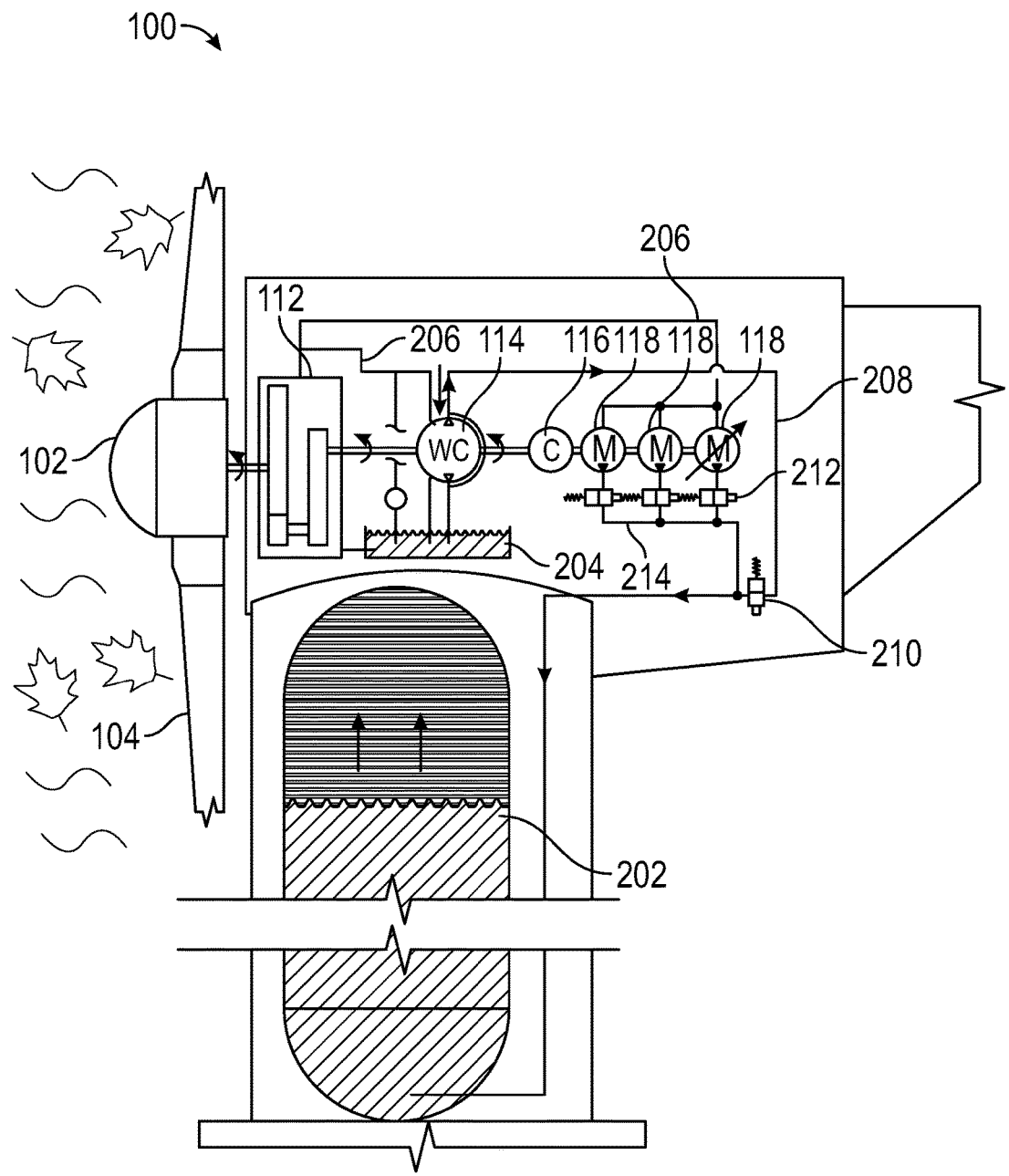
FIG. 2 is a system diagram of a wind turbine including a power split transmission coupling for regeneration according to an embodiment.

FIG. 2 depicts a wind turbine system diagram according to an example of the wind turbine 100. The wind turbine 100 can include the turbine rotor 102, turbine blades 104, gearbox 112, power split transmission coupling 114, generator 116, and a plurality of hydraulic motors as previously described herein. The example, of FIG. 2 further includes a hydraulic storage vessel 202, a hydraulic fluid reservoir 204, and a cooling circuit 206. Where the mechanical power of the turbine rotor 102, exceeds the maximum power of the generator 116, the power split transmission coupling 114 can draw hydraulic fluid from the reservoir 204 into the power split transmission coupling 114 and divert the hydraulic fluid at high pressure to the hydraulic storage vessel 202. The power split transmission coupling 114 can include an inlet port and outlet port (as shown in FIG. 3 and described herein). The inlet port can be coupled to the reservoir 204 to communicate the hydraulic fluid from the reservoir 204 to the power split transmission coupling 114. A hydraulic storage conduit 208 can couple the power split transmission coupling 116 to the hydraulic storage vessel 202. The high pressure hydraulic fluid can be stored at high pressure in the storage vessel 202. For instance, high pressure hydraulic fluid can be hydraulic fluid at pressures including, but not limited to, 20 bar, 100 bar, 300 bar, 500 bar, or other pressure. The hydraulic storage conduit 208 can include at least one cutoff valve 210 located along the hydraulic storage conduit between the power split transmission coupling 114 and the hydraulic storage vessel 202. The communication of hydraulic fluid from the power split transmission coupling 116 and the hydraulic storage vessel can be interrupted or stopped where the cutoff valve 210 is in the closed position. Closing the cutoff valve can prevent reverse flow of hydraulic fluid from the hydraulic storage vessel 202 to the power split transmission coupling 116.

In an example, the wind turbine system 100 includes at least one hydraulic regeneration conduit 214 coupled between the hydraulic storage vessel 202 and at least one hydraulic motor 118. For instance, the hydraulic regeneration conduit 214 can be connected to the hydraulic storage conduit 208 between the hydraulic storage vessel 202 and the cutoff valve 210 as shown in FIG. 2. In the regeneration mode, the wind turbine 100 can direct hydraulic fluid from the hydraulic storage vessel 202 to the one or more hydraulic motors 118 through the hydraulic regeneration conduit 214. The hydraulic regeneration conduit 214 can include one or more regeneration valves 212. In the open position, high pressure hydraulic fluid can flow from the hydraulic storage vessel to at least one hydraulic motor 118 through the regeneration valve 212. Torque can be supplied to the generator rotor 120 in response to the high pressure hydraulic fluid passing through the hydraulic motor 118.

In an example, the hydraulic fluid can include, but is not limited to water, a water glycol mixture, hydraulic oil, or the like. The power split transmission can operate with water as a fluid medium for transmitting torque from the input shaft to the output shaft resulting in cost savings over more expensive fluids. Couplings, fittings, hoses, conduits, and the like can leak hydraulic fluid in the course of normal operation. The use of water as the hydraulic fluid can result in an environmentally friendly solution. In an example, glycol or ethylene glycol can be added to water to form a water glycol mixture. For instance, the water glycol mixture can include a lower freezing point and a higher boiling point than pure water.

In the example of FIG. 2, the reservoir 204 can include a fluid storage tank for holding the hydraulic fluid at low pressures, such as atmospheric pressure. In an example, the reservoir 204 can include a large body of water, such as an ocean, lake, river, storage pod, tank, or the like. For instance, the large body of water can include a naturally occurring body of water. The reservoir can provide hydraulic fluid for cooling various components of the wind turbine 100 or for storing the hydraulic fluid at high pressure generated by the power split transmission coupling 114. In an example, where the hydraulic fluid from the reservoir 204 is not stored under high pressure, it can be returned to the reservoir 204. For instance, where the hydraulic fluid is circulated in a cooling circuit (described further below), the hydraulic fluid can be returned to the reservoir 204.

The hydraulic storage vessel 202 can be configured to store high pressure hydraulic fluid for long durations of time. For instance, the hydraulic storage vessel 202 can contain pressures of up to 350 bar for hours, days, weeks, or months. In the example of FIG. 2, the hydraulic storage vessel 202 is a hydraulic accumulator. The accumulator can be charged with a gas or a liquid, such as nitrogen gas or liquid nitrogen, to increase the storage pressure of the accumulator. In an example, the stored hydraulic fluid can provide up to 1 megawatt of power or more.

The cooling circuit 206 can circulate hydraulic fluid (e.g., from the reservoir 204) in a conduit. In the example, shown in FIG. 2, the hydraulic fluid diverted from the power split transmission coupling 114 can be circulated through the cooling circuit 206. The cooling circuit 206 can transfer heat away from the wind turbine components including, but not limited to, the gearbox 112, power split transmission coupling 114, generator 116, or the like. For instance, the cooling circuit 206 can include one or more heat exchangers to transfer the heat away from the wind turbine components. In an example, water can be the hydraulic fluid used as a cooling source for the wind turbine powertrain. In an example, hydraulic fluid exiting the hydraulic motor 118 can circulate through the cooling circuit 206 before returning to the reservoir 204. Optionally, the water can be combined with fire retardants (e.g., foaming agents) for reducing the flammability of the hydraulic fluid. In an example, the hydraulic fluid can be a water glycol mixture with good fire retardant properties. The hydraulic fluid can mitigate damage to the generator 116 and risk of fire and accordingly the generator 116 can be operated at rated power. In an example, hydraulic fluid (e.g., water glycol) can be used to extinguish developing fires. For instance, the cooling circuit 206 can include fire extinguishing nozzles that release the hydraulic fluid to extinguish fire.

FIG. 3 shows a perspective view of an example of the power split transmission coupling 114. As previously described, the power split transmission coupling 114 can include an input shaft 302 and an output shaft 304. The torque applied to the output shaft 304 can be adjusted according to an adjustable torque ratio of the input shaft 302. In an example, the torque of the output shaft 304 can be reduced according to the adjustable torque ratio of the power split transmission coupling 114. Displacing hydraulic fluid through an outlet port 306 of the power split transmission coupling 114 can decrease the adjustable torque ratio (i.e., reduce the amount of torque on the output shaft 304 in relation to the torque of the input shaft 302. A hub (shown in FIG. 4 and described herein) can be fixably attached to the input shaft 302. The hub can be rotatable within the cam ring 308. In an example, the cam ring 308 can be fixably attached to the output shaft 304. The power split transmission coupling 114 can have a through drive mode and a power split mode. In the through drive mode, the hub and the cam ring rotate in a substantially fixed 1:1 ratio (i.e., the output torque is substantially equal to the input torque). The power split mode, the power split transmission coupling 114 can mitigate excess power or shock being applied to the generator. For instance, adjustable torque ratio of the power split transmission coupling 114 can be adjusted so the torque of the output shaft 304 is constant where there can be variation of torque applied to the input shaft 302. In an example, the power split transmission coupling 114 can include a housing. The cam ring 308 and hub 402 can be disposed within the housing. The hydraulic fluid can be included in a cavity between the housing and the cam ring 308, input shaft 302, output shaft 304, or other components for lubrication or coolant.

FIG. 4 is an example of a cross section view of the power split transmission coupling 114 located perpendicular to the input shaft 302 and centered within the hub 402. The cam ring 308 includes the inlet port 404, the outlet port 306, and a cam ring surface 408. The cam ring surface 408 can be an elliptical shape. The inlet port 404 can extend from the outer portion of the cam ring 308 and divide into at least two conduits, each extended to opposite quadrants of the cam ring surface 408 in the example shown in FIG. 4. The outlet port 306 can extend from the outer portion of the cam ring 308 and divide into at least two conduits, each extended to opposite quadrants of the cam ring surface 408 and adjacent to the inlet port quadrants. The inlet port 404 and outlet port 306 can terminate at the cam ring surface 408 forming one or more apertures in the cam ring surface 408. In the example of FIG. 4, the elliptical shape of the cam ring 308 can be symmetrical. Symmetry of the cam ring 308 can balance the forces applied to bearings of the power split transmission coupling 114. For instance, bearings supporting the input shaft 302 and the output shaft 304. Balanced forces can extend the life of the power split transmission coupling 114 as mechanical stress and fatigue are reduced.

The hub 402 can be located at the center axis of the cam ring surface 408. As shown in FIG. 4, the hub 402 can include a circular shape sized to fit within the elliptical shape of the cam ring surface 408. For instance, the hub 402 can be sized with a clearance fit to the cam ring surface 408, such as a precision running fit to allow for the hub 402 to rotate within the cam ring 308 with minimal clearance. The hub 402 can include a plurality of circumferentially spaced slots 410 extended radially outward from the center axis of the hub 402. Each slot 410 can be sized and shaped to support a vane 406 therein. The inner portion of the slot 410 can include a signal passage in communication with a high pressure fluid.

As shown in the example of FIG. 4, the vane 406 can be located within the slot 410. The vanes can be extended radially outward from the center axis of the hub 402 in response to the application of the high pressure fluid to the base 414 of the vane 406 through the signal passage. In an example the high pressure fluid can be high pressure hydraulic fluid. A tip 412 of the vane 406 can contact the cam ring surface 408 in a fully extended position. Each vane 406 can extend and retract throughout the rotational cycle of the hub 402. For instance the tip 412 can be substantially flush with the outer surface 416 of the hub 402 in a first orientation of the hub 402 and then be displaced to a partially extended position or a fully extended position as the hub 402 rotates from the start of a first quadrant to the start of the second quadrant. In the retracted position, the input shaft 302 can be independently rotatable with respect to the output shaft 304.

In an example, the tip 412 can include a roller bearing (referred to herein as a roller vane). The roller vane can decrease friction between the vane 406 and the cam ring surface 408 and can be used in a large scale power split transmission coupling 114 (e.g., 200 kilowatts or greater). Where the hydraulic fluid includes an environmentally friendly or non-flammable fluid (such as water glycol), the roller vane can be used to reduce friction between the vane 406 and the cam ring 308. The vane 406 can also include a coating to reduce friction, increase corrosion resistance, or reduce wear. For instance, the vane 406 can include a diamond-carbon coating or diamond-dust coating to improve the corrosion resistance of the vane 406. The coating can be selected from a variety of coatings to reduce friction where a particular hydraulic fluid is used in the power split transmission coupling 114. The diamond-dust coating can reduce corrosion where water glycol is used in the power split transmission coupling 114.

As previously stated the power split transmission coupling 114 can include a through drive mode and a power split mode. In the through drive mode, the input shaft 302 and the output shaft 304 can include a 1:1 adjustable torque ratio. For instance, the input shaft 302 and the output shaft 304 can rotate together (i.e., at the same angular velocity). The hydraulic fluid between the hub 402 and the cam ring 308 can be pressurized by the power split transmission coupling 114. For instance, where the vane 406 is extended, a pressure can be applied to the hydraulic fluid by the vane 406. Torque is transferred from the hub 402 to the cam ring 308 by the pressurized hydraulic fluid on the cam ring 308. The outlet port 306 can be closed (i.e., deadheading). With the hydraulic fluid trapped within the power split transmission coupling 114, substantially all of the torque from the hub 402 can be transferred to the cam ring 308. The torque applied to the generator 116 can be substantially equal to the torque of the input shaft 302. The power split transmission coupling 114 can operate in the trough drive mode where the power applied to the input shaft 302 is lower than the rated power of the generator 116 (e.g., at low turbine rotor speed). Efficiency of the wind turbine 100 can be maximized by operating the power split transmission coupling 114 in the through drive mode where the turbine rotor power is below the rated power of the generator 116 (e.g., when wind speed is low).

In the power split mode, the outlet port 306 can be open or partially open. Hydraulic fluid can exit the power split transmission coupling 114 through the outlet port 306. The pressure of the hydraulic fluid between the hub 402 and the cam ring 308 can be reduced as a result of the exiting (diverted) hydraulic fluid. Accordingly, less than substantially all of the input shaft 302 torque can be transferred to the output shaft 304. In an example, the volume between vanes 406 in the inlet quadrants of the cam ring 308 increase as the hub 402 rotates within the cam ring 308. The volume between the vanes 406 in the outlet quadrants of the cam ring 308 decrease as the hub 402 rotates within the can ring 308. The increasing volume in the inlet quadrants draws the hydraulic fluid into the power split transmission coupling 114. For instance, the increasing volume can generate a negative pressure that draws hydraulic fluid into the power split transmission coupling 114. The decreasing volume in the outlet quadrants can increase the pressure of the hydraulic fluid, for instance, by compressing the hydraulic fluid. A portion of the hydraulic fluid in the outlet quadrant can be diverted through the outlet port 306 in response to the power transferred from the input shaft 302 to the output shaft 304 exceeding a threshold level (e.g., a maximum rated generator power). The diverted hydraulic fluid can be stored under pressure (e.g., the pressure at which the hydraulic fluid exits the power split transmission coupling 114) and stored in the storage vessel 202. Stated another way, the hydraulic fluid exiting the power split transmission coupling 114 can be high pressure hydraulic fluid.

The adjustable torque ratio of the power split transmission coupling 114 can be adjusted to provide a desired output shaft condition including but not limited to, an output shaft torque, power, rotational speed, or the like. The difference in the torque of the input shaft 302 and the torque of the output shaft 304 is proportional to the volume of high pressure hydraulic fluid diverted from the power split transmission coupling 114. For instance, the outlet port 306 can include an adjustable valve. An orifice of the adjustable valve can be adjusted to increase or decrease the flow rate of fluid flowing through the outlet port 306. Increasing the flowrate of hydraulic fluid through the outlet port 306 can decrease the amount of torque transferred from the input shaft 302 to the output shaft 304. In an example, the extension of the vane 406 can be controlled to achieve the desired output shaft condition. The position of the tip 412 of the vane 406 can be adjusted to a location flush with the outer surface 416 of the hub 402, a location in contact with the cam ring 308, or any location therebetween. The adjustable torque ratio can be controlled by any number of mechanical or electromechanical devices including, but not limited to, an electric motor, servo, flow control valve, mechanical linkage, hydraulic motor, hydraulic system, pneumatic motor, pneumatic system, or the like. In an example, the adjustable torque ration can be controlled by a computer in communication with the electromechanical device.

In an example, the stored hydraulic fluid can be supplied under high pressure to a hydraulic motor 118 to increase the power produced by the generator 116. For instance, where the power applied to the generator rotor 120 is below the maximum rated power of the generator 116, additional power can be supplied to the generator 116 from the hydraulic motor 118. In an example, reducing the power transmitted to the generator rotor 120 can prevent damage to the generator 116 or prevent the oversupply of power to an electric grid and accordingly an undesired increase in the electrical frequency of the grid. In the power split mode, power generated by the turbine rotor 102 is not wasted by reducing the power transmitted to the generator 116. Instead, the excess power is stored as high pressure fluid to be used at another time or location, such as used to provide additional power to the generator 116 when wind speed is low or to provide additional power to another wind turbine operating below maximum production. In an example, the power split transmission coupling 114 can smooth the torque and/or power transmitted from the input shaft 302 to the output shaft 304. For instance, an inconsistent input shaft torque can be converted to a constant output shaft torque by the power split transmission coupling 114. In an example, the energy efficiency of the power split transmission coupling 114 can be 90% or greater. In comparison, a piston pump can have an energy efficiency of only 70%. The power split transmission coupling 114 can operate at power capacities over one megawatt, such as two megawatts, three megawatts, or more.

Figure 5:
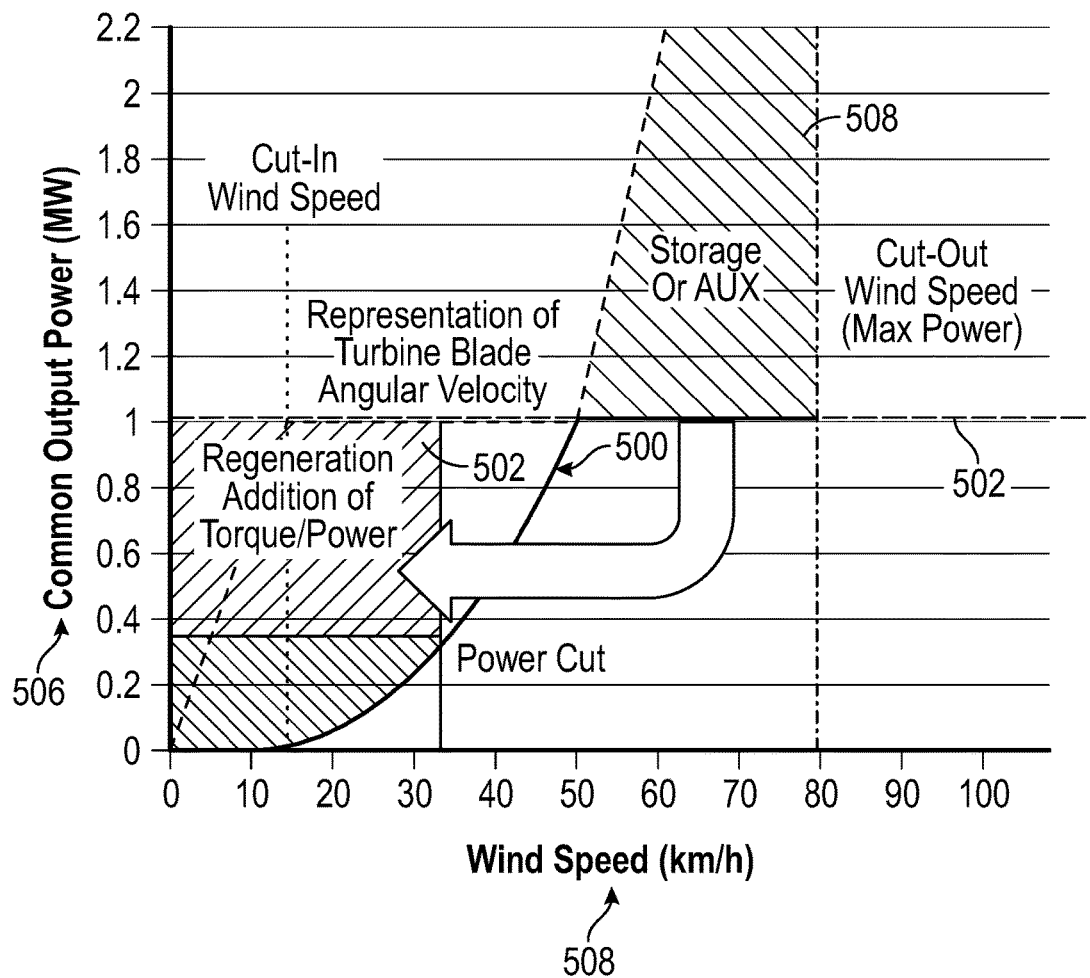
FIG. 5 is a chart depicting one example of the output power of a wind turbine according to wind speed.

FIG. 5 is an example of a chart depicting the power output of the generator 116 of the wind turbine 100. Power curve 500 represents the amount of power produced by the generator 116. The rated power 502 is the maximum power that can be safely produced by the generator (e.g., a one megawatt for the exemplary generator 116 shown). The horizontal axis of the chart represents the wind speed. 504 (i.e., wind loading subjected to the wind turbine 100). As the wind speed 504 increases, the amount of power 506 (represented by the vertical axis) produced by the generator 116 can increase. For instance, the power 506 can increase at a cubic rate as the wind speed 504 increases. As previously stated, the wind speed can be converted to torque by the turbine blades 104 and transmitted to the generator 116 through one or more of the turbine rotor 102, the gearbox 112, or the power split transmission coupling 114. Where the wind speed is sufficient produce power 506 in excess of the rated power 502, the pitch on existing turbine blades can be adjusted or mechanical braking can be applied at a location along the linkage between the rotor 102 and the generator 116 in order to prevent overpowering the generator 116. Accordingly, any power in excess of the rated power 502 (excess power 508) is uncaptured (wasted).

Power exceeding the rated power 502 (i.e., excess power 508) can be captured by including the power split transmission coupling 114 in the wind turbine 100. The turbine rotor 102 can over speed compared to existing wind turbines. Diversion of power to the hydraulic fluid prevents excess power from reaching and damaging the generator 116. The excess power 508 can be stored as high pressure hydraulic fluid and used for regeneration 510. Where wind speed 504 is low and the generator is producing less than rated power 502, the wind turbine 100 can operate in a mode of regeneration 510. In regeneration 510, the stored power of the high pressure hydraulic fluid can be applied to the hydraulic motor 118 to transmit torque to the generator rotor 120. Regeneration 510 provides additional power production where wind speed 504 is too low for production at rated power 502.

In an example, regeneration 510 can increase the overall efficiency of the wind turbine 100. For instance, the wind turbine can operate at rated power 502 for a higher percentage of the wind turbine lifespan. Accordingly, regeneration 510 can result in more viable wind farm locations, in an example, regeneration 510 can produce a consistent amount of power 506. For instance, the power split transmission coupling 114 can mitigate fluctuations in power generation resulting from wind jitter. In an example, excess power 508 (i.e., auxiliary power) can be used for other applications utilizing hydraulic power.

Figure 6:
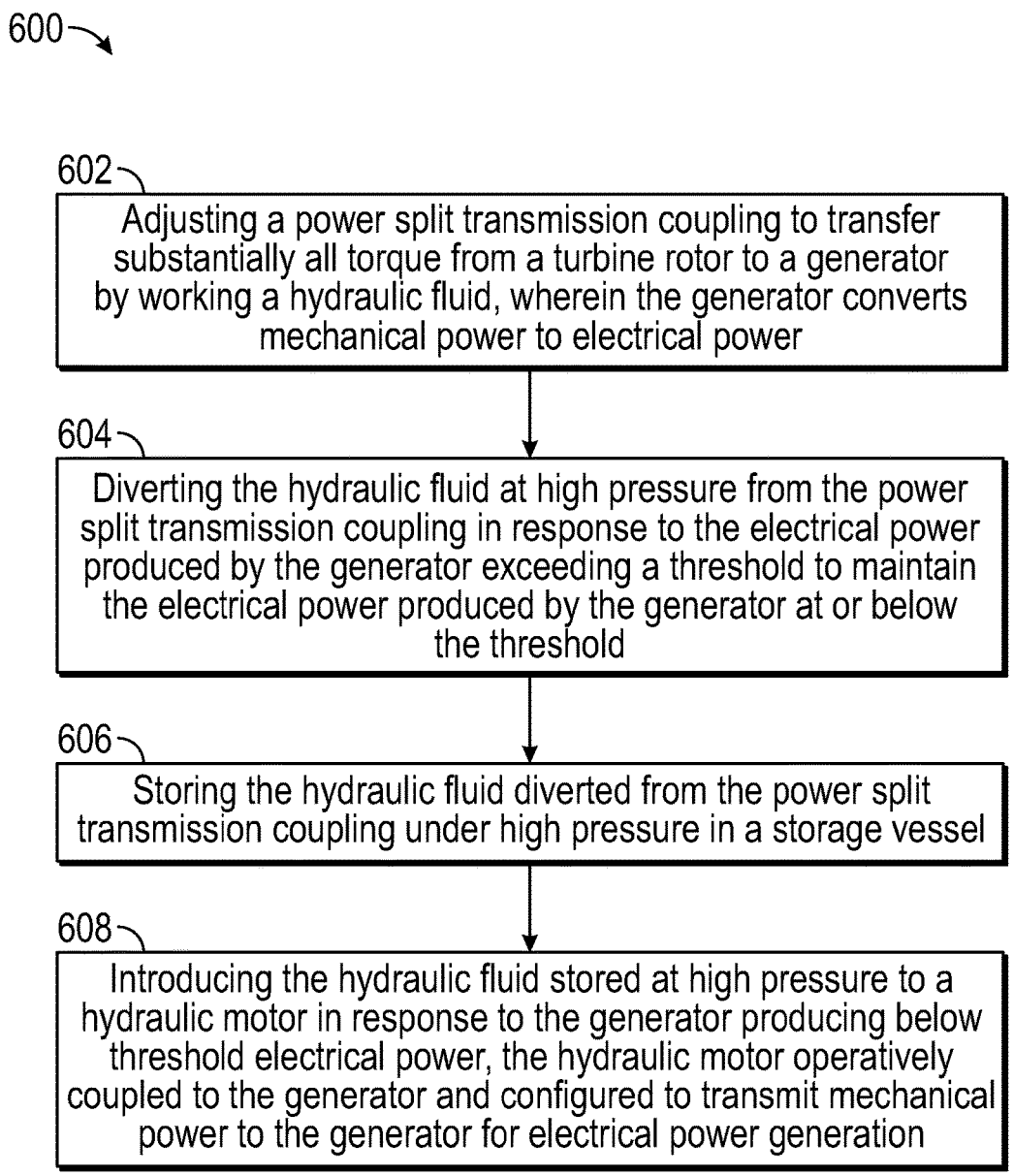
FIG. 6 is a method of operating a wind turbine including power split transmission coupling with a power regeneration mode, according to an embodiment.

FIG. 6 is a diagram of an exemplary method 600 of operating the wind turbine 100 including the power split transmission coupling 114. The method 600 includes power generation and regeneration modes. At 602, the method 600 includes adjusting the power split transmission coupling 114 to transfer substantially all torque from a turbine rotor 102 to the generator 116 by working the hydraulic fluid, wherein the generator 116 converts mechanical power to electrical power. In an example, working the hydraulic fluid includes operating the power split coupling 114 in the through drive mode or power split mode as previously described herein. In an example, working the hydraulic fluid includes applying pressure to the hydraulic fluid by applying torque to the input shaft 302 and generating high pressure hydraulic fluid.

At 604, the method 600 further includes diverting the hydraulic fluid at high pressure from the power split transmission coupling 114 in response to the electrical power produced by the generator 116 exceeding a threshold to maintain the electrical power produced by the generator 116 at or below the threshold. In an example, the threshold power can include, but is not limited to, the rated power 502.

At 606, the hydraulic fluid diverted from the power split transmission coupling 114 under high pressure can be stored in the storage vessel 202. At 608, the hydraulic fluid stored at high pressure can be introduced to the hydraulic motor 118 in response to the generator 116 producing below threshold electrical power. The hydraulic motor 118 can be operatively coupled to the generator 116 and configured to transmit mechanical power to the generator 116 for electrical power generation. For instance, the hydraulic motor 118 can include an output that is coupled to the generator rotor 120.

Figure 7:
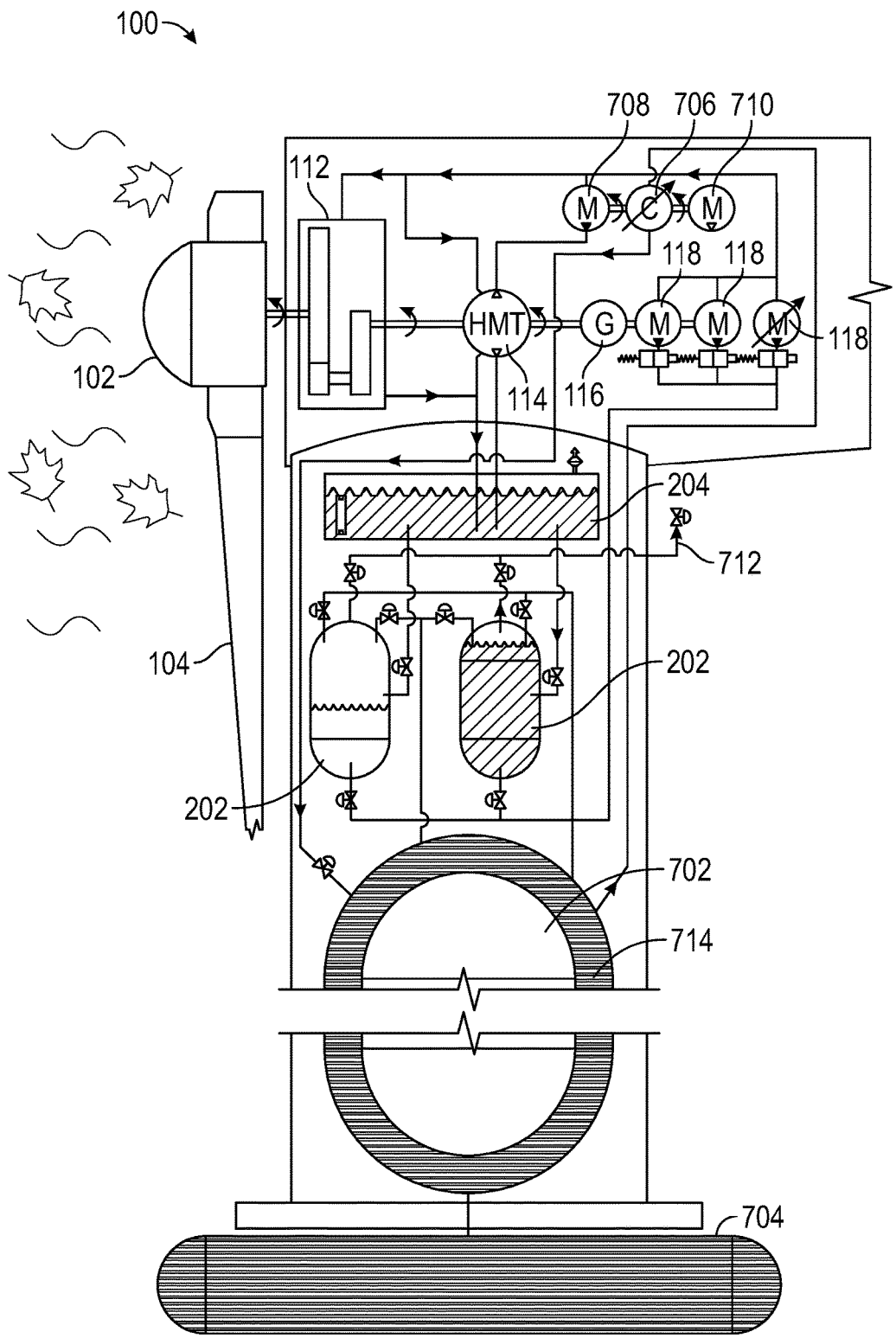
FIG. 7 is a system diagram of a wind turbine including a plurality of storage vessels, a high pressure chamber, and an auxiliary pressure source according to an embodiment.

FIG. 7 is a system diagram of an exemplary wind turbine 100 including at least one storage vessel 202, a high pressure chamber 702, and an auxiliary pressure source 704. As shown in FIG. 7, the wind turbine 100 can include two storage vessels 202. In an example, high pressure hydraulic fluid can be diverted from the power split transmission coupling 114 to each of the storage vessels 202. One storage vessel 202 can be filled or pressurized while another storage vessel 202 is releasing high pressure hydraulic fluid (e.g., for regeneration 510). In an example, each storage vessel 202, can be filled or releasing high pressure hydraulic fluid simultaneously. In an example, each of the storage vessels 202 can operate independently. For instance, each storage vessel 202 can be in a state of filling, charging (pressurizing), storing, or releasing high pressure hydraulic fluid.

Compressed gas can be supplied to the storage vessel 202 to maintain or increase the pressure of the high pressure hydraulic fluid. For instance, the high pressure hydraulic fluid can be stored at 20 bar, 100 bar, 300 bar, or other pressure greater than atmospheric pressure. In an example, the storage vessel can be vented to atmospheric pressure and filled with hydraulic fluid from the reservoir 204. The hydraulic fluid can be pressurized by the compressed gas.

The high pressure chamber 702 and the auxiliary pressure source 704 can store compressed gas (high pressure gas), such as air or nitrogen. The compressed gas can be stored at pressures above atmospheric pressure. In an example, the compressed gas can be stored at 100 bar, 200 bar, 300 bar, or higher. The compressed gas can be pressurized by a compressor 706. The compressor 706 can include a piston compressor, rotary screw compressor, centrifugal compressor, or the like. In an example, the compressor 706 can be powered by the high pressure hydraulic fluid. For instance, high pressure hydraulic fluid exiting the power split transmission coupling 114 can be diverted to a hydraulic compressor motor 708. The hydraulic compressor motor 708 can provide mechanical power to drive the compressor 706. In an example, the compressor 706 can be powered by an electric motor 708.

In an example, a first storage vessel 202 can be vented to atmospheric pressure by a release valve 712. Hydraulic fluid (e.g., water glycol) can flow through conduit coupled from the reservoir 204 to the first storage vessel 202 filling the first storage vessel 202. Compressed gas can flow from the high pressure chamber 702 to the first storage vessel 202. The compressed gas can raise the pressure of the hydraulic fluid stored in the first storage vessel 202 (i.e., pressurize the hydraulic fluid). The second storage vessel 202 can include a mixture of high pressure hydraulic fluid (pressurized hydraulic fluid) and compressed gas. High pressure hydraulic fluid can be released from the second storage vessel 202 and transported to one or more hydraulic motors 118 for regeneration 510. Where the second storage vessel 202 is releasing high pressure hydraulic fluid, the high pressure chamber 702 can supply compressed gas to maintain the pressure of the high pressure hydraulic fluid within the second storage vessel 202. Where the first storage vessel 202 is full, the release valve 712 can be closed and compressed gas can be introduced to the first storage vessel 202. The compressed gas can pressurize the hydraulic fluid in the first storage vessel 202. The first and second storage vessels 202 can release high pressure hydraulic fluid for regeneration 510 or another working purpose. The high pressure chamber 702 can supply compressed gas to the first and second storage vessels 202 to maintain the high pressure hydraulic fluid in each storage vessel 202. Where the second hydraulic storage vessel 202 has been depleted of high pressure hydraulic fluid, the release valve 712 can open the second storage vessel 202 to atmospheric pressure. Hydraulic fluid from the reservoir 204 can be supplied to the second storage vessel 202. The first storage vessel 202 can release high pressure hydraulic fluid while the second storage vessel 202 is being filled. Where the second storage vessel is filled with hydraulic fluid, compressed gas can be supplied to the second storage vessel 202 to pressurize the hydraulic fluid. This exemplary cycle can be repeated during operation of the wind turbine 100.

The auxiliary pressure source 704 can include, but is not limited to, an additional compressed gas storage vessel. In an example, the additional compressed gas can be pressurized from a geothermal or tidal energy source. For instance, an auxiliary turbine can be powered by steam from a geothermal source or from tidal current pressure. The auxiliary turbine can be coupled to a compressor, such as compressor 706 or another compressor. The auxiliary pressure source 704 can be coupled to the high pressure chamber 702 to supply compressed gas to the high pressure chamber 702. The auxiliary pressure source 704 can increase the efficiency of the wind turbine 100 by utilizing alternative power sources to pressurize the compressed gas and the high pressure hydraulic fluid. In an example, the auxiliary pressure source 704 can be buried underground to increase the safety of storing the high pressure compressed gas.

In an example, the wind turbine 100 can include a super charge chamber 714. The compressed gas remaining in the storage vessel 202 upon the depletion of the high pressure hydraulic fluid can be released to the super charge chamber 714. The gas in the super charge chamber 714 can be stored at a pressure between atmospheric and the pressure of the gas in the high pressure chamber 702. In an example, the gas in the super charge chamber 714 can be further pressurized by the compressor 706 and returned to the high pressure chamber 702.

Figure 8:
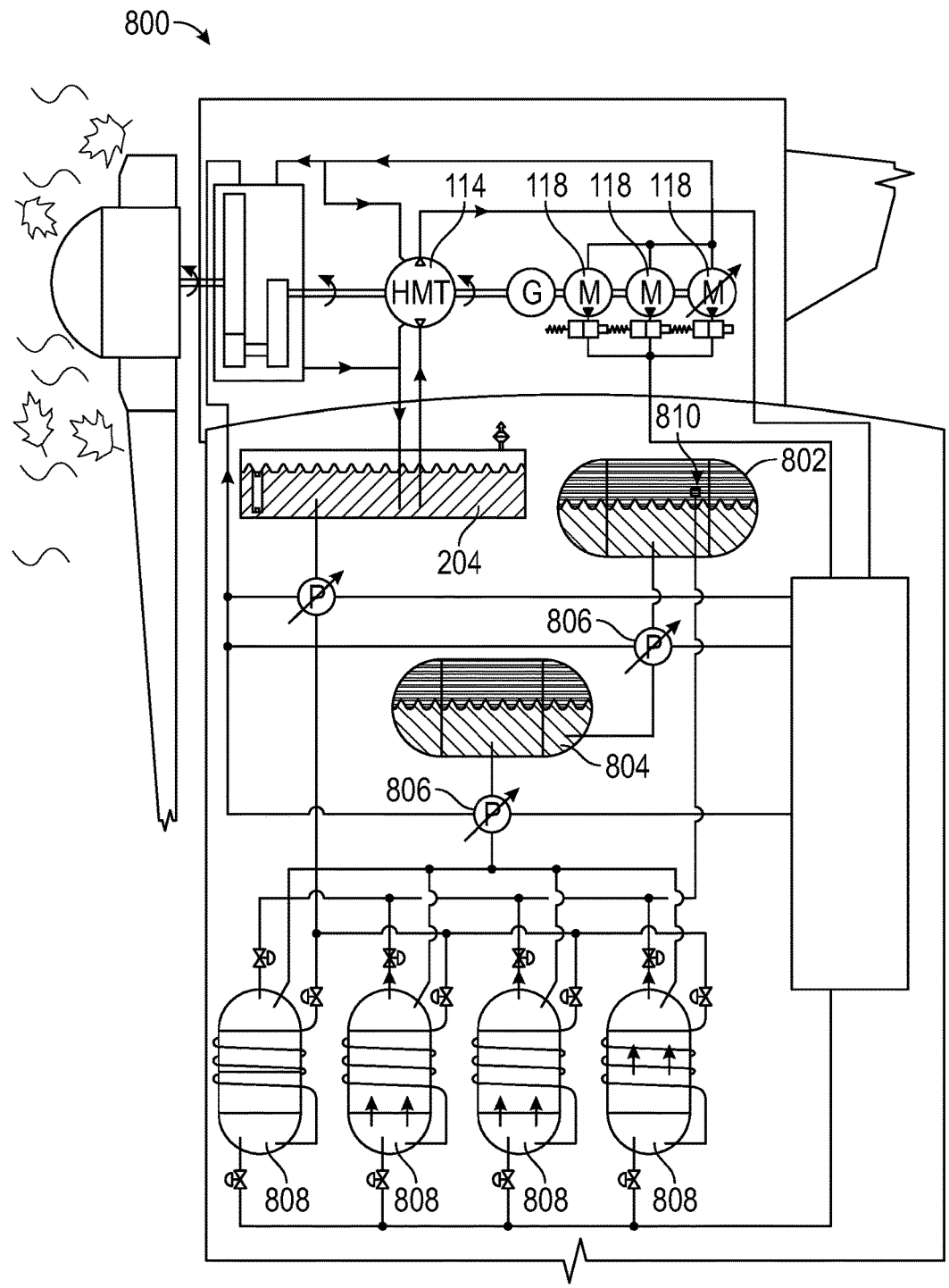
FIG. 8 is a system diagram of wind turbine including one or more cyclic gas work chambers and a condenser for charging the storage vessel with nitrogen according to an embodiment.

FIG. 8 depicts an exemplary system diagram of a wind turbine 800 including a thermodynamic liquid nitrogen cycle for compressing the hydraulic fluid. In the example of FIG. 8, the wind turbine 800 can include a condenser 802, a liquid storage chamber 804, at least one hydraulic pump 806, one or more accumulators 808, and a throttling valve 810 coupled together in series to form a circuit. The hydraulic fluid can be diverted from the power split transmission coupling 114 to the one or more accumulators 808. Liquid nitrogen can also be transported to the one or more accumulators 808. The liquid nitrogen can be supplied to the accumulator 808 under higher than atmospheric pressure and at a temperature below a boiling point of liquid nitrogen. The temperature of the liquid nitrogen can rise in the accumulator 808 and the liquid nitrogen can evaporate in to a gas phase. In an example, hydraulic fluid from the reservoir 204 can be circulated around the accumulator 808 to transfer heat to the accumulator 808 and to the liquid nitrogen accordingly to facilitate the nitrogen phase change. In an example, heat from a geothermal source can be transferred to the liquid nitrogen in the accumulator 808, for instance, by using a heat exchanger. Expansion of the liquid nitrogen to nitrogen gas can pressurize the hydraulic fluid.

For instance, energy from a phase transition of the nitrogen can be transferred to the hydraulic fluid. As a result, high pressure hydraulic fluid from within the accumulator 808 can be supplied to the one or more hydraulic motors 118 for regeneration 510 or another hydraulic working purpose.

Where the hydraulic fluid is depleted from the accumulator 808, the nitrogen gas can be released from the accumulator 808 and transported to the throttling valve 810. As shown in FIG. 8, the throttling valve 810 can be mounted to the condenser 802 and the exit of the throttling valve 810 can open into the condenser 802. According to the Joule-Thompson effect, the nitrogen gas can condense and cool (e.g., to 77 to 90 k) to liquid nitrogen (e.g., at 0.13 to 1 bar) as a result of the expansion of the nitrogen gas exiting the throttling valve 810. Liquid nitrogen can be stored at much lower pressures than nitrogen gas (e.g., 0.13 to 20 bar) thereby reducing the structural requirements for storing the nitrogen. Liquid nitrogen also occupies less volume than nitrogen gas reducing the amount of gas for operating the wind turbine 800. The pump 806 can transfer the liquid nitrogen from the condenser 802 to the liquid storage chamber 804 (e.g., between 1 bar to 20 bar and 90 k to 120 k). The liquid storage chamber 804 can hold the liquid nitrogen until it can be used for pressurizing the hydraulic fluid in the accumulator 808. Another pump 806 can supply the liquid nitrogen from the liquid storage chamber to the accumulator 808. In an example, a lower volume of hydraulic fluid can be used as a result of the inclusion of the liquid nitrogen cycle in the wind turbine 800.

Figure 9:
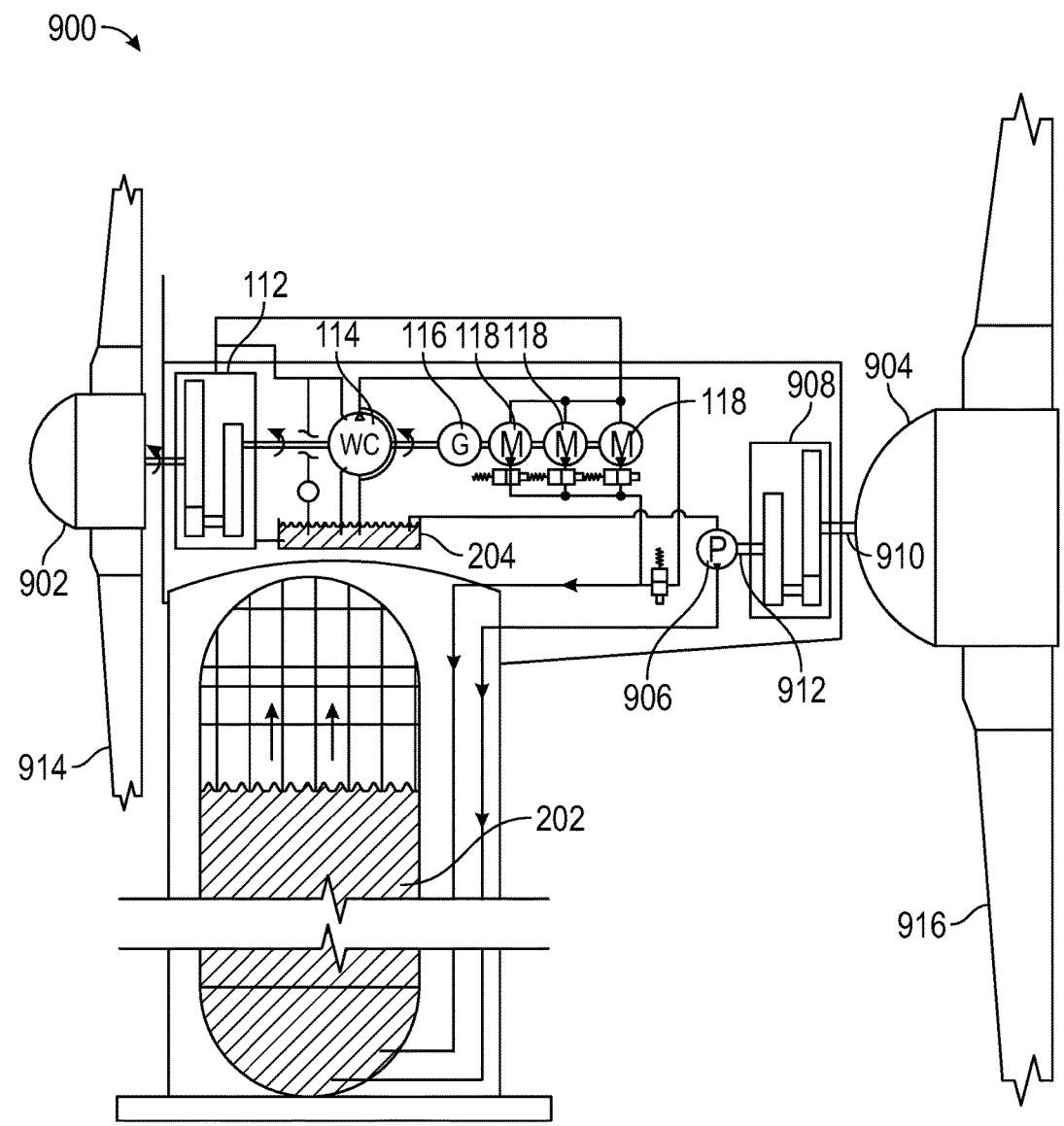
FIG. 9 is a system diagram of a wind turbine including more than one turbine rotor, according to an embodiment.

FIG. 9 is an example of a wind turbine 900 including a first turbine rotor 902 and a second turbine rotor 904. The first turbine rotor 902 can be coupled to a first end (e.g., front) of the nacelle 106. As shown in the example of FIG. 9, the second turbine rotor 904 can be coupled to a second end (e.g., rear) of the nacelle 106. The wind turbine 900 can include a gearbox 112, power split transmission coupling 111, generator 116, one or more hydraulic motors 118, a reservoir 204, and a storage vessel 202 as previously described herein. The first turbine rotor 902 can be coupled to the generator 116 via the one or more linkages (rotary shafts). The gearbox 112 and the power split transmission coupling 114 can be operatively coupled to the one or more linkages between the turbine rotor 102 and the generator 116. The power split transmission coupling 114 can divert hydraulic fluid under high pressure to the storage vessel 202. The hydraulic fluid stored under high pressure can be used for auxiliary power purposes including, but not limited to, supplying high pressure hydraulic fluid to a hydraulic motor 118 for power generation or regeneration 510, pumping fluid, supplying cooling fluid to components of the wind turbine 900, or powering other machinery.

The second turbine rotor 904 can provide mechanical power to an auxiliary hydraulic pump 906. The second turbine rotor 904 can be coupled to the auxiliary hydraulic pump 906 through a second gearbox 908. The second gearbox 908 can be coupled to a second turbine rotor shaft 910 at an input of the gearbox 908 and coupled to an auxiliary hydraulic pump shaft 912 at an output of the gearbox 908. The gearbox can adjust the rotational speed and/or torque of the auxiliary hydraulic pump shaft 912 with respect to the second turbine rotor shaft 910. For instance, the rotational speed or torque of the auxiliary hydraulic pump shaft 912 can be ratio of the second turbine rotor shaft 912, such as a higher, lower, or equal speed or torque of the second turbine rotor shaft 912. The auxiliary hydraulic pump 906 can pressurize hydraulic fluid from the reservoir 204 and deliver high pressure hydraulic fluid to the storage vessel 202. In an example, the auxiliary hydraulic pump 906 can provide high pressure hydraulic fluid to be used for regeneration 510 or other purpose.

In an example, the first turbine blades 914 can be shorter than the second turbine blades 916. For instance, the first turbine blades can be 65 meters long and the second turbine blades can be 105 meters long. The second turbine blades 916 can capture wind energy that is not absorbed by the first turbine blades 914. The first turbine blades 914 and second turbine blades 616 can be configured for increased efficiency and can be specially configured for each wind turbine 900 and location. The length of the first turbine blades 914 and the second turbine blades can include, but is not limited to, 10, 30, 60, 80, 100, 120, or 140 meters long. The distance between the first turbine rotor 902 and the second turbine rotor 904 can be configured for improved energy capture from the wind stream. In an example, incorporation of the second turbine rotor 904 can improved the efficiency of the wind turbine 900. Without the second turbine rotor 904 the average power output from the wind turbine 900 can be about thirty-percent of the rated power. With the addition of the second turbine rotor 904, the average power output of the wind turbine 900 can be about fifty-percent of the rated power. The cost of adding the second turbine rotor 904 to the wind turbine 900 can be low in proportion to the additional power output gained.

Figure 10:
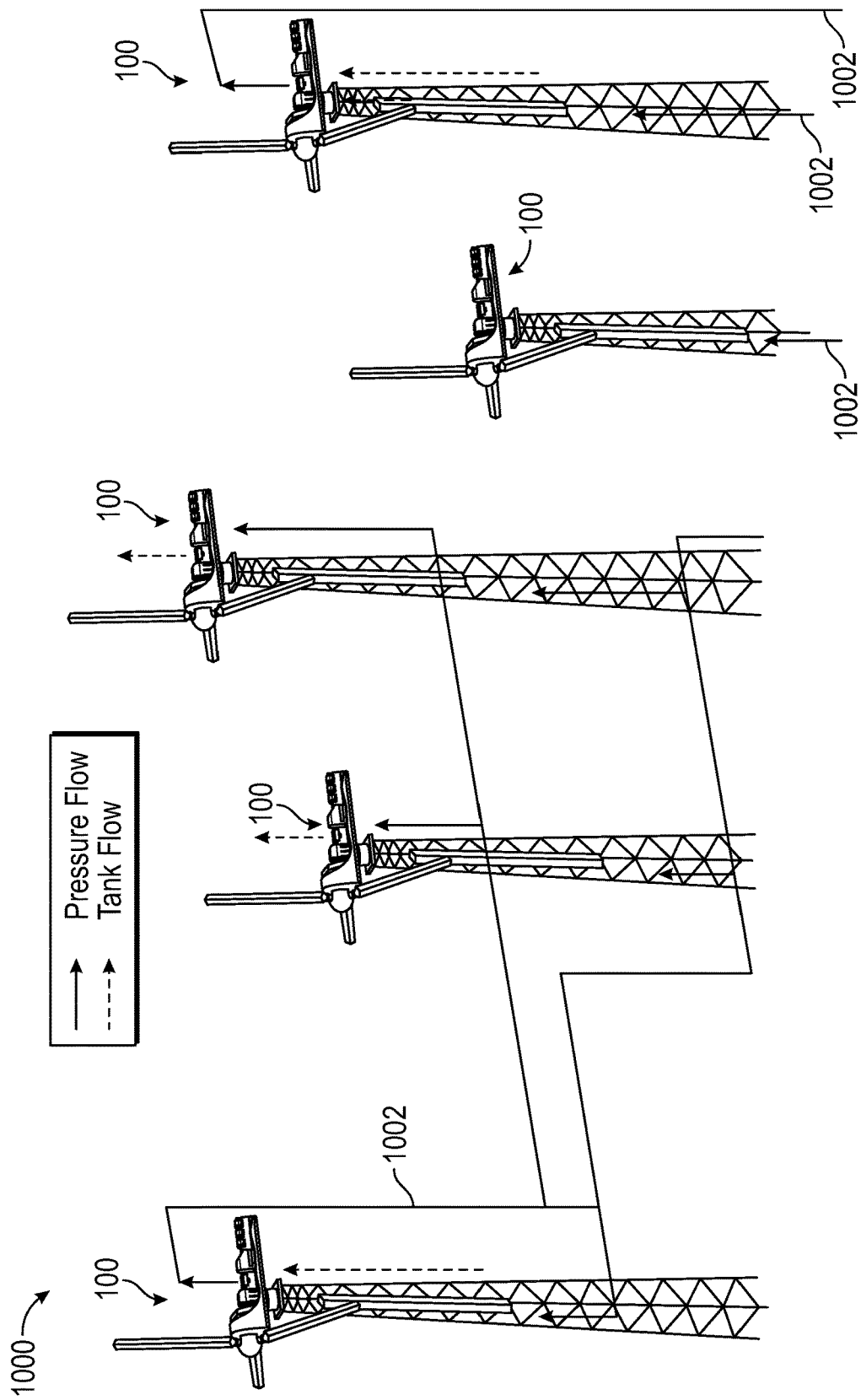
FIG. 10 is a diagram of a network of wind turbines, wherein one or more wind turbines are interconnected to at least one other wind turbine with a pressure communicating line.

FIG. 10 is a network 1000 of wind turbines 100 including pressure communicating lines 1002 coupling the hydraulic motor 118 of one wind turbine 100 to a high pressure fluid source of another wind turbine 100. For instance, the high pressure fluid source can include, but is not limited to, a storage vessel 202, high pressure chamber 702, auxiliary pressure source 704, super charge chamber 714, condenser 802, liquid storage chamber 804, accumulator 808, or other. In the example of FIG. 10, there are at least two wind turbines 100, each wind turbine 100 can be hydraulically coupled to at least one other wind turbine 100, wherein the diverted hydraulic fluid from at least one wind turbine 100 can be stored at high pressure. The high pressure hydraulic fluid can be transferable to the hydraulic motor 118 of at least another wind turbine 100 for producing electrical power.

The wind turbine 100 within network 1000 can operate in various modes. For instance, the wind turbine 100 can be generating power, storing power (e.g., by accumulation of high pressure hydraulic fluid), regenerating power (e.g., by providing high pressure hydraulic fluid to at least one hydraulic motor 118), sliming power (e.g., by transferring stored high pressure hydraulic fluid to another wind turbine 100), or any combination thereof. In an example, at low wind loadings, the generator 116 can be disengaged from the turbine rotor 102. The storage vessel of that wind turbine 100 can then be utilized for storing high pressure hydraulic fluid. The stored high pressure hydraulic fluid (i.e., power) can be transmitted to at least one other wind turbine 100. The other wind turbine 100 can operate at rated power 502, maximum efficiency, or both. In other words, wind turbines 100 with excess power generation can divert power (i.e., high pressure hydraulic fluid) to other wind turbines 100 operating below rated power and accordingly provide higher electrical generation within a network 1000 of wind turbines 100.

FIGS. 11-18 and FIGS. 19-32 draw upon the apparatuses, systems, networks, methods and techniques previously described and contemplate further system functionality modes. Traditional high pressure hydraulic accumulators require high volumes of fluid to store large amounts of energy. The disclosed systems and techniques greatly reduce fluid volumes as low compressibility can require relatively large reservoirs. By redirecting fluid into other chambers where work can be done at a later time. Additionally, the fluid required for the systems can be greatly reduced. Thus, the current inventor contemplates the use of intensifiers which can allow gas pressures to be relatively higher. These intensifiers can increase pressures that are typically reduced due to the gas expansion in staging and reciprocating regenerating modes. Thus, energy is stored in the expandable gas and by achieving higher pressures, power density can be increased. As will be discussed below, intensifiers include that the fluid can simply be re-used in different chambers or reciprocated between two or more chambers rather than returned to reservoirs.

As used below and previously, the power split transmission (e.g., item 114 of FIG. 1) may be referred to as the fluid coupling/torque amplifier. However, it should be noted that the term torque amplifier describes only one use of this apparatus (amplification). Instead of the hydraulic power being used for amplification it can used as hydraulic power to be used for any practical purpose such as in the techniques and systems described subsequently.

It should also be noted that the wind turbine system examples described herein are only one of many applications that can utilize the disclosed systems and techniques. For example, hydraulic hybrid vehicles could benefit from and utilize the disclosed systems and techniques. In such hybrid vehicles, low volumes of fluid can be re-used with higher pressure gas chamber to reduce weight for a given power density. For example 20 liters of fluid could be staged or reciprocated 10 times making it equivalent to 200 liters with traditional accumulators.

Figure 11:
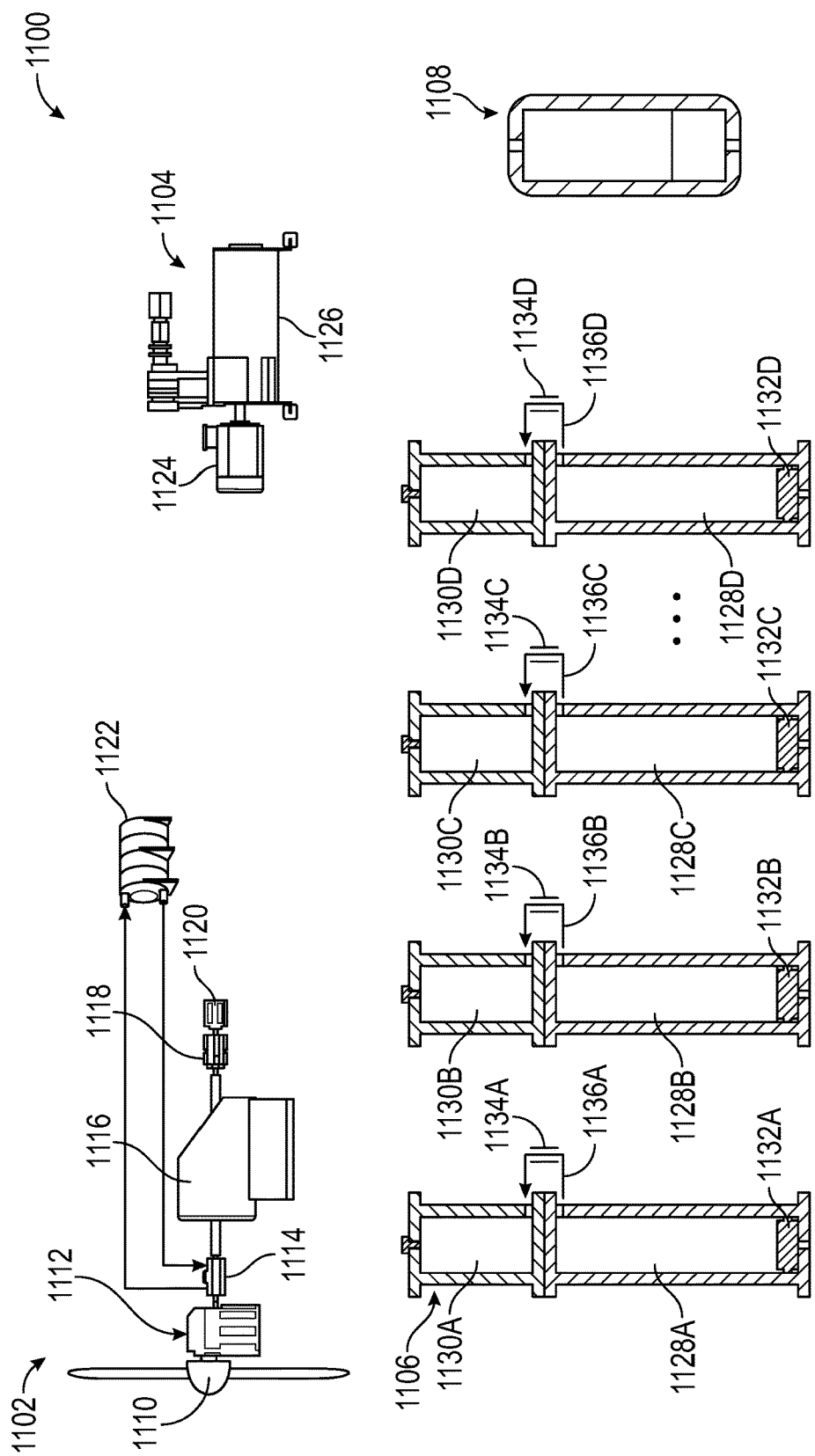
FIG. 11 is a diagram of a first system according to one example embodiment that includes various wind turbine components and additional subsystems and apparatuses to provide staging and reciprocating hydraulic power regeneration.

FIG. 11 shows a system 1100 according to an example of the present application. The system 1100 can include a first subsystem 1102 such as for a gas turbine as previously described in prior examples. The system 1100 can in some cases further include a second subsystem 1104, a third subsystem 1106 and a higher pressure gas chamber 1108. As previously described in reference to previous Figures, the first subsystem 1102 can include a turbine 1110, a gearbox 1112, a power split transmission 1114, a generator 1116, a motor 1118, a makeup pump 1120 and a hydraulic reservoir 1122. The second subsystem 1104 can include a motor 1124 and a compressor 1126. The third subsystem 1106 can include a plurality of hydraulic fluid/lower pressure gas reservoirs 1128A, 1128B, 1128C and 1128D and a plurality of intermediate pressure gas reservoirs 1130A, 1130B, 1130C and 1130D. The third system 1106 can additionally include pistons 1132A, 1132B, 1132C and 1132D and valves 1134A, 1134B, 1134C and 1134D.

The communication between various subsystems and apparatuses of the system 1100 will be described in further detail with reference to FIGS. 12-18. Although the plurality of hydraulic fluid/lower pressure gas reservoirs 1128A, 1128B, 1128C and 1128D and the plurality of intermediate pressure gas reservoirs 1130A, 1130B, 1130C and 1130D illustrated in close proximity (e.g. abutting) in the examples provided in FIGS. 11-18 such need not be the case. Having the two components of the third subsystem 1106 remote from one another is also contemplated herein.

The hydraulic fluid/lower pressure reservoirs 1128A, 1128B, 11280 and 1128D can comprise a plurality of accumulators (or part of a single accumulator having chambers for example) as previously described herein, and thus, together the hydraulic fluid/lower pressure reservoirs 1128A, 1128B, 11280 and 1128D can in some cases comprise a portion or all of the hydraulic reservoir 1122. In other examples such as those of FIGS. 11-18, the hydraulic fluid/lower pressure reservoirs 1128A, 1128B, 11280 and 1128D can be used in addition to the hydraulic reservoir 1122. Although four hydraulic fluid/lower pressure reservoirs 1128A, 1128B, 1128C and 1128D and four intermediate pressure gas reservoirs 1130A, 1130B, 1130C and 1130D are illustrated in the example provided, the number can vary as desired according to the application for the system 1100, for example.

Valves 1134A, 1134B, 1134C and 1134D can be arranged along communication lines 1136A 1136B, 11360 and 1136D between the hydraulic fluid/lower pressure reservoirs 1128A, 1128B, 11280 and 1128D and the plurality of intermediate pressure gas reservoirs 1130A, 1130B, 1130C and 1130D. The pistons 1132A, 1132B, 1132C and 1132D can reside in the hydraulic fluid/lower pressure reservoirs 1128A, 1128B, 1128C and 1128D and can separate hydraulic fluid from gas as will be described subsequently.

Figure 12:
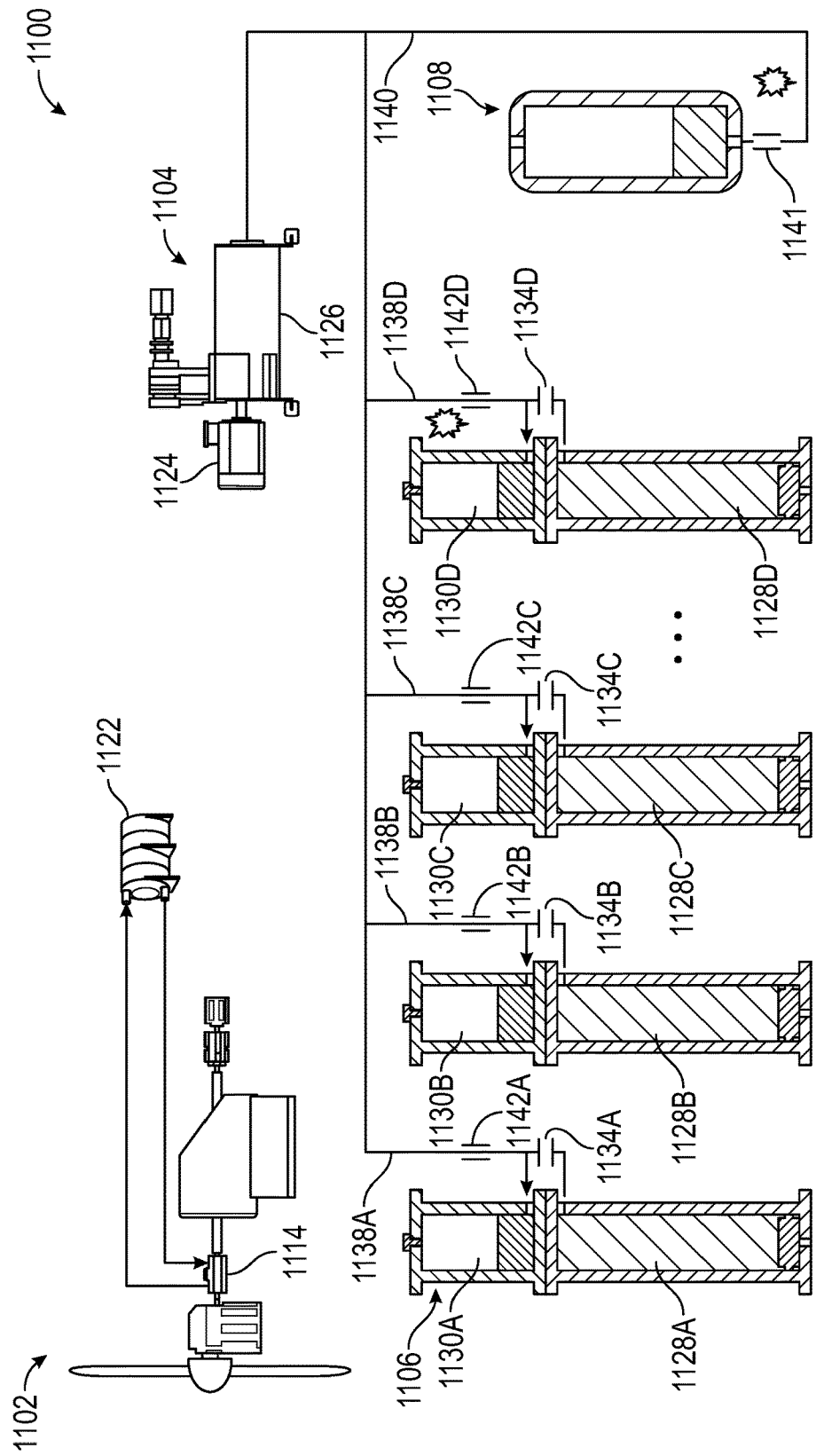
FIG. 12 is a diagram of the system of FIG. 11 operating in a charging mode to provide gas at various pressures to various chambers/reservoirs.

FIG. 12 shows the system 1100 with subassemblies 1102, 1104, 1106 and apparatuses as previously described in a charging mode where the higher pressure gas chamber 1108 and the intermediate pressure gas reservoirs 1130A, 1130B, 1130C and 1130D can be filled with pressurized gas to an intermediate pressure. Such gas in the higher pressure gas chamber 1108 can have a pressure of 350 Bar according to one example. However, other pressures are contemplated. Such charging can be accomplished, for example, with excess energy generated from wind or via vehicle braking. Such charging can additionally include using the power split transmission 1114 as previously described to communicate hydraulic fluid to the hydraulic reservoir 1122 as illustrated and previously described. FIG. 12 illustrates the hydraulic fluid/lower pressure reservoirs 1128A, 1128B, 1128C and 1128D as being filled with a gas to a lower pressure (e.g., at 10 Bar). Again, although 10 Bar is used, such use is exemplary and other pressures are contemplated. Similarly, the example of FIG. 12 shows the plurality of intermediate pressure gas reservoirs 1130A, 1130B, 1130C and 1130D as being filled with gas to an intermediate pressure (e.g., at 210 Bar). Again, although 210 Bar is used, such use is exemplary and other pressures are contemplated.

According to the example of FIG. 12, the excess power can be used to drive the compressor 1126 such as directly via a shaft or via the motor 1124, which can be powered by the generator, for example. The compressor 1126 is arranged to communicate (along communication lines 1138A, 1138B, 1138C and 1138D with the plurality of intermediate pressure gas reservoirs 1130A, 1130B, 1130C and 1130D and additionally can communicate with the higher pressure chamber 1108 via communication line 1140 through valve 1141. During this portion of the charging mode, valves 1134A, 1134B, 1134C and 1134D can be closed such that pressure within the hydraulic fluid/lower pressure reservoirs 1128A, 1128B, 1128C and 1128D (at lower pressure) is not filled with gas pressurized by the compressor and does not communicate with the plurality of intermediate pressure gas reservoirs 1130A, 1130B, 1130C and 1130D.

Valves 1142A, 1142B, 1142C and 1142D are disposed along communication lines 1138A, 1138B, 1138C and 1138D and are illustrated as being opened to allow for gas to begin to fill the intermediate pressure gas reservoirs 1130A, 1130B, 1130C and 1130D to the intermediate pressure. Valve 1140 can additionally be opened to allow gas to fill the higher pressure chamber 1108 to the higher pressure. Although illustrated as occurring simultaneously in FIG. 12, such filling can be accomplished sequentially as desired. For example, the hydraulic fluid/lower pressure reservoirs 1128A, 1128B, 11280 and 1128D can be filled with a gas to a lower pressure then the intermediate pressure gas reservoirs 1130A, 1130B, 1130C and 1130D can be filled with gas to the intermediate pressure (this can occur sequentially with first 1130A filled then 1130B filled, etc.) and then the higher pressure chamber 1108 can be filled with the gas to the higher pressure.

Although not illustrated, the valves disclosed herein can be controlled to regulate in manners know in the art such as by a master control valve. Such master control valve can include several valves such as a block dedicated to control of the gas valves and a second block dedicated to control of hydraulic fluid valves.

Figure 13:
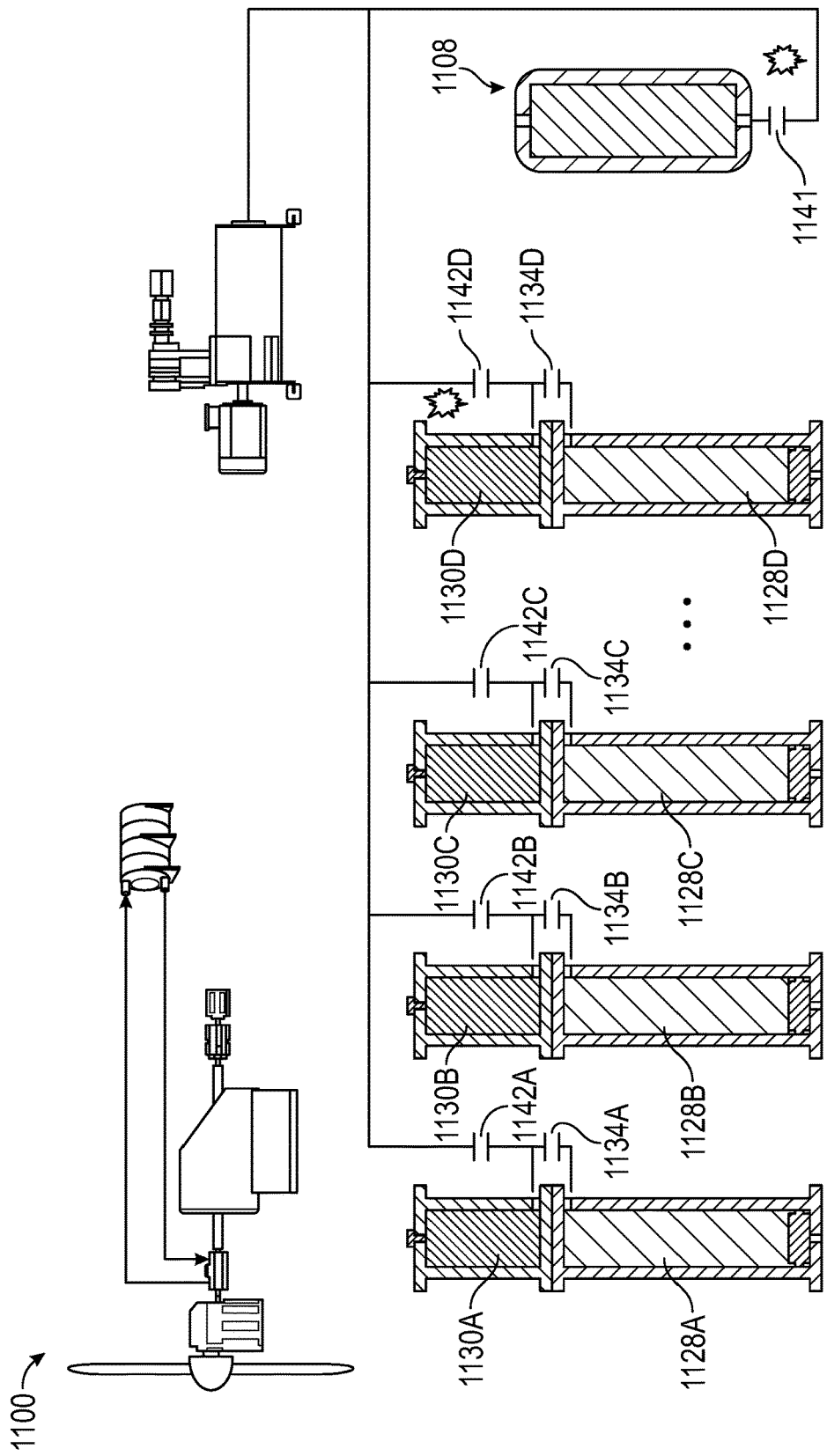
FIG. 13 is a diagram of the system of FIG. 11 fully charged.

FIG. 13 shows a mode of operation of the system 1100 where all of the higher pressure chamber 1108, the intermediate pressure gas reservoirs 1130A, 1130B, 1130C and 1130D, and the hydraulic fluid/lower pressure reservoirs 1128A, 1128B, 1128C and 1128D are fully charged with gas at various pressure levels. Again, this state was accomplished due to the excess power generated for example by excess wind, regenerative breaking, etc. All of the valves 1141, 1142A, 1142B, 1142C, 1142D, 1134A, 1134B, 1134C and 1134D can be shut in this condition. When all the chambers/reservoirs have been fully charged, the excess energy can be used to pressure intensify the gas in the higher pressure chamber 1108. In some cases, gas from the lower pressure reservoirs can be intensified from the intermediate pressure reservoirs and gas from the intermediate pressure reservoirs can be intensified from the higher pressure chamber 1108. The gas in the higher pressure chamber 1108 can be further intensified.

Figure 14:
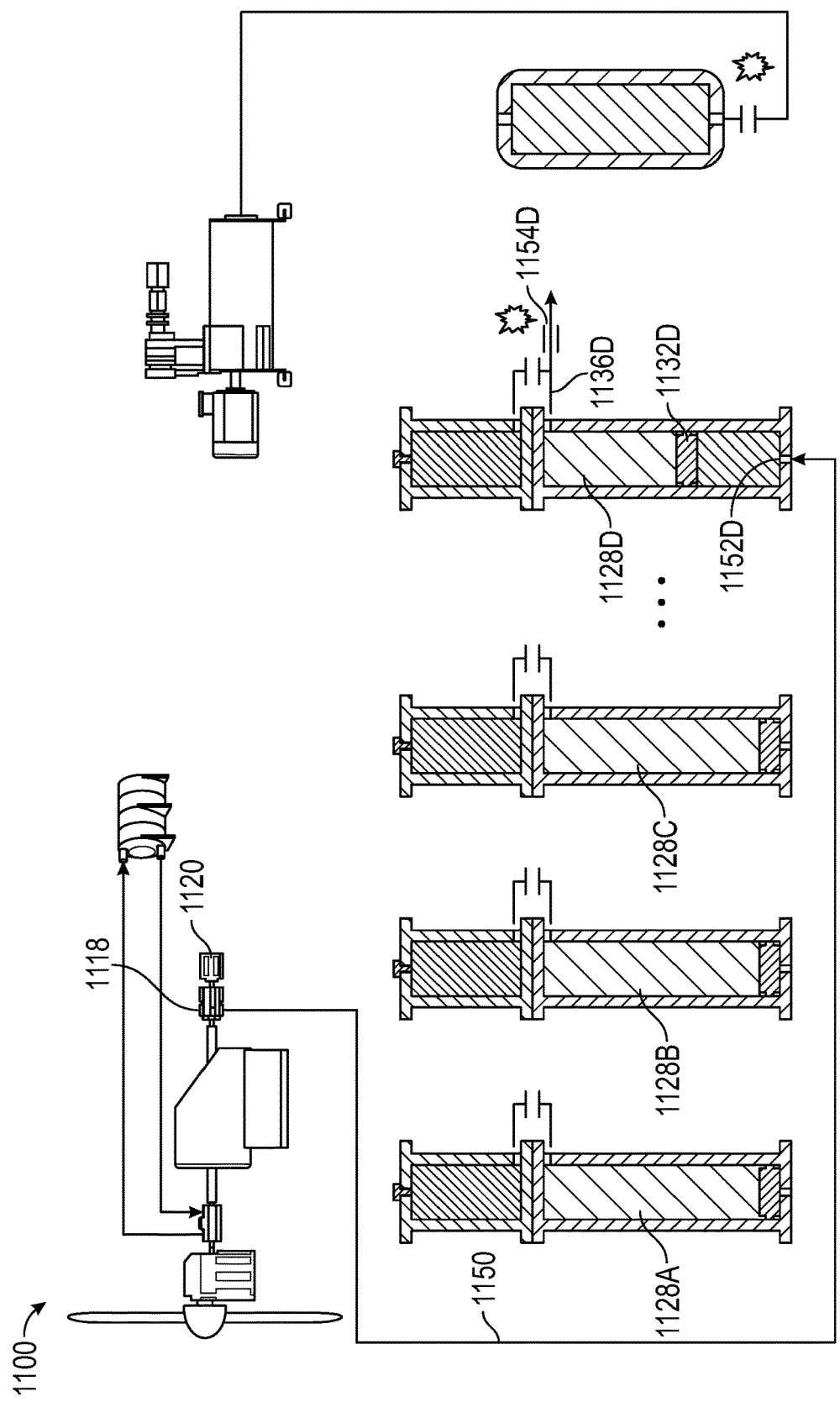
FIG. 14 is a diagram of the system of FIG. 11 using one of the chambers/reservoirs to house hydraulic fluid utilized by components of the wind turbine.

FIG. 14 shows a mode of operation of the system 1100 where return oil (hydraulic fluid) from the motor 1118 and makeup pump 1120 can be stored in one of the hydraulic fluid/lower pressure reservoirs 1128A, 1128B, 1128C and 1128D (e.g. reservoir 1128D). In such case, the return oil is pumped along communication line 1150 to the reservoir 1128D through a port 1152D to displace the piston 1132D. The displacement of the piston 1132D can cause the lower pressure gas to exit the second end of the reservoir 1128D via the communication line 1136D and through an opened valve 1154D to the atmosphere, another subsystem, apparatus or system (not shown), for example.

Figure 15:
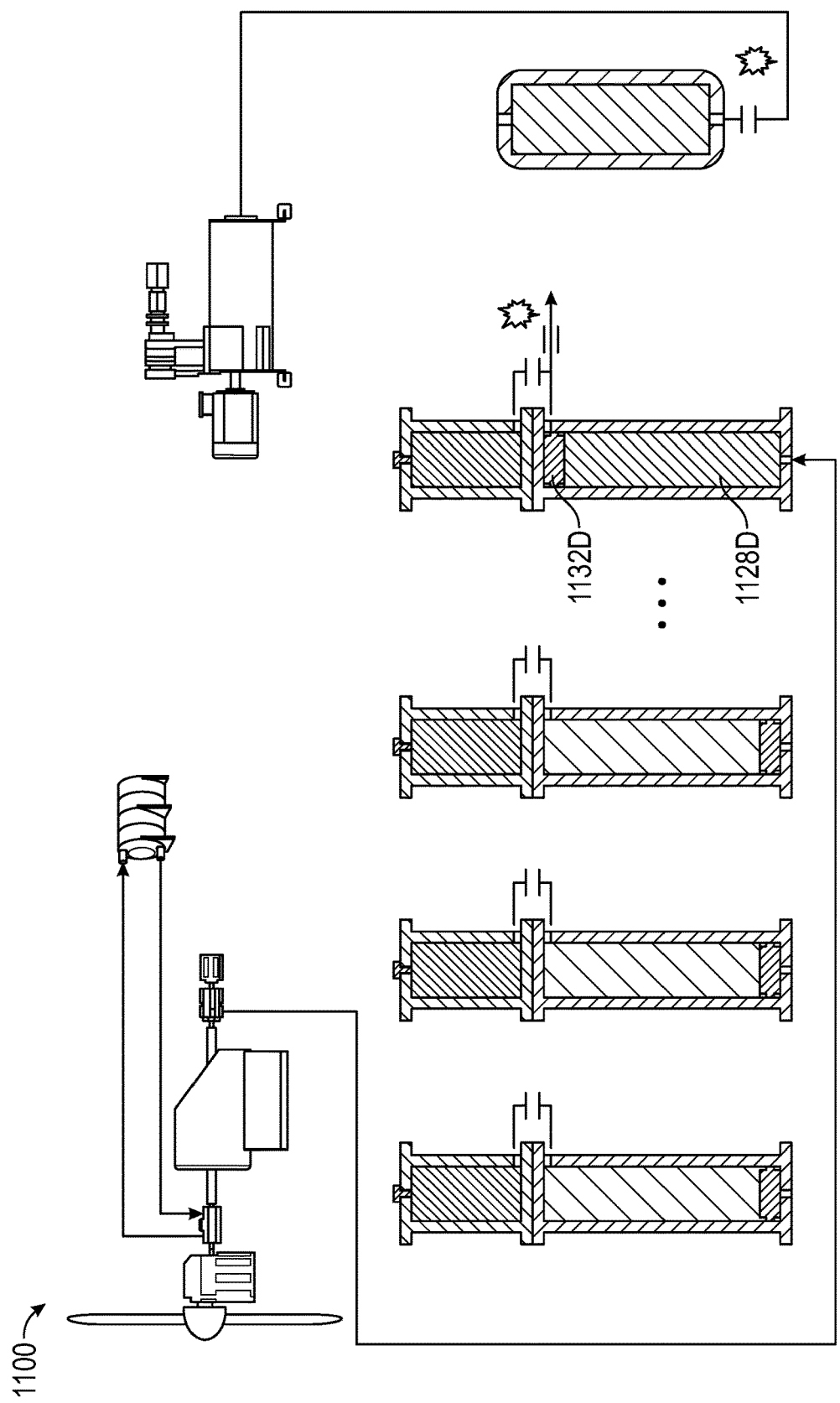
FIG. 15 is a diagram of the system of FIG. 11 housing the hydraulic fluid in one of the chambers/reservoirs with an internal piston fully displaced.

FIG. 15 illustrates the system 1100 can accommodate the return oil as needed such as by driving the piston 1132D to the second end of the reservoir 1128D such that the lower pressure gas is substantially exhausted from the reservoir 1128D out into the atmosphere or to another apparatus, system or subsystem (not shown.

Figure 16:
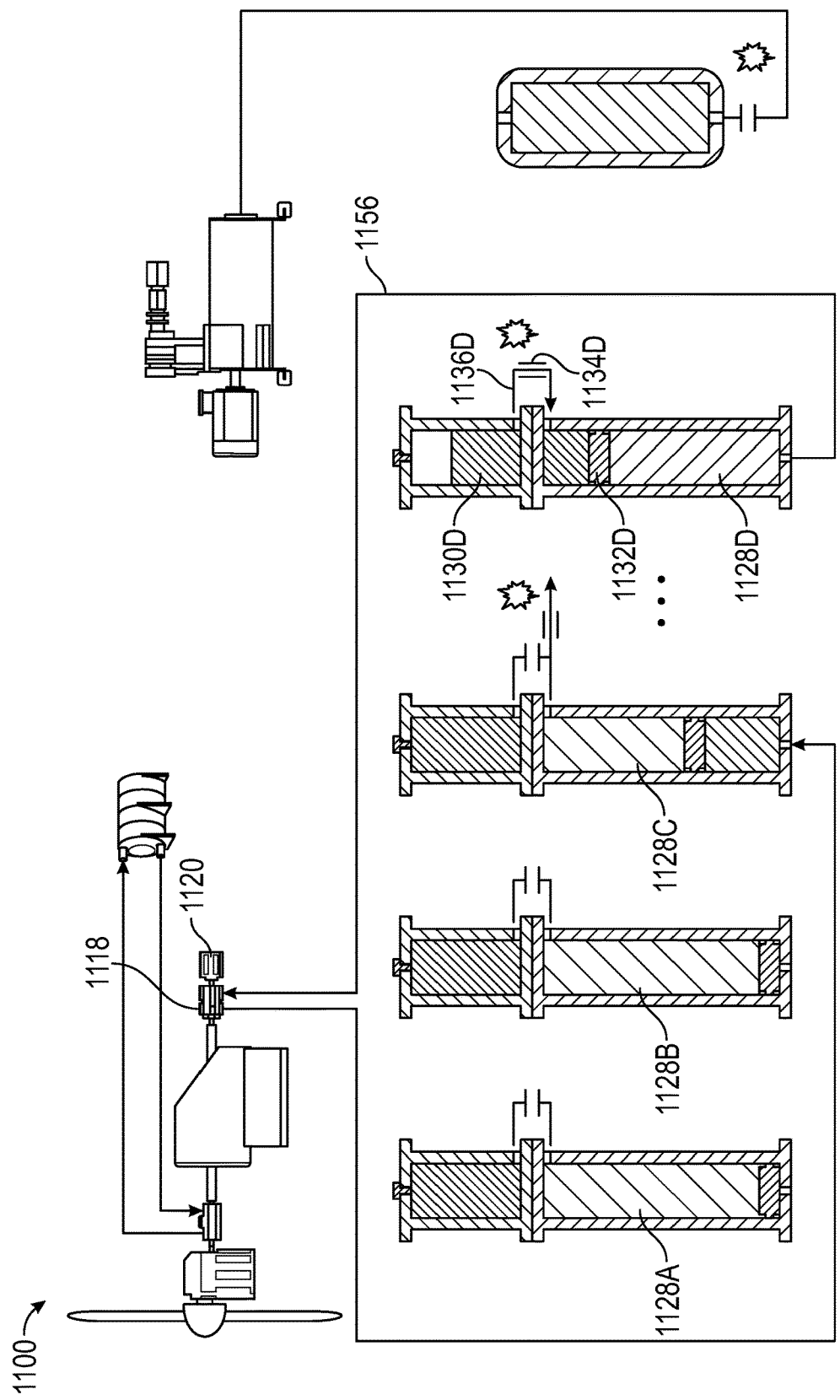
FIG. 16 is a diagram of the system of FIG. 11 using one of the chambers/reservoirs to house hydraulic fluid utilized by components of the wind turbine while a second of the chambers/reservoirs reciprocates stored hydraulic fluid back to drive components of the wind turbine.

FIG. 16 provides an example of the system 1100 mode where return oil (hydraulic fluid) from the motor 1118 and makeup pump 1120 can be stored in a second of the hydraulic fluid/lower pressure reservoirs 1128A, 1128B, 1128C and 1128D (e.g. reservoir 1128C) in the manner previously described in reference to FIGS. 14 and 15 but additionally the hydraulic fluid previously stored in the reservoir 1128D (due to operation previously described) can be used to drive the motor 1118 and/or pump 1120.

This can be accomplished by passing the gas at the intermediate pressure previously stored in the intermediate pressure gas reservoir 1130D along communication line 1136D and through the opened valve 1134D to be received in the reservoir 1128D so as to cause displacement of the piston 1132D back toward the first end of the reservoir 1128D. Such displacement can cause the hydraulic fluid to flow to the motor 1118 along the communication line 1156.

Figure 17:
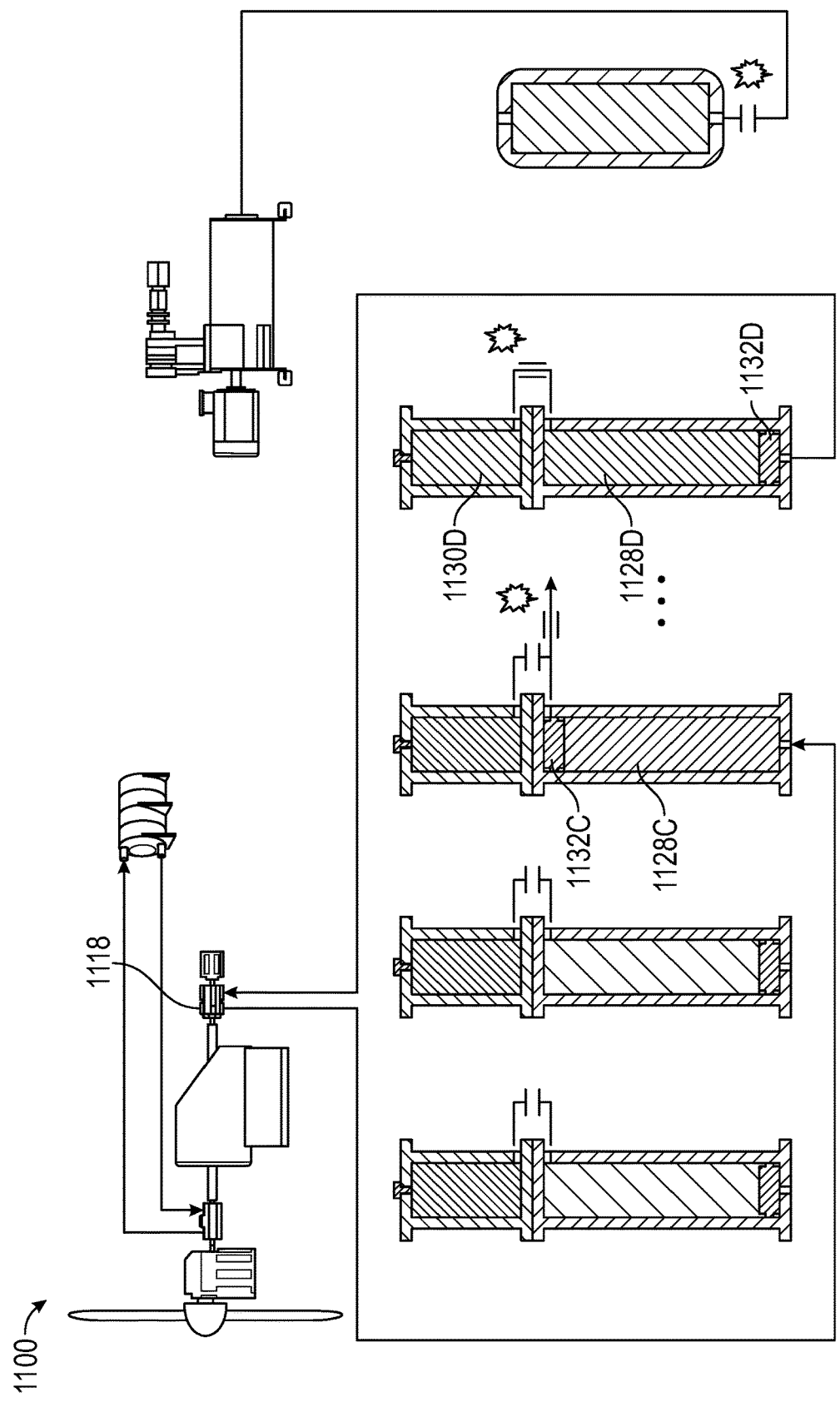
FIG. 17 is a diagram of the system of FIG. 16 where various internal pistons within the chambers/reservoirs have been driven to a maximum position.

FIG. 17 illustrates the system 1100 can accommodate the return oil as needed such as by driving the piston 1132C to the second end of the reservoir 1128C such that the lower pressure gas is substantially exhausted from the reservoir 1128C out into the atmosphere or to another apparatus, system or subassembly (not shown). At the same time, the motor 1118 can be driven by the hydraulic fluid previously stored in the reservoir 1128D which can be substantially exhausted from the reservoir 1128D due to travel of the piston 1132D back to the first end of the reservoir 1128D. At such time, the pressure of the gas within the reservoir 1128D can be equalized to that of the pressure remaining within the intermediate pressure gas reservoir 1130D.

Figure 18:
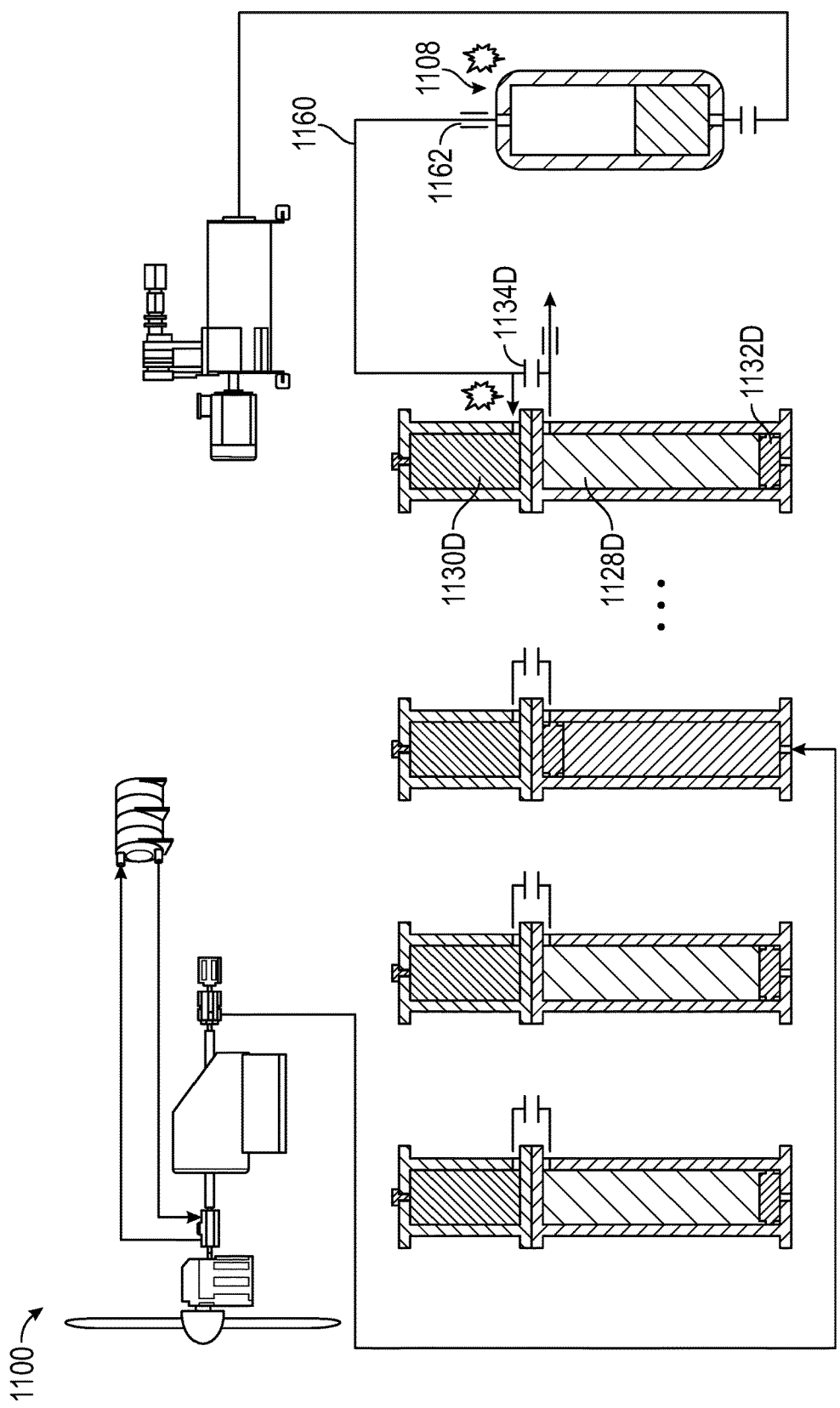
FIG. 18 is a diagram of the system of FIG. 11 where a lower pressure chamber and an intermediate pressure chamber are recharged to desired pressures with gas from a higher pressure chamber.

FIG. 18 illustrates the system 1100 operating in a mode where the intermediate pressure gas reservoir 1130D is recharged with gas to an intermediate pressure. This can be accomplished by allowing gas from the higher pressure chamber 1108 to move to the intermediate pressure gas reservoir 1130D via a communication line 1160 and through a valve 1162 that is opened. During charging, the valve 1134D can be closed once the reservoir 1128D is filled with gas to a desired lower pressure such that once the valve 1134D is closed, the gas from the higher pressure chamber 1108 is directed only to the intermediate pressure gas reservoir 1130D. Thus, the reservoir 1128D is reset and is ready to accommodate the return oil or other operative energy needs such as described in reference to FIGS. 14 and 15. Higher pressure chamber 1108 is illustrated as still storing some remaining gas, however, the higher pressure chamber 1108 may need to be recharged as illustrated and described in reference to FIG. 12 during the next high wind, regenerative breaking, or other energy generating event.

Thus, stored gas at various pressures can be utilized to drive hydraulic fluid to provide staging and reciprocating hydraulic power regeneration for components of the subassembly 1102. Such hydraulic fluid can be used to power other systems, components and subsystems (e.g. vehicle subsystems or other turbines) not specifically described or illustrated herein. It should be noted that unless items are being used in the specific mode illustrated by a Figure, items such as communication lines, valves and other components may not be specifically illustrated or discussed for ease of interpretation. However, it should be recognized that the systems can include additional items not specifically illustrated. It should be further realized that FIGS. 12-18 need not occur in the particular sequence described and may be performed independently without reliance on the particulars of any prior or subsequent of FIGS. 12-18.

Figure 19:
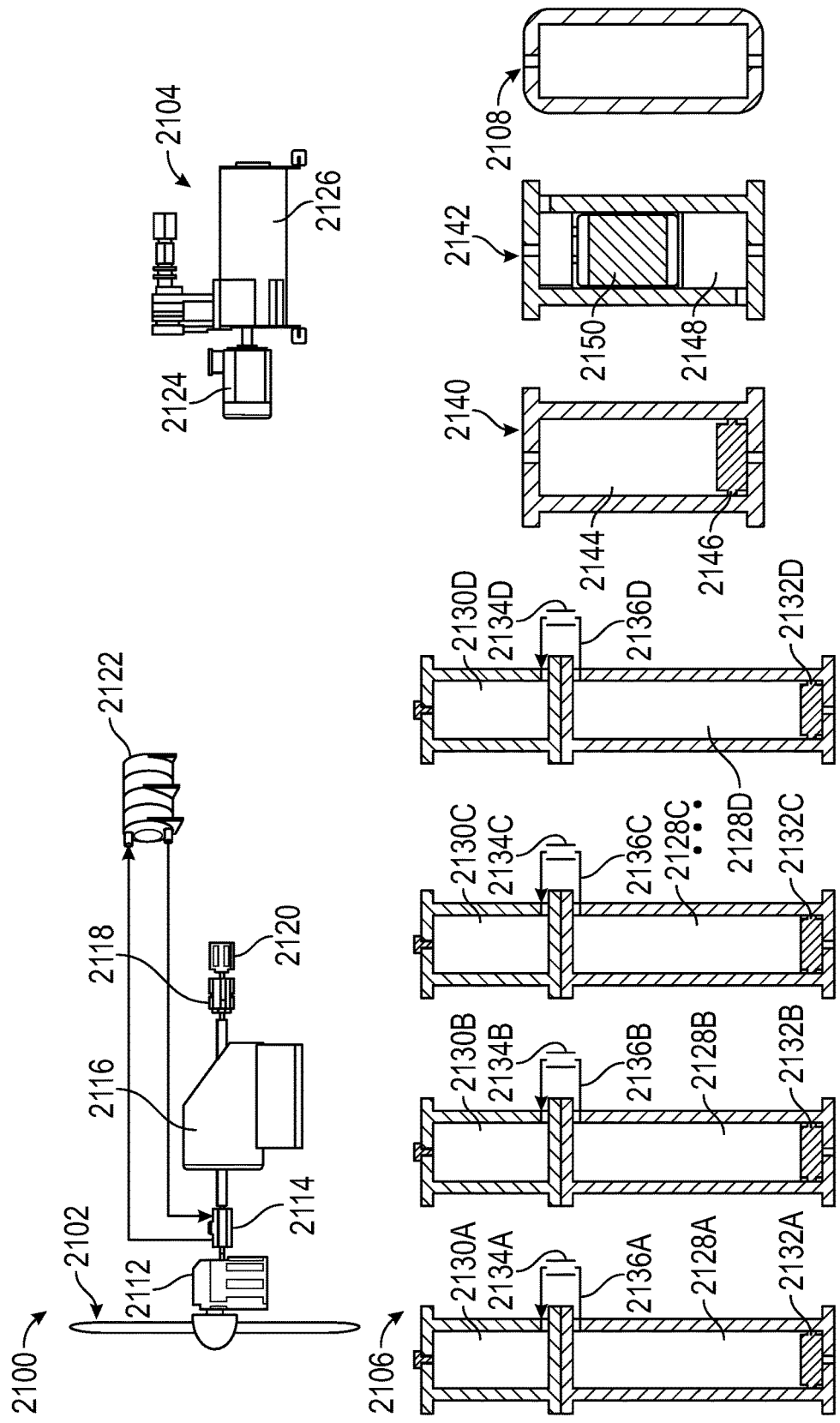
FIG. 19 is a diagram of a second system according to another example embodiment that includes various wind turbine components and additional subsystems and apparatuses to provide staging and reciprocating hydraulic power regeneration.

FIG. 19 shows a system 2100 according to another example of the present application. The system 2100 can make use of various apparatuses and subsystems previously described with reference to the example of FIGS. 11-18. Thus, the operation and construction of certain apparatuses and subsystems of system 2100 may not be described in great detail recognizing such description has already been provided with reference to the systems of FIGS. 1-18, for example.

The system 2100 can include a first subsystem 2102 such as for a gas turbine as previously described in prior examples. The system 2100 can in some cases further include a second subsystem 2104, a third subsystem 2106, a higher pressure gas chamber 2108, an expansion device 2140 and a cooling device 2142. As previously described in reference to previous Figures, the first subsystem 2102 can include a turbine 2110, a gearbox 2112, a power split transmission 2114, a generator 2116, a motor 2118, a makeup pump 2120 and a hydraulic reservoir 2122. The second subsystem 2104 can include a motor 2124 and a compressor 2126. The third subsystem 2106 can include a plurality of hydraulic fluid/lower pressure gas reservoirs 2128A, 2128B, 2128C and 2128D and a plurality of intermediate pressure gas reservoirs 2130A, 2130B, 2130C and 2130D. The third system 2106 can additionally include pistons 2132A, 2132B, 2132C and 2132D, valves 2134A, 2134B, 2134C and 2134D, and communication lines 2136A, 2136B, 2136C and 2136D. The operation and construction of components of the first subsystem 2102, the second subsystem 2104, the third subsystem 2106, and the higher pressure gas chamber 2108 has been described with reference to the example of FIGS. 11-18, and thus, will not be described in reference to FIGS. 19-32 in great detail. The communication between and functionality of the various subsystems and apparatuses of the system 2100 will be described in further detail with reference to FIGS. 19-32. It is understood that the system 2100 can have the capabilities and functions of system 1100, for example.

As shown in the example of FIG. 19, the expansion device 2140 can include a chamber 2144 and a piston 2146. The cooling device 2142 can include cooling chambers 2148A and 2148B and cooling fins 2150.

The piston 2146 can reside within the chamber 2144 and can be moveable therein (e.g. can be driven by hydraulic fluid and can be used to exhaust gas from the chamber 2144). The cooling fins 2150 can be disposed along or adjacent the cooling chambers 2148A and 2148B so as to allow for a heat exchange relationship from the cooling device 2142 (see e.g., FIGS. 31 and 32).

Figure 20:
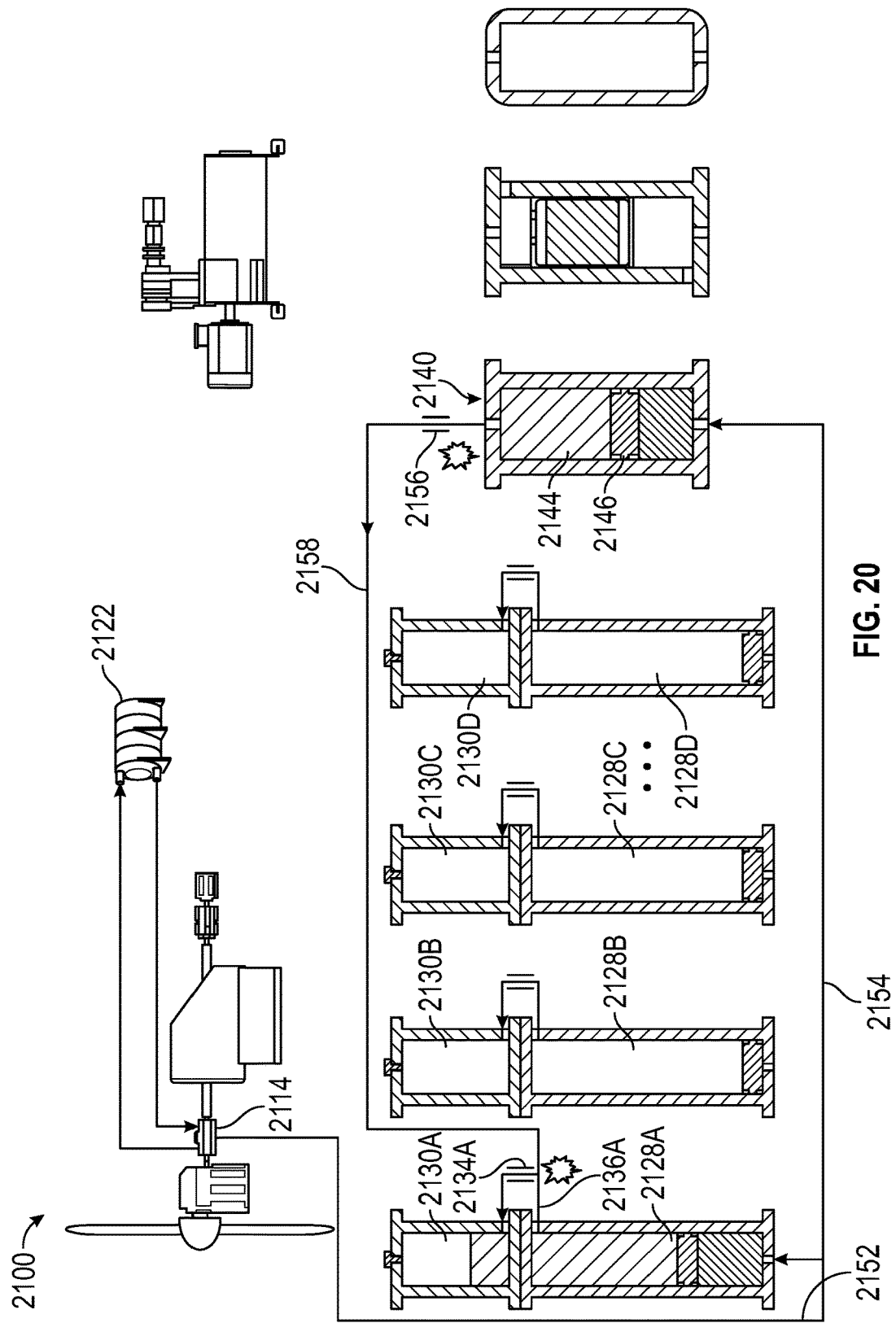
FIG. 20 is a diagram of the system of FIG. 19 operating with one of a plurality of hydraulic fluid/lower pressure gas reservoirs and one of the plurality of intermediate pressure gas reservoirs and an expansion device in a charging mode where hydraulic fluid at a higher pressure from a power split transmission can be used to charge one or more of the intermediate pressure gas reservoirs with pressurized gas to an intermediate pressure.

FIG. 20 shows the system 2100 with one of the plurality of hydraulic fluid/lower pressure gas reservoirs 2128A, 2128B, 2128C and 2128D (e.g., 2128A) and one of the plurality of intermediate pressure gas reservoirs 2130A, 2130B, 2130C and 2130D (e.g., 2130A) and the expansion device 2140 in a charging mode where hydraulic fluid at a higher pressure (relative to lower pressure hydraulic fluid from reservoir 2122) from the power split transmission 2114 can be used to charge one or more of the intermediate pressure gas reservoirs 2130A, 2130B, 2130C and 2130D (e.g., 2130A) with pressurized gas to an intermediate pressure (e.g., 210 Bar). More particularly, higher pressure hydraulic fluid from the power split transmission 2114 can be directed along communication line 2152 to fill one or more of the hydraulic fluid/lower pressure gas reservoirs 2128A, 2128B, 2128C and 2128D (e.g., 2128A) and can additionally or alternatively be directed along communication line 2154 to fill expansion device 2140. Thus, at least a portion of the expansion chamber 2144 can be filled with the hydraulic fluid so as to drive movement of the piston 2146 to force gas from the expansion device 2140 through a port, a valve 2156 and a communication line 2158 to one or more of the plurality of hydraulic fluid/lower pressure gas reservoirs 2128A, 2128B, 2128C and 2128D (e.g., 2128A) and/or one of the plurality of intermediate pressure gas reservoirs 2130A, 2130B, 2130C and 2130D (e.g., 2130A).

Such gas in the intermediate pressure gas reservoir 2130A, the hydraulic fluid/lower pressure gas reservoir 2128A and/or the expansion chamber 2144 can have a pressure of 210 Bar according to one example. However, other pressures are contemplated. FIG. 20 illustrates the hydraulic fluid/lower pressure reservoirs 2128A, 2128B, 2128C and 2128D also as being filled with a gas to the intermediate pressure (e.g., 210 Bar). Again, although 210 Bar is used, such use is exemplary and other pressures are contemplated. Similarly, the example of FIG. 20 shows the expansion chamber 2144 as being filled with gas to the intermediate pressure (e.g., 210 Bar). Again, although 210 Bar is used, such use is exemplary and other pressures are contemplated. Pressures within the intermediate pressure gas reservoir 2130A, the hydraulic fluid/lower pressure gas reservoir 2128A and/or the expansion chamber 2144 can differ.

Although the hydraulic fluid is shown as entering the hydraulic fluid/lower pressure gas reservoir 2128A and the expansion chamber 2144 simultaneously, according to some examples such process can occur sequentially. Similarly, although the gas is shown as entering the hydraulic fluid/lower pressure gas reservoir 2128A prior to entering the intermediate pressure gas reservoir 2130A along communication line 2136A and through the valve 2134A, in some examples the gas can bypass the hydraulic fluid/lower pressure gas reservoir 2128A entirely and be directed to the intermediate pressure gas reservoir 2130A directly.

Figure 21:
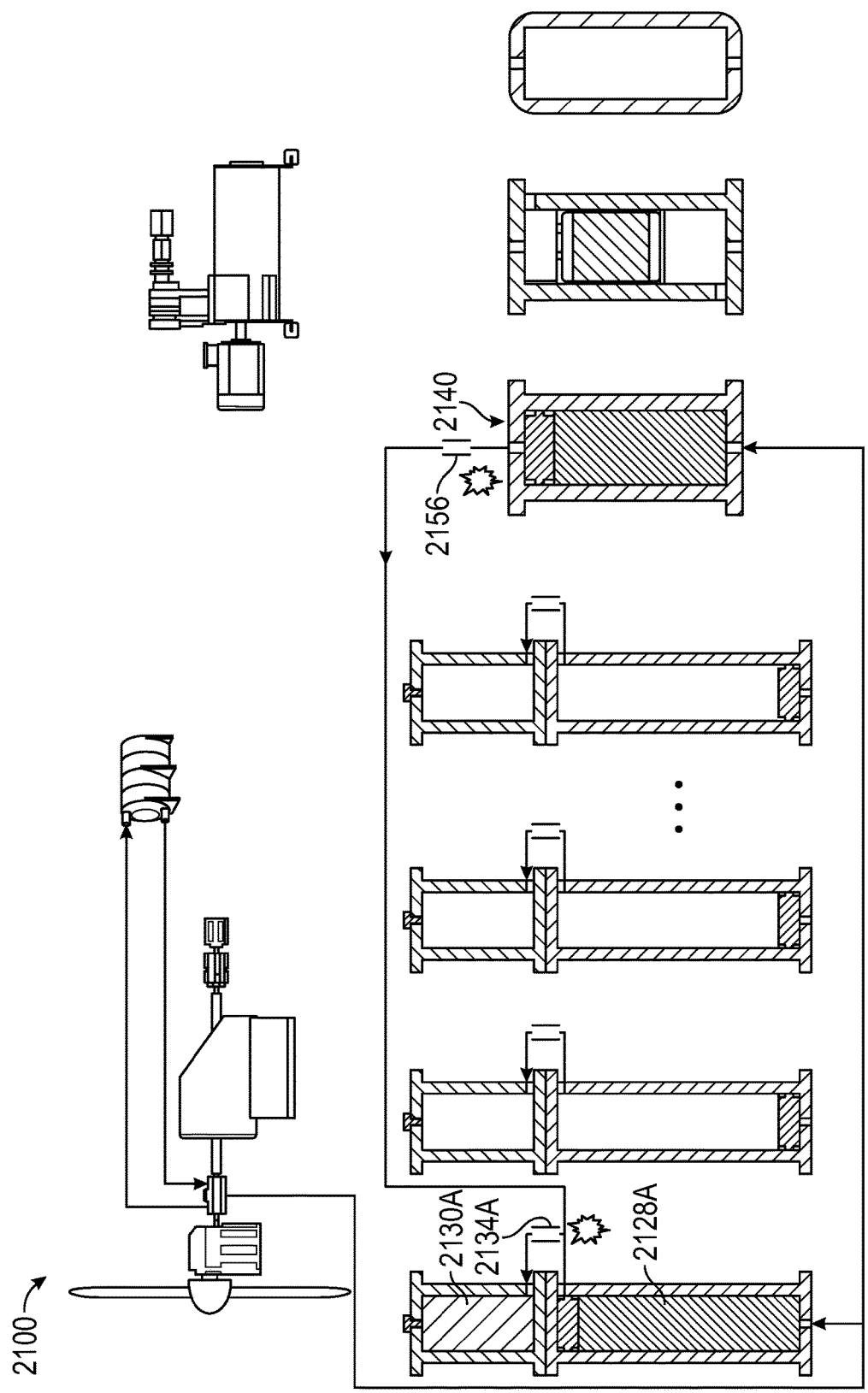
FIG. 21 is a diagram of the system of FIG. 19 where one of the intermediate pressure gas reservoirs is fully charged with gas at an intermediate pressure, and one of the hydraulic fluid/lower pressure reservoirs and the expansion chamber are fully charged with the hydraulic fluid.

FIG. 21 shows a mode of operation of the system 2100 where the intermediate pressure gas reservoir 2130A is fully charged with gas at an intermediate pressure, and the hydraulic fluid/lower pressure reservoir 2128A and the expansion chamber 2144 are fully charged with the hydraulic fluid. This state can accomplished due to the excess power generated for example by excess wind, regenerative breaking, etc. All of the valves (e.g., valves 2134A and 2156) can be shut in this condition.

Figure 22:
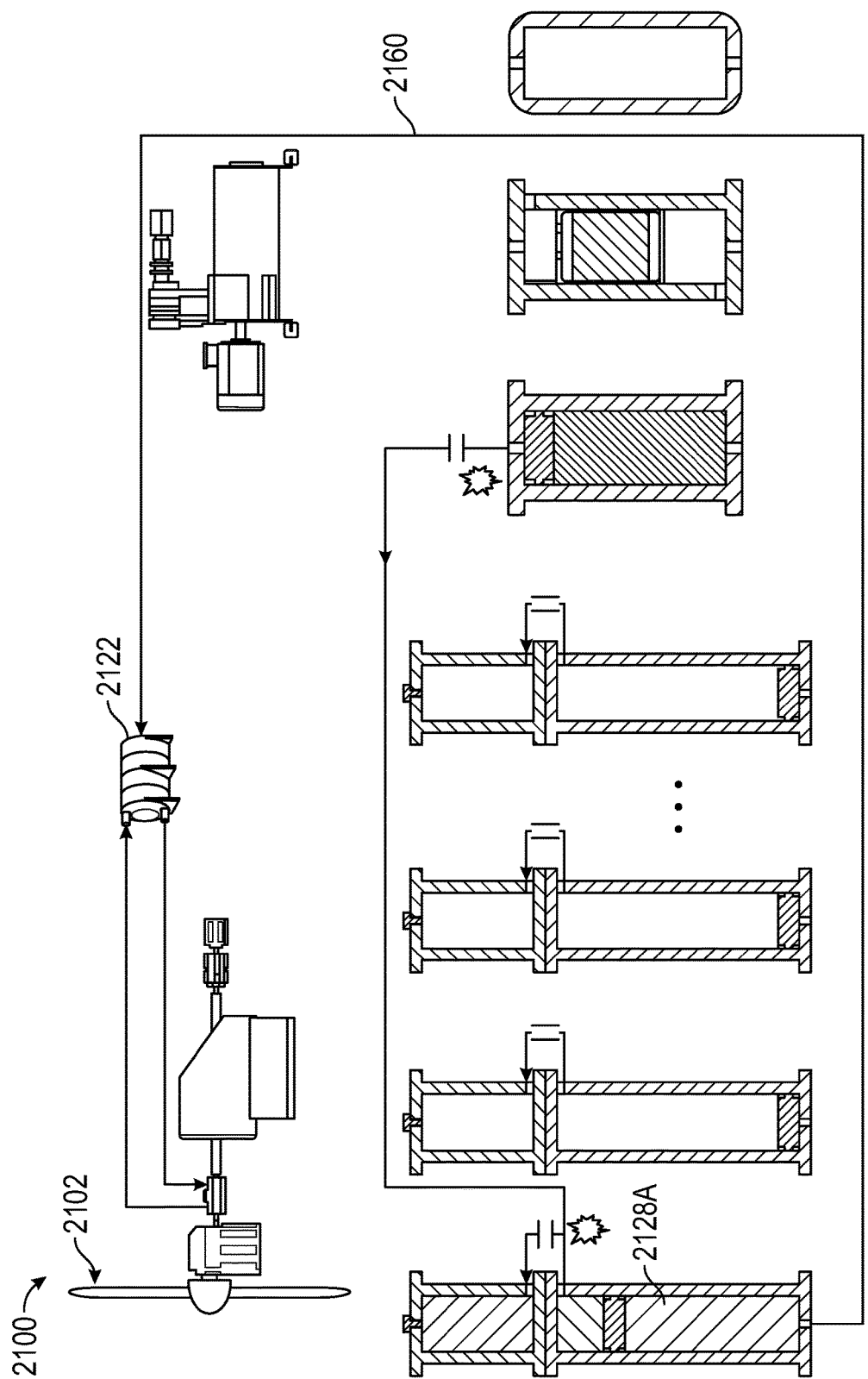
FIG. 22 is a diagram of the system of FIG. 19 where the hydraulic fluid from the one hydraulic fluid lower pressure reservoir is exhausted back to a hydraulic reservoir along a communication line.
Figure 23:
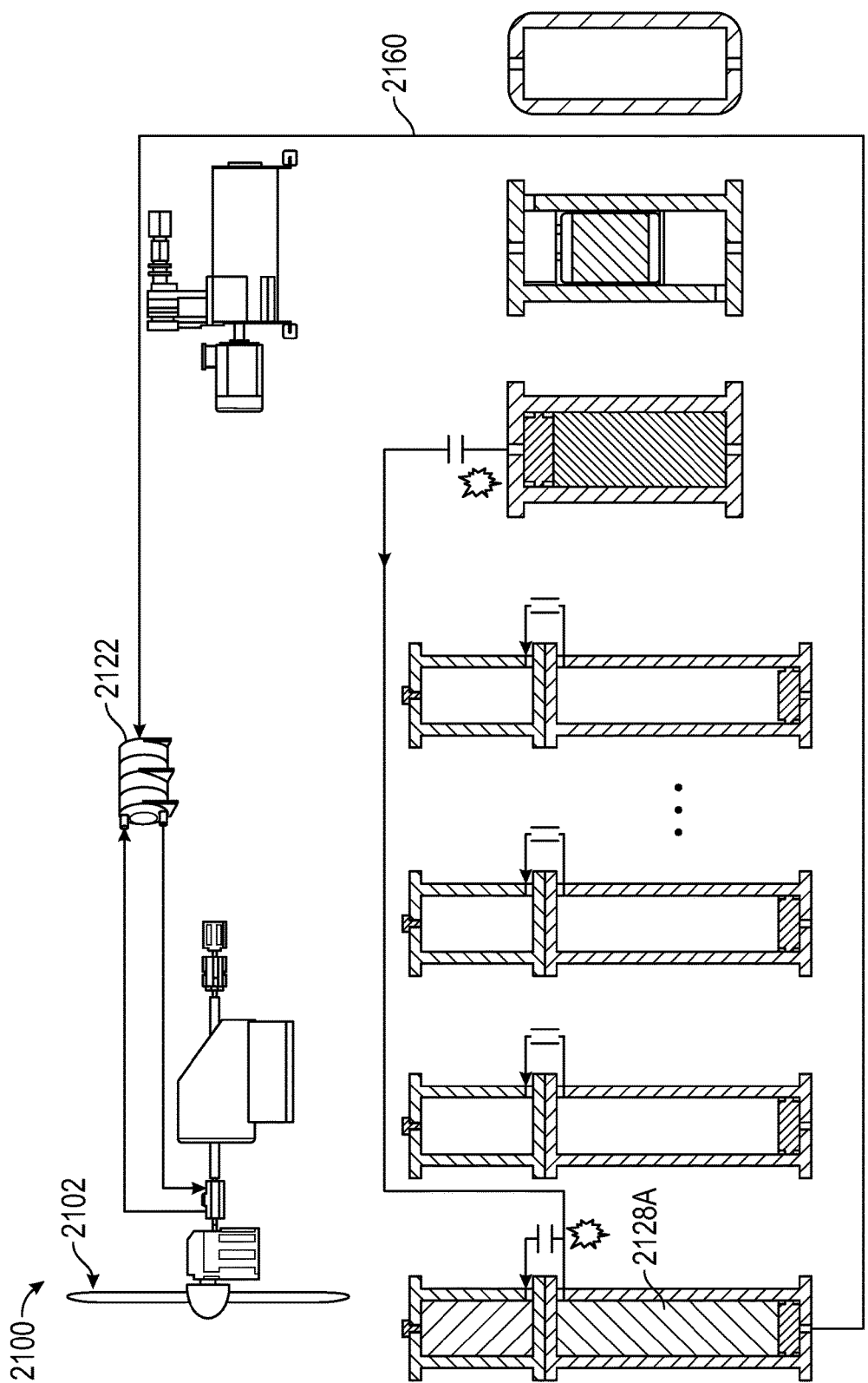
FIG. 23 is a diagram of the system of FIG. 19 further illustrating a mode where the hydraulic fluid from the one hydraulic fluid/lower pressure reservoir is exhausted back to a hydraulic reservoir along a communication line.

FIGS. 22 and 23 show a mode of the system 2100 where the hydraulic fluid from the hydraulic fluid/lower pressure reservoir 2128A is exhausted back to the reservoir 2122 along communication line 2160. According to other examples, the hydraulic fluid can be directed back to the power split transmission 2114 directly or to another component of the first subsystem 2102. FIG. 23 shows the hydraulic fluid having been fully exhausted back to the reservoir 2122.

Figure 24:
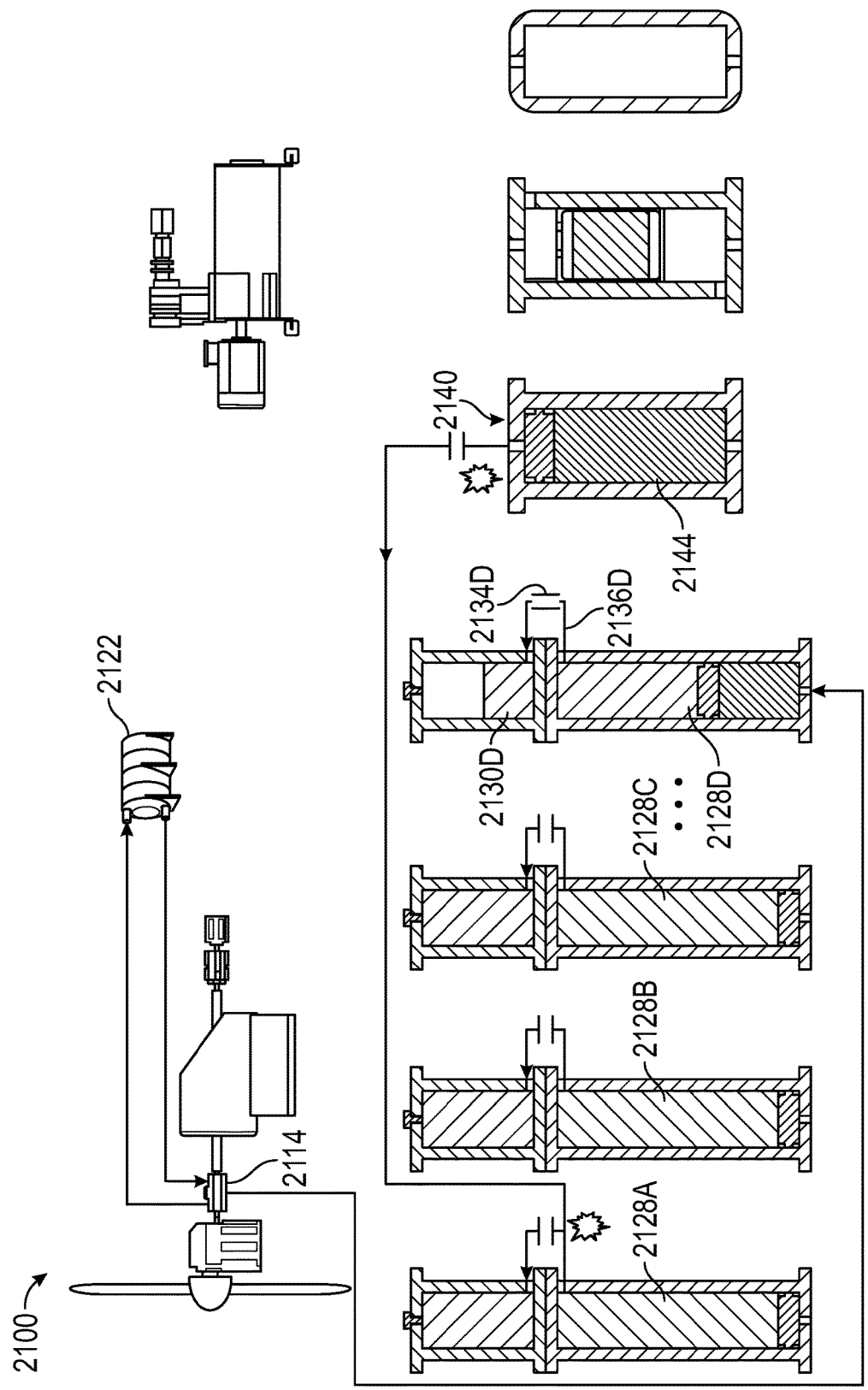
FIG. 24 is a diagram of the system of FIG. 19 where several of the plurality of hydraulic fluid/lower pressure gas reservoirs are fully charged with gas to a desired pressure and one of the hydraulic fluid/lower pressure gas reservoirs is partially charged with gas.

FIG. 24 shows a mode of the system 2100 where several of the plurality of hydraulic fluid/lower pressure gas reservoirs 2128A, 2128B, 2128C are fully charged with gas to a desired pressure (e.g., to 10 Bar) and one of the hydraulic fluid/lower pressure gas reservoirs 2128D is partially charged with gas. Similarly, several of the plurality of intermediate pressure gas reservoirs 2130A, 2130B, 2130C are fully charged to a desired pressure to 210 Bar) and one of the intermediate pressure gas reservoirs 2130D is partially charged. The expansion device 2140 is fully charged holding hydraulic fluid at a higher pressure (relative to lower pressure hydraulic fluid from reservoir 2122) from the power split transmission 2114. The hydraulic fluid from the power split transmission 2114 can be directed to the hydraulic fluid/lower pressure gas reservoir 2128D and is in the process of filling the hydraulic fluid/lower pressure gas reservoir 2128D by displacing the piston 2132D so as to displace the gas from the hydraulic fluid/lower pressure gas reservoir 2128D through communication line 2136D and valve 2134D to the intermediate pressure gas reservoirs 2130D.

Such gas in the intermediate pressure gas reservoir 2130D can have a pressure of 210 Bar according to one example. However, other pressures are contemplated. FIG. 24 illustrates the hydraulic fluid/lower pressure reservoirs 2128A, 2128B and 2128C also as being filled with gas to a lower pressure (e.g., 10 Bar). Again, although 10 Bar is used, such use is exemplary and other pressures are contemplated.

Figure 25:
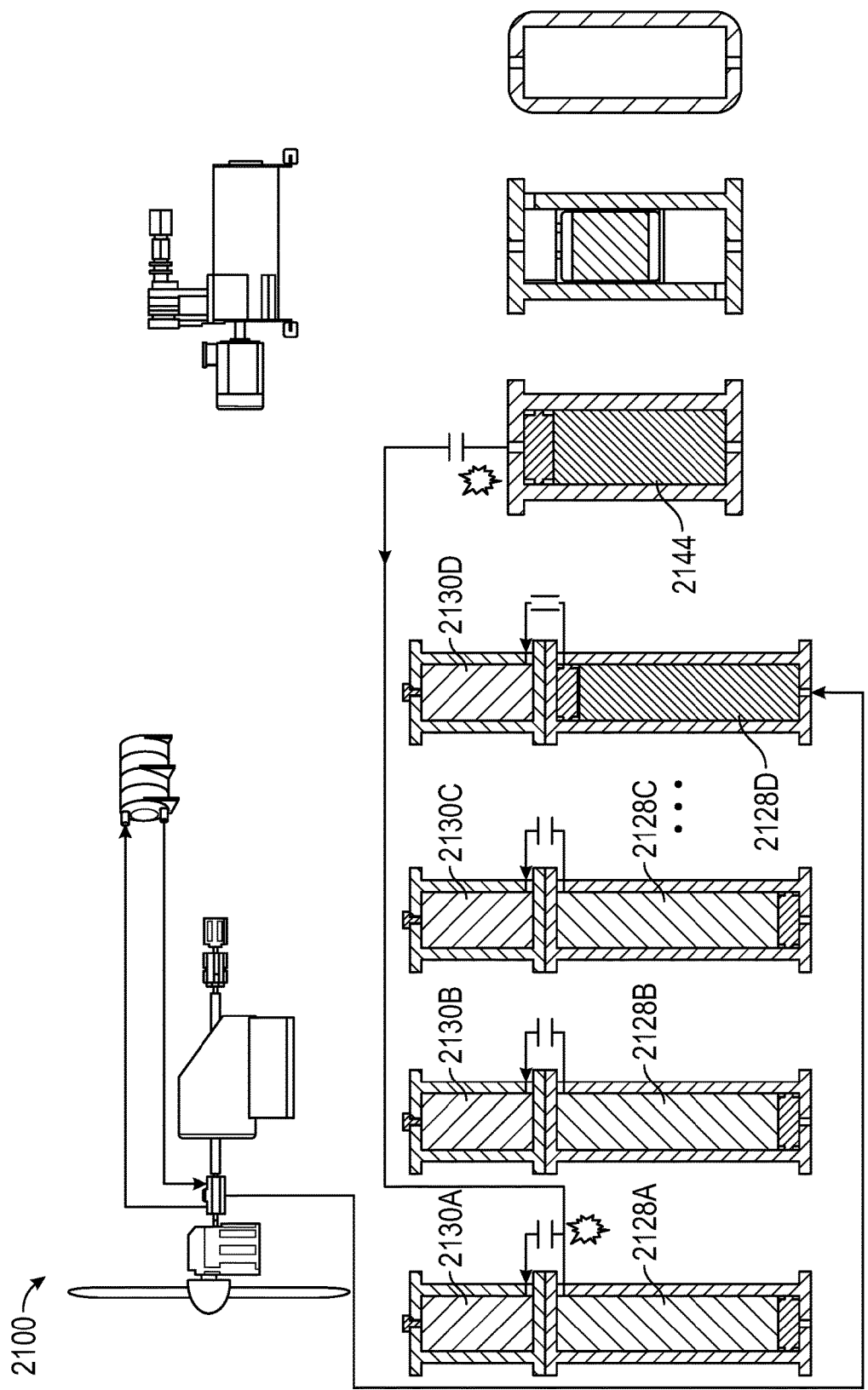
FIG. 25 is a diagram of the system of FIG. 19 where the intermediate pressure gas reservoirs can each be fully charged with gas at the intermediate pressure, the hydraulic fluid/lower pressure reservoirs can each be fully charged with gas at the relatively lower pressure, and one of the hydraulic fluid/lower pressure reservoirs and the expansion chamber can each be fully charged with the hydraulic fluid.

FIG. 25 shows a mode of operation of the system 2100 where the intermediate pressure gas reservoirs 2130A, 2130B, 2130C and 2130D can each be fully charged with gas at the intermediate pressure, the hydraulic fluid/lower pressure reservoirs 2128A, 2128B and 2128C can each be fully charged with gas at the relatively lower pressure, and the hydraulic fluid/lower pressure reservoir 2128D and the expansion chamber 2144 can each be fully charged with the hydraulic fluid. All of the valves can be shut in this condition.

Figure 26:
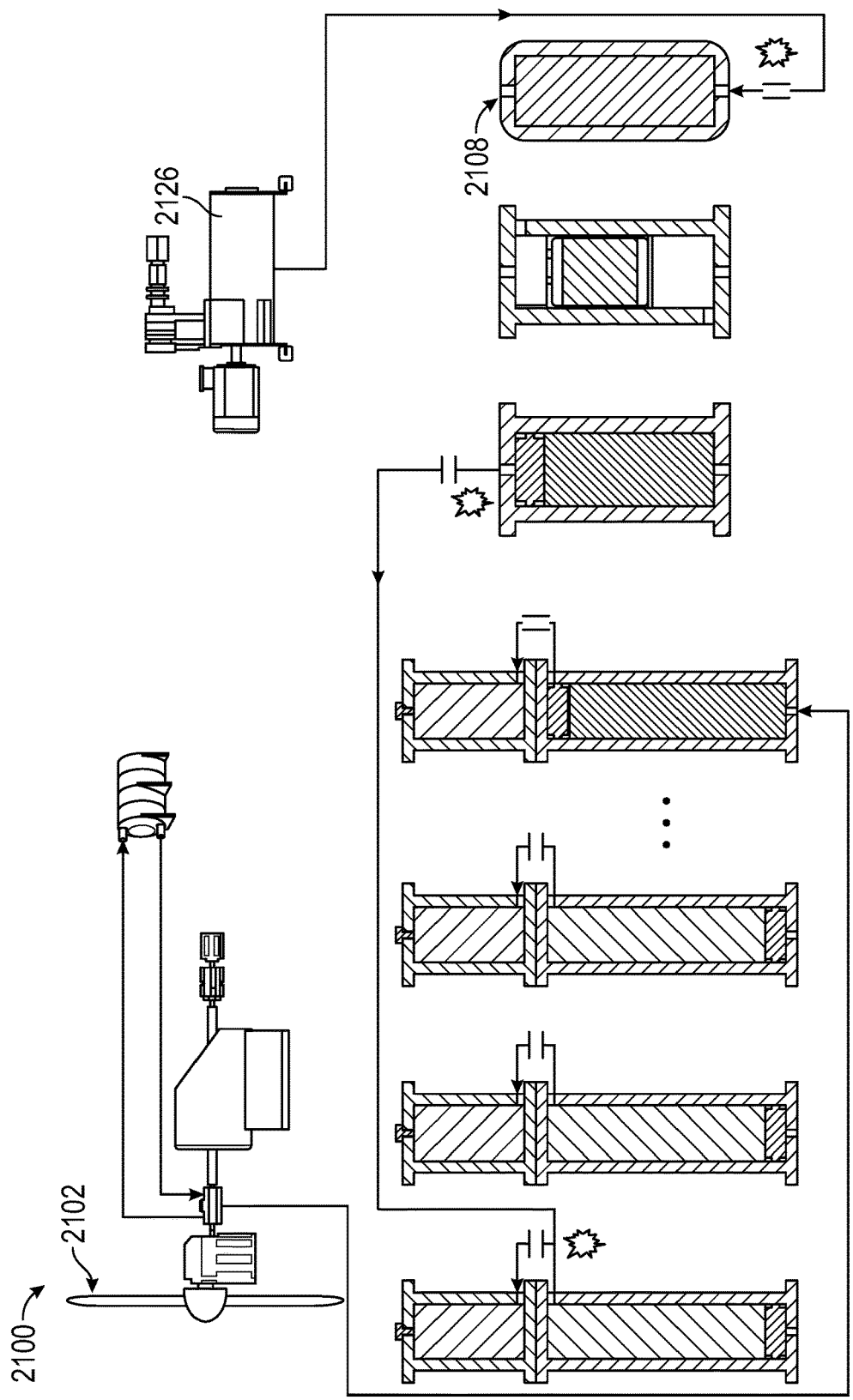
FIG. 26 is a diagram of the system of FIG. 19 showing a mode of operation similar to that of FIG. 25 but additionally illustrating the higher pressure gas chamber can be charged with gas compressed by the compressor.

FIG. 26 shows a mode of operation of the system 2100 similar to that of FIG. 25 but additionally illustrating the higher pressure gas chamber 2108 can be charged with gas compressed by the compressor 2126 in the manner previously described in reference to FIG. 12. The higher pressure gas chamber 2108 can be charged to 350 Bar, for example. However, other desired pressures for the gas are contemplated. The compressor 2126 can be powered by excess energy from subsystem 2102 generated by a high wind event, regenerative breaking event, or the like.

Figure 27:
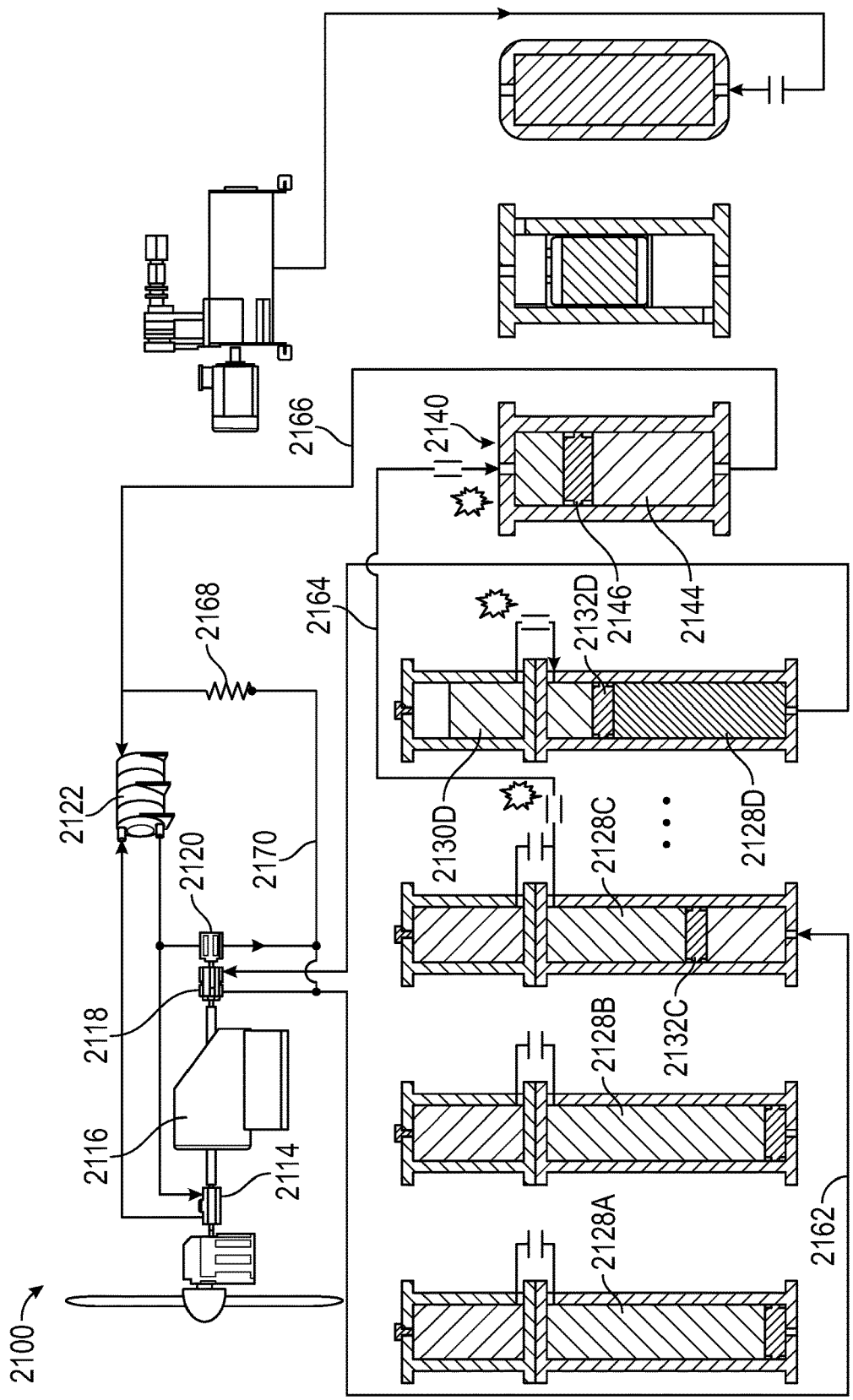
FIG. 27 is a diagram of the system of FIG. 19 where the hydraulic fluid at a relatively higher pressure is used to drive a motor coupled to the generator.

FIG. 27 shows an operation mode for the system 2100 where the hydraulic fluid at a relatively higher pressure (as compared to the pressure of the hydraulic fluid within the reservoir 2122) can be used to drive the motor 2118 coupled to the generator 2116. The hydraulic fluid at relatively higher pressure can be exhausted from the hydraulic fluid/lower pressure reservoir 2128D to the motor 2118 by piston 2132D, which can be driven by gas entering the hydraulic fluid/lower pressure reservoir 2128D from the intermediate pressure gas reservoir 2130D. Furthermore according to the operation mode, hydraulic fluid comprising return oil from the motor 2118 and/or makeup pump 2120 (at a relatively lower pressure as compared to the higher pressure hydraulic fluid) can be directed along a communication line 2162 to one or more of the hydraulic fluid/lower pressure reservoirs 2128A, 2128B and 2128C (e.g. reservoir 2128C). The addition of the return oil to the hydraulic fluid/lower pressure reservoir 2128C can drive the piston 2132C toward the second end of the reservoir 2128C displacing gas at a lower pressure (e.g., 10 Bar) to the expansion device 2140 along a communication line 2164. The gas can be retained within the expansion chamber 2144 and can cause displacement of the piston 2146. The movement of the piston 2146 can drive hydraulic fluid at relatively lower pressure back to the reservoir 2122. According to some examples, all or a portion of the hydraulic fluid traveling toward the reservoir 2122 from the expansion chamber 2144 along a communication line 2166 can be diverted through a valve 2168 and along communication line 2170 back to the communication line 2162. As such the hydraulic fluid can join or supplant the return oil and can be directed to the one or more of the hydraulic fluid/lower pressure reservoirs 2128A, 2128B and 2128C (e.g. reservoir 2128C).

It should be noted that according to the operation mode of FIG. 27, it can be possible to cycle gas and/or hydraulic fluid at high speed using a very small amount of fluid in an automobile, for example.

Figure 28:
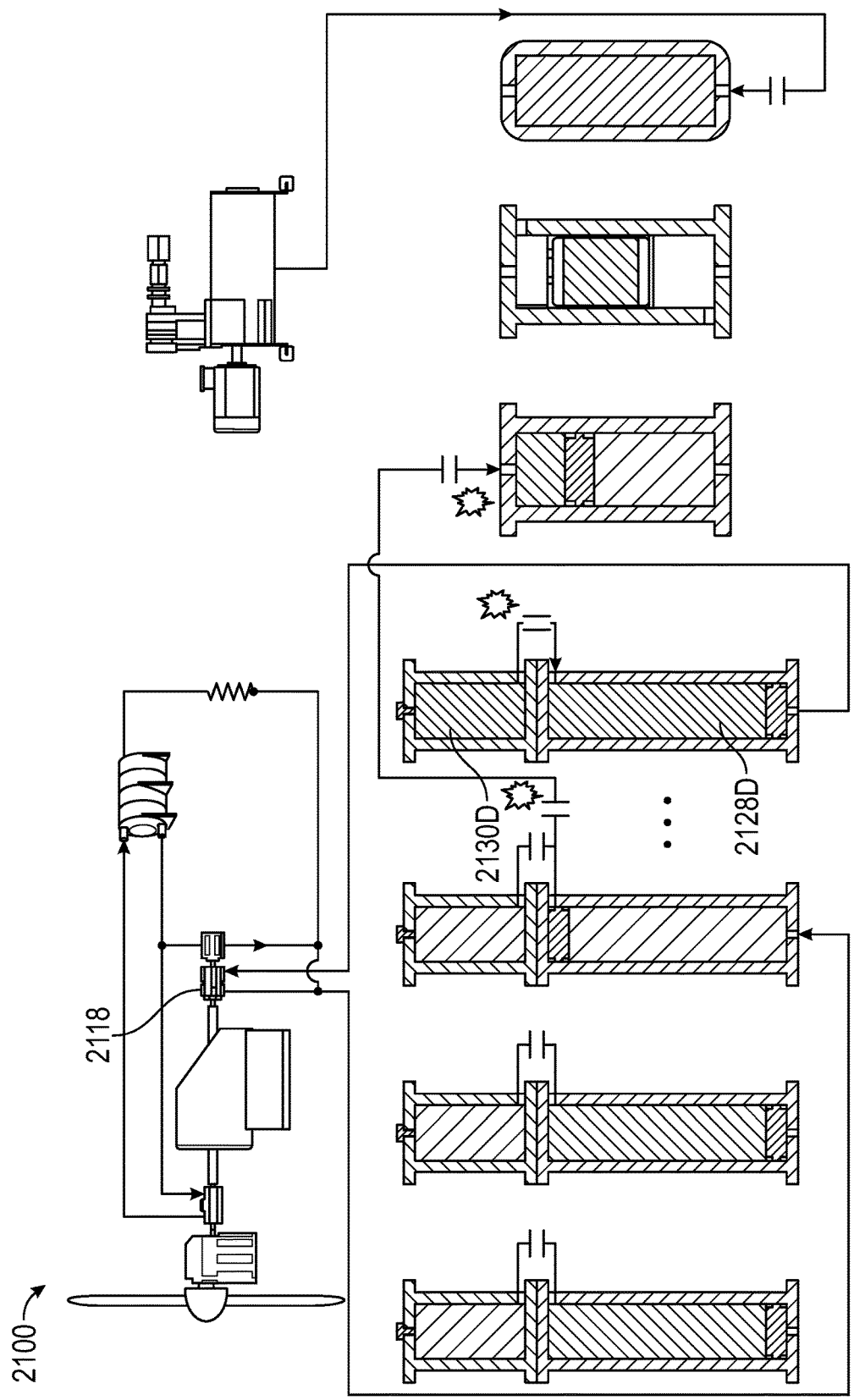
FIG. 28 is a diagram of the system of FIG. 19 where the hydraulic fluid from the hydraulic fluid/lower pressure reservoir to the motor has been completely exhausted.

FIG. 28 shows an operation mode for the system 2100 where the hydraulic fluid from the hydraulic fluid/lower pressure reservoir 2128D to the motor 2118 has been completely exhausted. Gas from the intermediate pressure gas reservoir 2130D can be allowed to equalize to substantially a same pressure (e.g. to 140 Bar) with gas in the hydraulic fluid/lower pressure reservoir 2128D.

Figure 29:
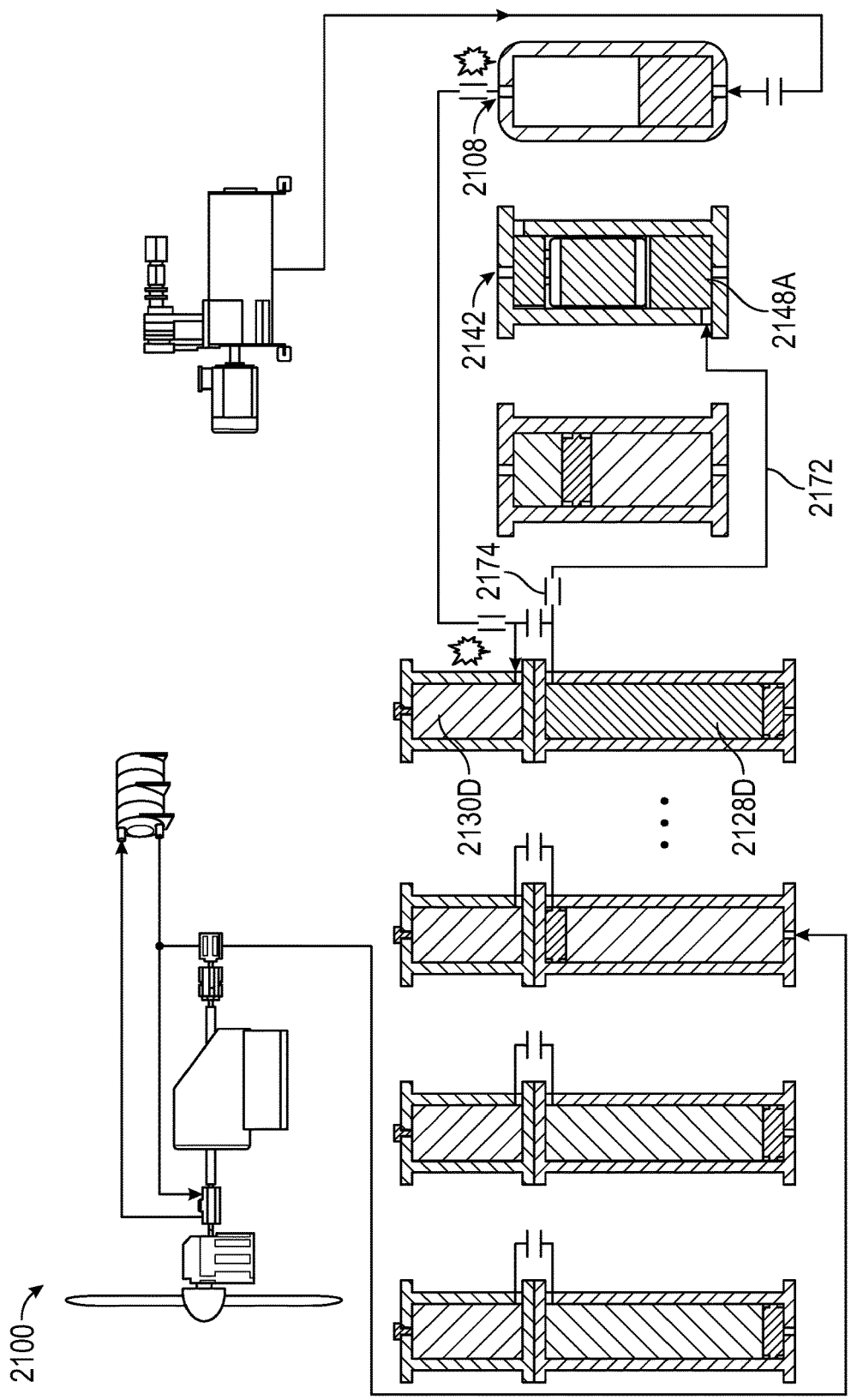
FIG. 29 is a diagram of the system of FIG. 19 where gas within the intermediate pressure gas reservoir can be restored to a desired pressure using gas from the higher pressure chamber.

FIG. 29 shows an operation mode for the system 2100 where gas within the intermediate pressure gas reservoir 2130D can be restored to a desired pressure using gas from the higher pressure chamber 2108. Such process is described in further detail with reference to FIG. 18, for example. Furthermore, gas held by the hydraulic fluid/lower pressure reservoir 2128D can be directed along line 2172 through a valve 2174 to the cooling device 2142 so as to fill the cooling chamber 2148A.

Figure 30:
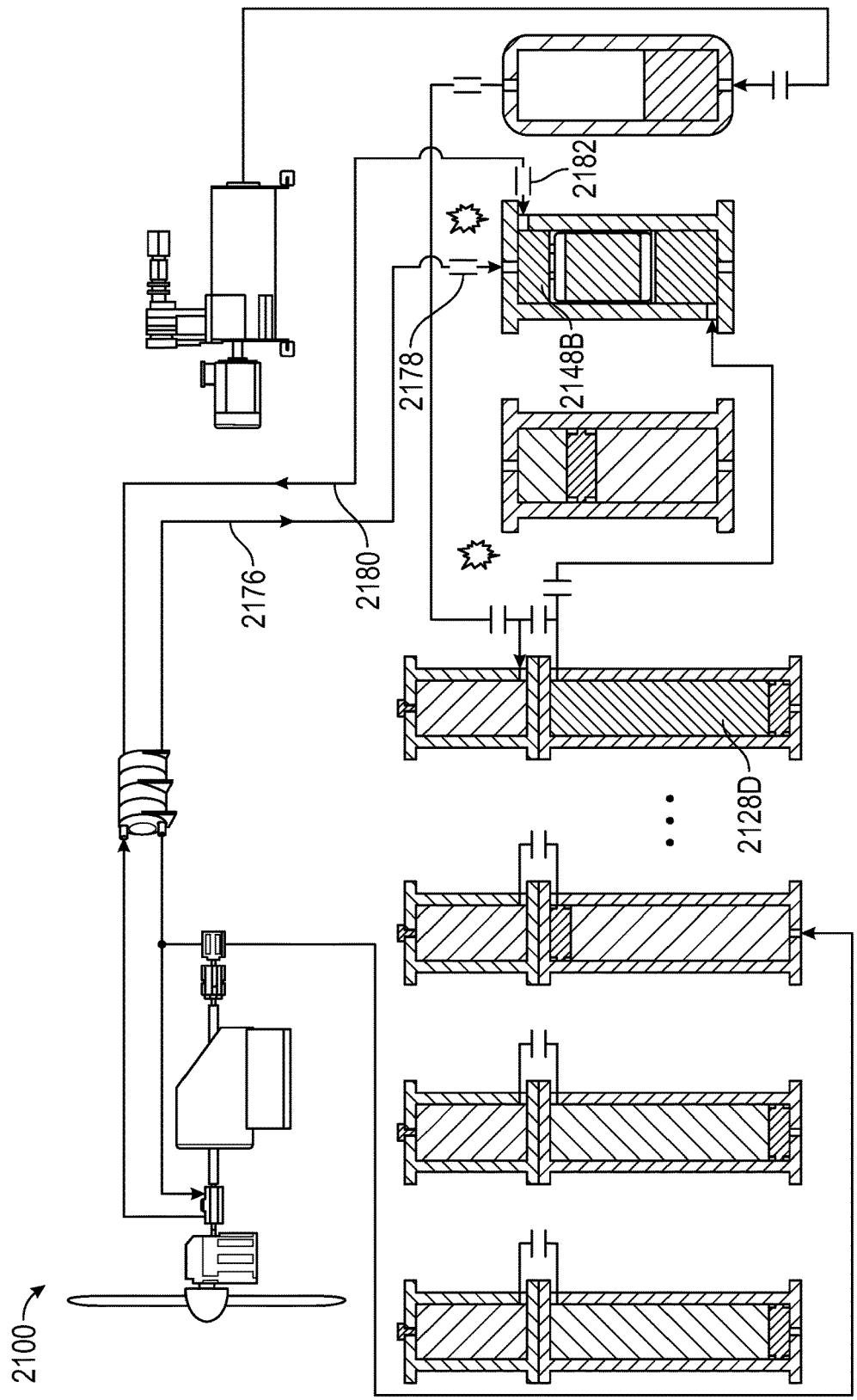
FIG. 30 is a diagram of the system of FIG. 19 where hydraulic fluid from the reservoir can travel along a first communication line to a cooling chamber and from the cooling chamber can further travel back to the reservoir along a second communication line.

FIG. 30 shows that in a further operation mode for the system 2100, hydraulic fluid from the reservoir 2128D can travel along communication line 2176 through valve 2178 to the cooling chamber 2148B and from the cooling chamber 2148B can travel back to the reservoir along communication line 2180 and through valve 2182. The relationship shown and describe can be used to cool the hydraulic fluid.

Figure 31:
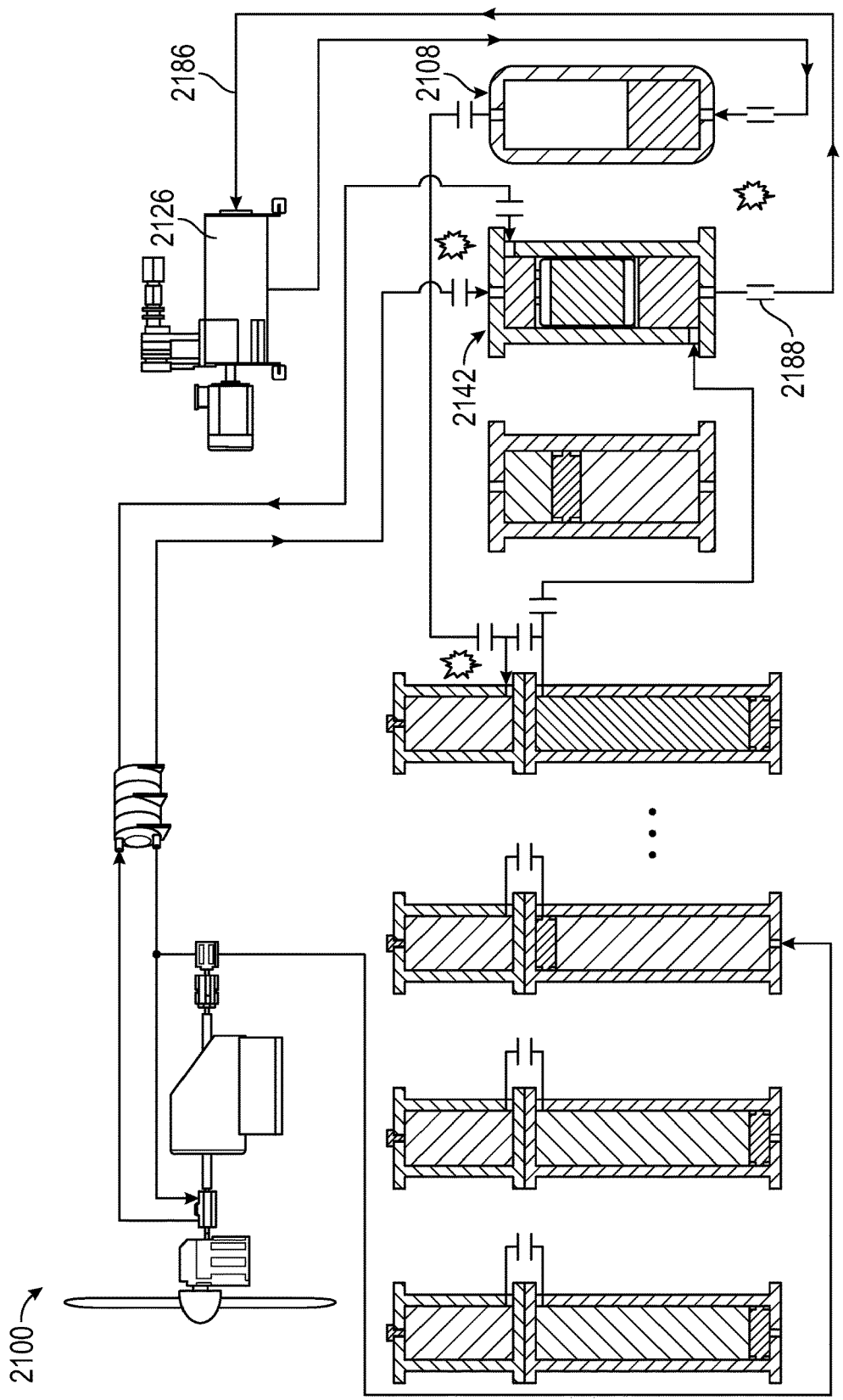
FIG. 31 is a diagram of the system of FIG. 19 where gas from the cooling device once held therein can move along a communication line to a compressor.

FIG. 31 shows an operation mode for the system 2100 where gas from the cooling device 2142 once held therein can move along communication line 2186 through valve 2188 to the compressor 2126. The compressor 2126 can compress the air according to the process previously described in reference to FIG. 18 and can communicate the compressed air (now at a relatively higher pressure) to the higher pressure chamber 2108. In this manner the efficiency of the system 2100 can be increased.

Figure 32:
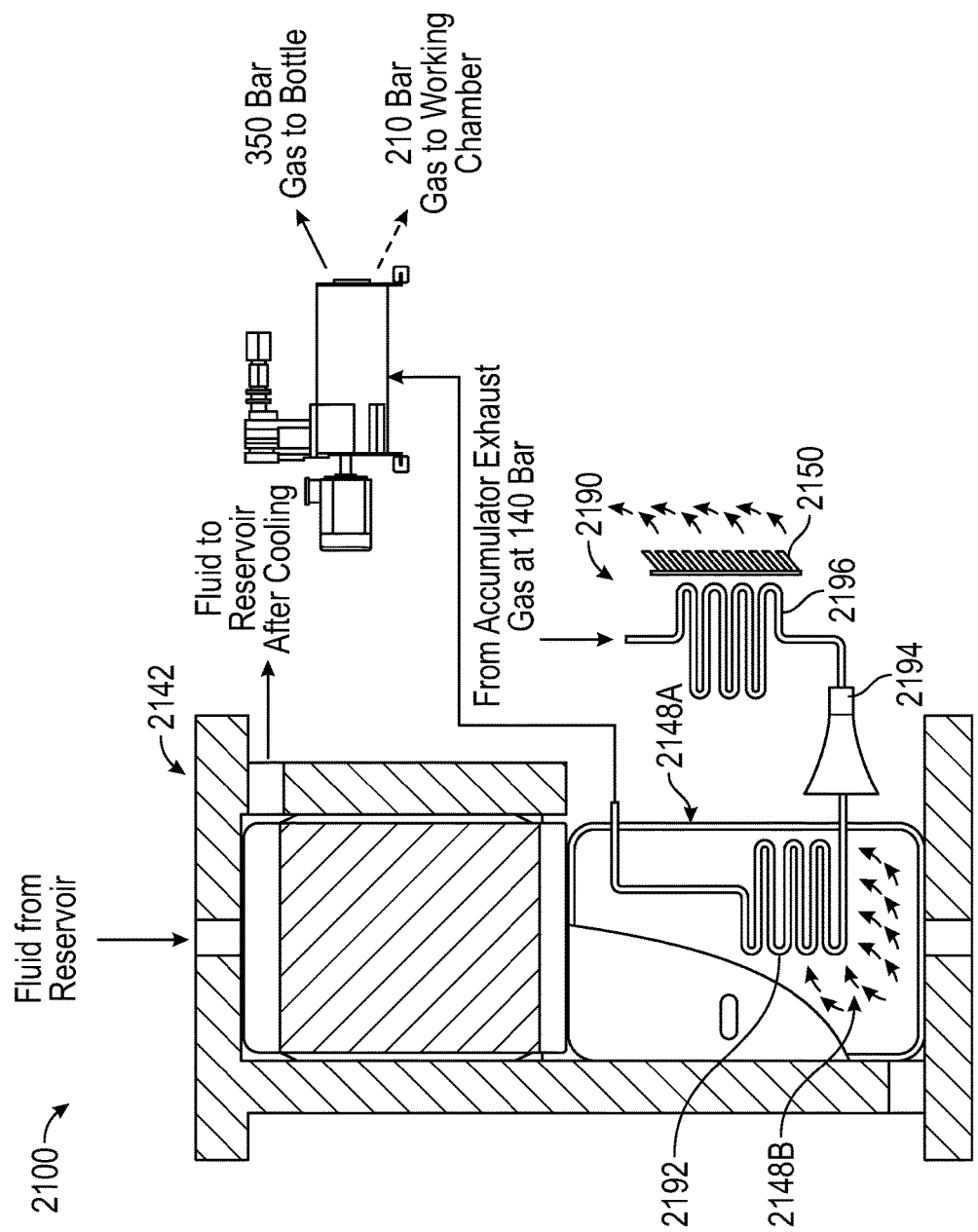
FIG. 32 is a diagram of the system of FIG. 19 undergoing a mode of operation similar to that of FIG. 31 and further illustrating a subsystem that can be used with the system.

FIG. 32 shows the mode of operation for the system 2100 of FIG. 31 in further detail and with the use of a further subsystem 2190. In particular, FIG. 32 shows the cooling device 2142 in further detail as part of the subsystem 2190. The subsystem 2190 can include the cooling chamber 2148A (e.g., a liquid-to-air evaporator 2192), an expansion device 2194, and a condenser 2196. The condenser 21%, the expansion device 2194 and the condenser 2196 can communicate with one another to allow for passage of the gas/condensed gas (e.g., liquid) in a circuit.

Hydraulic fluid within the cooling chamber 2148B can be circulated (e.g., by a dedicated pump or by the action of one or more components of subsystem 2102) within the cooling chamber 2148B so as to come into contact with the liquid-to-air evaporator 2192 in a heat exchange relationship where heat is drawn from the hydraulic fluid to the gas. The expansion device 2194 can arranged upstream (as defined by the direction of flow of the gas) of the liquid-to-air evaporator 2192 and can be configured to control the amount of condensed gas flow into the evaporator thereby controlling the superheating at the outlet of the liquid-to-air evaporator 2192. The condenser 2196 can be arranged adjacent the fins 2150 to allow for heat exchange away from the cooling device 2142. The use of subsystem 2190 can further improve the efficiency of the system 2100.

Further details shown in FIG. 32 are shown and described in further detail in reference to FIGS. 18 and 31 of the present application.

Thus, stored gas at various pressures can be utilized to drive hydraulic fluid to provide staging and reciprocating hydraulic power regeneration for components of the subassembly 2102. Such hydraulic fluid can be used to power other systems, components and subsystems (e.g. vehicle subsystems or other turbines) not specifically described or illustrated herein. It should be noted that unless items are being used in the specific mode illustrated by a Figure, items such as communication lines, valves and other components may not be specifically illustrated or discussed for ease of interpretation. However, it should be recognized that the systems can include additional items not specifically illustrated. It should be further realized that FIGS. 19-32 need not occur in the particular sequence described and may be performed independently without reliance on the particulars of any prior or subsequent of FIGS. 19-32. As used herein "hydraulic fluid" is not limited to oil but can include glycol and other suitable fluids.

Each of the following is a non-limiting example of various systems and methods disclosed and claimed herein.

These examples can stand on its own, or can be combined in various permutations or combinations with one or more of the other examples.

Example 1 is a system that can comprise: a turbine rotor including one or more blades attached to the turbine rotor, the blades configured to produce a rotor torque on the rotor in response to an applied loading; a power split transmission coupling comprising: an input shaft coupled to the turbine rotor, the input shaft rotatable according to the rotor torque; an output shaft rotatable at an output speed; a cam ring and a hub disposed between the input shaft and the output shaft, a hydraulic fluid disposed between the cam ring and the hub, wherein the hub includes a plurality of circumferentially spaced slots configured to house a plurality of vanes therein, the plurality of vanes configured to be movable between a retracted position, a fully extended position, or any partially extended position therebetween; in the retracted position, the input shaft is independently rotatable with respect to the output shaft; in the one or more extended positions, the plurality of vanes are configured to work the hydraulic fluid and transmit torque from the input shaft to the output shaft at an adjustable torque ratio; an inlet port communicatively coupled to a hydraulic fluid source, the hydraulic fluid transportable from the hydraulic fluid source to the power split transmission coupling; an outlet port having a closed configuration and an at least partially open configuration, the hydraulic fluid releasable from the power split transmission coupling through the outlet port in response to a power applied to the output shaft exceeding a threshold power, wherein the released hydraulic fluid exits the power split transmission coupling and is stored under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of the rotation of: the output shaft, the torque of the motor output, or both.

In Example 2, the subject matter of Example 1 optionally can include at least two turbines, each turbine hydraulically coupled to at least one other turbine, wherein the diverted hydraulic fluid from at least one turbine stored at high pressure is transferable to the motor of at least another turbine for producing electrical power.

In Example 3, the subject matter of any one or more of Examples 1-2 optionally can include a storage tank communicatively coupled to the outlet port, the storage tank configured to store the hydraulic fluid released through the outlet port of the power split transmission coupling.

In Example 4, the subject matter of any one or more of Examples 1-3 optionally can include wherein the hydraulic fluid source is a reservoir.

Example 5, the subject matter of any one or more of Examples 1-4 optionally can include a second storage vessel, the second storage vessel configured to store hydraulic fluid under pressure, wherein the hydraulic fluid in the second storage vessel is independently releasable from the hydraulic fluid in at least one other storage vessel.

In Example 6, the subject matter of any one or more of Examples 1-5 optionally can include a compressor configured to compress a gas; a plurality of pressure vessels one or more in selective communication with the compressor, the plurality of pressure vessels including at least one chamber configured to hold the gas compressed to a higher gas pressure, at least one chamber configured to hold the gas compressed to a lower gas pressure relative to the higher gas pressure, and at least one chamber configured to hold the gas compressed to an intermediate pressure relative to the higher gas pressure and the lower gas pressure.

In Example 7, the subject matter of Example 6 optionally can include wherein the at least one chamber configured to hold the gas compressed to the relatively higher gas pressure selectively communicates with at least the at least one chamber configured to hold the gas compressed to the intermediate pressure and the at least one chamber configured to hold the gas compressed to the intermediate pressure selectively communicates with the at least one chamber configured to hold the gas compressed to the lower gas pressure.

In Example 8, the subject matter of Example 7 optionally can include wherein the at least one chamber configured to hold the gas compressed to a relatively higher gas pressure selectively communicates with the at least one chamber configured to hold the gas compressed to a lower gas pressure.

In Example 9, the subject matter of any one or more of Examples 6-8 optionally can include wherein the at least one chamber configured to hold the gas compressed to the lower gas pressure comprises a piston accumulator having a piston residing therein.

In Example 10, the subject matter of Example 9 optionally can include wherein gas from one of the at least one chamber configured to hold the gas compressed to the higher gas pressure and the at least one chamber configured to hold the gas compressed to the intermediate pressure selectively drives a movement of the piston within the piston accumulator.

In Example 11, the subject matter of any one or more of Examples 9-10 optionally can include wherein the piston accumulator is configured to hold the hydraulic fluid on a first side of the piston and is configured to hold the gas on a second side of the piston.

In Example 12, the subject matter of Example 11 optionally can include one or more of: an expansion device configured to receive the hydraulic fluid and the gas and having a piston moveable therein, the expansion device selectively communicating with one or more of the power split transmission coupling, the piston accumulator and the at least one chamber configured to hold the gas compressed to the intermediate pressure; and a cooling device selectively communicating with the piston accumulator to receive the gas therein and configured to communicate with hydraulic fluid source to cool the hydraulic fluid.

In Example 13, the subject matter of Example 12 optionally can include wherein the piston accumulator selectively communicates with the hydraulic fluid source.

In Example 14, the subject matter of any one or more of Examples 12-13 optionally can include wherein the cooling device selectively communicates with the compressor.

In Example 15, the subject matter of any one or more of Examples 9-14 optionally can include wherein the hydraulic motor selectively communicates with the piston accumulator for storage of the hydraulic fluid.

In Example 16, the subject matter of Example 15 optionally can include wherein the hydraulic motor is selectively driven by the hydraulic fluid stored in the piston accumulator.

Example 17 is a system that can comprise: a turbine rotor configured to produce a rotor torque in response to an applied loading; a power split transmission coupling configured to transmit the rotor torque to an output shaft at an adjustable torque ratio and divert hydraulic fluid in response to the output shaft exceeding a threshold power; a hydraulic fluid storage vessel configured to store the diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of the rotation of: the output shaft, the torque of the motor output, or both.

In Example 18, the subject matter of Example 17 optionally can include at least two turbines, each turbine hydraulically coupled to at least one other turbine, wherein the diverted hydraulic fluid from at least one turbine stored at high pressure is transferable to the motor of at least another turbine for producing electrical power.

In Example 19, the subject matter of any one or more of Examples 17-18 optionally can include a second storage vessel, the second storage vessel configured to store hydraulic fluid under pressure, wherein the hydraulic fluid in the second storage vessel is independently releasable from the hydraulic fluid in at least one other storage vessel.

In Example 20, the subject matter of any one or more of Examples 17-19 optionally can include a compressor configured to compress a gas; a plurality of pressure vessels one or more in selective communication with the compressor, the plurality of pressure vessels including at least one chamber configured to hold the gas compressed to a higher gas pressure, at least one chamber configured to hold the gas compressed to a lower gas pressure relative to the higher gas pressure, and at least one chamber configured to hold the gas compressed to an intermediate pressure relative to the higher gas pressure and the lower gas pressure.

In Example 21, the subject matter of Example 20 optionally can include wherein the at least one chamber configured to hold the gas compressed to the relatively higher gas pressure selectively communicates with at least one of the at least one chamber configured to hold the gas compressed to the intermediate pressure and the at least one chamber configured to hold the gas compressed to the intermediate pressure selectively communicates with the at least one chamber configured to hold the gas compressed to the lower gas pressure.

In Example 22, the subject matter of Example 21 optionally can include wherein the at least one chamber configured to hold the gas compressed to a relatively higher gas pressure selectively communicates with the at least one chamber configured to hold the gas compressed to a lower gas pressure.

In Example 23, the subject matter of any one or more of Examples 20-22 optionally can include wherein the at least one chamber configured to hold the gas compressed to the lower gas pressure comprises a piston accumulator having a piston residing therein.

In Example 24, the subject matter of Example 23 optionally can include wherein gas from one of the at least one chamber configured to hold the gas compressed to the higher gas pressure and the at least one chamber configured to hold the gas compressed to the intermediate pressure selectively drives a movement of the piston within the piston accumulator.

In Example 25, the subject matter of any one or more of Examples 23-24 optionally can include wherein the piston accumulator is configured to hold the hydraulic fluid on a first side of the piston and is configured to hold the gas on a second side of the piston.

In Example 26, the subject matter of any one or more of Examples 23-5 optionally can include wherein the hydraulic motor selectively communicates with the piston accumulator for storage of the hydraulic fluid.

In Example 27, the subject matter of Example 26 optionally can include wherein the hydraulic motor is selectively driven by the hydraulic fluid stored in the piston accumulator.

In Example 28, the subject matter of any one or more of Examples 23-27 optionally can include one or more of: an expansion device configured to receive the hydraulic fluid and the gas and having a piston moveable therein, the expansion device selectively communicating with one or more of the power split transmission coupling, the piston accumulator and the at least one chamber configured to hold the gas compressed to the intermediate pressure; and a cooling device selectively communicating with the piston accumulator to receive the gas therein and configured to communicate with hydraulic fluid source to cool the hydraulic fluid.

In Example 29, the subject matter of Example 28 optionally can include wherein the piston accumulator selectively communicates with the hydraulic fluid source.

In Example 30, the subject matter of any one or more of Examples 28-29 optionally can include wherein the cooling device selectively communicates with the compressor.

Example 31 is a method for operating a wind turbine including power generation and regeneration modes is disclosed. The method can comprise: adjusting a power split transmission coupling to transfer substantially all torque from a turbine rotor to a generator by working a hydraulic fluid, wherein the generator converts mechanical power to electrical power; diverting the hydraulic fluid at high pressure from the power split transmission coupling in response to the electrical power produced by the generator exceeding a threshold to maintain the electrical power produced by the generator at or below the threshold; storing the hydraulic fluid diverted from the power split transmission coupling under high pressure in a storage vessel; and introducing the hydraulic fluid stored at high pressure to a hydraulic motor in response to the generator producing below threshold electrical power, the hydraulic motor operatively coupled to the generator and configured to transmit mechanical power to the generator for electrical power generation.

In Example 32, the subject matter of Example 31 optionally can include compressing air; directing the air to a plurality of pressure vessels until the a desired pressure in each of the plurality of pressure vessels is achieved; and communicating the air between and from the plurality of pressure vessels to store the hydraulic fluid and to introduce the hydraulic fluid to the hydraulic motor.

In Example 33, the subject matter of Example 32 optionally can include wherein the hydraulic fluid is stored in one of the plurality of pressure vessels.

In Example 34, the subject matter of Example 33 optionally can include wherein communicating the air between and from the plurality of pressure vessels reciprocates a piston within at least one of the plurality of pressure vessels.

In Example 35, the apparatuses, systems and/or methods of any one or any combination of Examples 1-34 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system comprising:
   a turbine rotor including one or more blades attached to the turbine rotor, the blades configured to produce a rotor torque on the rotor in response to an applied loading;
   a power split transmission coupling comprising:
   an input shaft coupled to the turbine rotor, the input shaft rotatable according to the rotor torque;
   an output shaft rotatable at an output speed;
   a cam ring and a hub disposed between the input shaft and the output shaft, a hydraulic fluid disposed between the cam ring and the hub, wherein the hub includes a plurality of circumferentially spaced slots configured to house a plurality of vanes therein, the plurality of vanes configured to be movable between a retracted position, a fully extended position, or any partially extended position therebetween;
   in the retracted position, the input shaft is independently rotatable with respect to the output shaft;
   in the one or more extended positions, the plurality of vanes are configured to work the hydraulic fluid and transmit torque from the input shaft to the output shaft at an adjustable torque ratio;
   an inlet port communicatively coupled to a hydraulic fluid source, the hydraulic fluid transportable from the hydraulic fluid source to the power split transmission coupling;
   an outlet port having a closed configuration and an at least partially open configuration, the hydraulic fluid releasable from the power split transmission coupling through the outlet port in response to a power applied to the output shaft exceeding a threshold power, wherein the released hydraulic fluid exits the power split transmission coupling and is stored under pressure;
   a hydraulic motor including a motor output configured to receive the hydraulic fluid stored under pressure and generate a torque on the motor output in response; and
   a generator operatively coupled to the output shaft and the motor output, wherein the generator produces electrical power in response to at least one of the rotation of: the output shaft, the torque of the motor output, or both.

2. The system of claim 1, further comprising at least two turbines, each turbine hydraulically coupled to at least one other turbine, wherein the diverted hydraulic fluid from at least one turbine stored at high pressure is transferable to the motor of at least another turbine for producing electrical power.

3. The system of claim 1, further comprising a storage tank communicatively coupled to the outlet port, the storage tank configured to store the hydraulic fluid released through the outlet port of the power split transmission coupling.

4. The system of claim 1, wherein the hydraulic fluid source is a reservoir.

5. The system of claim 1, further comprising a second storage vessel, the second storage vessel configured to store hydraulic fluid under pressure, wherein the hydraulic fluid in the second storage vessel is independently releasable from the hydraulic fluid in at least one other storage vessel.

6. The system of claim 1, further comprising:
   a compressor configured to compress a gas;
   a plurality of pressure vessels one or more in selective communication with the compressor, the plurality of pressure vessels including at least one chamber configured to hold the gas compressed to a higher gas pressure, at least one chamber configured to hold the gas compressed to a lower gas pressure relative to the higher gas pressure, and at least one chamber configured to hold the gas compressed to an intermediate pressure relative to the higher gas pressure and the lower gas pressure.

7. The system of claim 6, wherein the at least one chamber configured to hold the gas compressed to the relatively higher gas pressure selectively communicates with at least the at least one chamber configured to hold the gas compressed to the intermediate pressure and the at least one chamber configured to hold the gas compressed to the intermediate pressure selectively communicates with the at least one chamber configured to hold the gas compressed to the lower gas pressure.

8. The system of claim 7, wherein the at least one chamber configured to hold the gas compressed to a relatively higher gas pressure selectively communicates with the at least one chamber configured to hold the gas compressed to a lower gas pressure.

9. The system of claim 6, wherein the at least one chamber configured to hold the gas compressed to the lower gas pressure comprises a piston accumulator having a piston residing therein.

10. The system of claim 9, wherein gas from one of the at least one chamber configured to hold the gas compressed to the higher gas pressure and the at least one chamber configured to hold the gas compressed to the intermediate pressure selectively drives a movement of the piston within the piston accumulator.

11. The system of claim 9, wherein the piston accumulator is configured to hold the hydraulic fluid on a first side of the piston and is configured to hold the gas on a second side of the piston.

12. The system of claim 11, further comprising one or more of:
an expansion device configured to receive the hydraulic fluid and the gas and having a piston moveable therein, the expansion device selectively communicating with one or more of the power split transmission coupling, the piston accumulator and the at least one chamber configured to hold the gas compressed to the intermediate pressure; and
a cooling device selectively communicating with the piston accumulator to receive the gas therein and configured to communicate with hydraulic fluid source to cool the hydraulic fluid.

13. The system of claim 12, wherein the piston accumulator selectively communicates with the hydraulic fluid source.

14. The system of claim 12, wherein the cooling device selectively communicates with the compressor.

15. The system of claim 9, wherein the hydraulic motor selectively communicates with the piston accumulator for storage of the hydraulic fluid.

16. The system of claim 15, wherein the hydraulic motor is selectively driven by the hydraulic fluid stored in the piston accumulator.

17. A system comprising:
a turbine rotor configured to produce a rotor torque in response to an applied loading;
a power split transmission coupling configured to transmit the rotor torque to an output shaft at an adjustable torque ratio and divert hydraulic fluid in response to the output shaft exceeding a threshold power;
a hydraulic fluid storage vessel configured to store the diverted hydraulic fluid under pressure;
a hydraulic motor including a motor output configured to receive the hydraulic fluid stored under pressure and generate a torque on the motor output in response; and
a generator operatively coupled to the output shaft and the motor output, wherein the generator produces electrical power in response to at least one of the rotation of: the output shaft, the torque of the motor output, or both;
at least two turbines, each turbine hydraulically coupled to at least one other turbine, wherein the diverted hydraulic fluid from at least one turbine stored at high pressure is transferable to the motor of at least another turbine for producing electrical power.

18. The system of claim 17, further comprising a second storage vessel, the second storage vessel configured to store hydraulic fluid under pressure, wherein the hydraulic fluid in the second storage vessel is independently releasable from the hydraulic fluid in at least one other storage vessel.

19. A system comprising:
a turbine rotor configured to produce a rotor torque in response to an applied loading;
a power split transmission coupling configured to transmit the rotor torque to an output shaft at an adjustable torque ratio and divert hydraulic fluid in response to the output shaft exceeding a threshold power;
a hydraulic fluid storage vessel configured to store the diverted hydraulic fluid under pressure;
a hydraulic motor including a motor output configured to receive the hydraulic fluid stored under pressure and generate a torque on the motor output in response; and
a generator operatively coupled to the output shaft and the motor output, wherein the generator produces electrical power in response to at least one of the rotation of: the output shaft, the torque of the motor output, or both;
a compressor configured to compress a gas; and
a plurality of pressure vessels one or more in selective communication with the compressor, the plurality of pressure vessels including at least one chamber configured to hold the gas compressed to a higher gas pressure, at least one chamber configured to hold the gas compressed to a lower gas pressure relative to the higher gas pressure, and at least one chamber configured to hold the gas compressed to an intermediate pressure relative to the higher gas pressure and the lower gas pressure.

20. The system of claim 19, wherein the at least one chamber configured to hold the gas compressed to the relatively higher gas pressure selectively communicates with at least one of the at least one chamber configured to hold the gas compressed to the intermediate pressure and the at least one chamber configured to hold the gas compressed to the intermediate pressure selectively communicates with the at least one chamber configured to hold the gas compressed to the lower gas pressure.

21. The system of claim 20, wherein the at least one chamber configured to hold the gas compressed to a relatively higher gas pressure selectively communicates with the at least one chamber configured to hold the gas compressed to a lower gas pressure.

22. The system of claim 19, wherein the at least one chamber configured to hold the gas compressed to the lower gas pressure comprises a piston accumulator having a piston residing therein.

23. The system of claim 22, wherein gas from one of the at least one chamber configured to hold the gas compressed to the higher gas pressure and the at least one chamber configured to hold the gas compressed to the intermediate pressure selectively drives a movement of the piston within the piston accumulator.

24. The system of claim 22, wherein the piston accumulator is configured to hold the hydraulic fluid on a first side of the piston and is configured to hold the gas on a second side of the piston.

25. The system of claim 22, wherein the hydraulic motor selectively communicates with the piston accumulator for storage of the hydraulic fluid.

26. The system of claim 25, wherein the hydraulic motor is selectively driven by the hydraulic fluid stored in the piston accumulator.

27. The system of claim 22, further comprising one or more of:
   an expansion device configured to receive the hydraulic fluid and the gas and having a piston moveable therein, the expansion device selectively communicating with one or more of the power split transmission coupling, the piston accumulator and the at least one chamber configured to hold the gas compressed to the intermediate pressure; and
   a cooling device selectively communicating with the piston accumulator to receive the gas therein and configured to communicate with hydraulic fluid source to cool the hydraulic fluid.

28. The system of claim 27, wherein the piston accumulator selectively communicates with the hydraulic fluid source.

29. The system of claim 27, wherein the cooling device selectively communicates with the compressor.

\* \* \* \* \*

UNITED STATES PATENT AND TRADEMARK OFFICE
CERTIFICATE OF CORRECTION

PATENT NO. : 10,428,798 B2
APPLICATION NO. : 15/767902
DATED : October 1, 2019
INVENTOR(S) : Norman Ian Mathers Page 1 of 1

It is certified that error appears in the above-identified patent and that said Letters Patent is hereby corrected as shown below:

In the Claims

In Column 31, Line 10, in Claim 7, after "at least", insert --one of--

Signed and Sealed this
Twenty-eighth Day of April, 2020

Andrei Iancu
*Director of the United States Patent and Trademark Office*